US011190667B2

(12) United States Patent
Nakamura et al.

(10) Patent No.: US 11,190,667 B2
(45) Date of Patent: Nov. 30, 2021

(54) INFORMATION TRANSMISSION CONTROL APPARATUS, IMAGE PROCESSING APPARATUS, AND INFORMATION TRANSMISSION CONTROL METHOD

(71) Applicant: Sharp Kabushiki Kaisha, Sakai (JP)

(72) Inventors: Hiroaki Nakamura, Sakai (JP); Yuki Shibayama, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 175 days.

(21) Appl. No.: 16/363,079

(22) Filed: Mar. 25, 2019

(65) Prior Publication Data

US 2019/0222712 A1     Jul. 18, 2019

Related U.S. Application Data

(63) Continuation of application No. PCT/JP2017/033627, filed on Sep. 19, 2017.

(30) Foreign Application Priority Data

Sep. 26, 2016  (JP) .............................. JP2016-186593
Sep. 12, 2017  (JP) .............................. JP2017-174685

(51) Int. Cl.
*H04N 1/32*   (2006.01)
*G06F 9/54*   (2006.01)
*H04N 1/00*   (2006.01)

(52) U.S. Cl.
CPC ......... *H04N 1/32064* (2013.01); *G06F 9/542* (2013.01); *H04N 1/00212* (2013.01); *H04N 1/32058* (2013.01)

(58) Field of Classification Search
None
See application file for complete search history.

(56) References Cited

U.S. PATENT DOCUMENTS

| 5,561,533 A | 10/1996 | Yoshida | |
|---|---|---|---|
| 2004/0001225 A1* | 1/2004 | Takahashi | .......... H04N 1/32101 358/1.15 |
| 2013/0258417 A1* | 10/2013 | Kosuda | ............. H04N 1/00209 358/402 |

FOREIGN PATENT DOCUMENTS

| JP | 5-219340 A | 8/1993 |
|---|---|---|
| JP | 10-164345 A | 6/1998 |

(Continued)

OTHER PUBLICATIONS

Official Communication issued in International Patent Application No. PCT/JP2017/033627, dated Dec. 12, 2017.

*Primary Examiner* — Fan Zhang
(74) *Attorney, Agent, or Firm* — Keating & Bennett, LLP

(57) ABSTRACT

An image forming device according to the present disclosure includes a facsimile communication unit and a network communication unit. The facsimile communication unit transmits image information in increments of pages to a facsimile device that is a transmission destination, via a public telephone line. The network communication unit transmits image information as a file to an information processing device, via a network. A transmission processing unit performs broadcast transmission processing of transmitting same image information to multiple transmission destinations at one time, by at least one of the facsimile transmission unit and the network transmission unit. Further, a transmission report notification unit makes notification of transmission report information, including transmission destination information representing the transmission destinations of the broadcast transmission processing, to all of the transmission destinations.

6 Claims, 37 Drawing Sheets

(56) References Cited

FOREIGN PATENT DOCUMENTS

| | | | |
|---|---|---|---|
| JP | 10164345 | * | 6/1998 |
| JP | 2000-174957 A | | 6/2000 |
| JP | 2002-118713 A | | 4/2002 |
| JP | 2002118713 | * | 4/2002 |
| JP | 2003-032411 A | | 1/2003 |
| JP | 2003-078704 A | | 3/2003 |
| JP | 2003-197916 A | | 6/2003 |

* cited by examiner

| TRANSMISSION RESERVATION TABLE | | JUNE 27, 2016 (MON) PM 1:05 | |
|---|---|---|---|
| NO. | RECIPIENT | COMMUNICATION METHOD | COUNT |
| 001<br>002<br>003<br>004 | 0743541111<br>0743542222<br>0743543333<br>email@abc.jp | SEQUENTIAL BROADCAST TRANSMISSION | 05 |

| TRANSMISSION RESULTS TABLE | | | | | JUNE 27, 2016 (MON) PM 1:05 |
|---|---|---|---|---|---|
| NO. | DATE | START TIME | RECIPIENT | COUNT | COMMUNICATION RESULTS |
| 001<br>002<br>003<br>004 | 2016/6/27 | 13:01 | email@abc.jp<br>0743541111<br>0743542222<br>0743543333 | 05<br>05<br>02<br>05 | OK<br>OK<br>FAILED<br>OK |

JOB STATUS　　　　　　　　　　　　　　　　　　　　　　　　　　　RETURN

DETAILED DISPLAY　　　　　　　　　　　　　　　OK

⬆ SEQUENTIAL BROADCAST 22　　PROGRESS: 001 / 001

CONTACT NAME : FACSIMILE COMMUNICATION
RECIPIENT NO. : 1234567890
STATUS　　　  : STANDBY　　　　　　　PAGE COUNT　　　　　　　: 001 / 002
REFERENCE NO. : 041　　　　　　　　　COMMUNICATION LINE : 
NOTIFICATION OF TRANSMISSION RESERVATION INFORMATION : NONE
NOTIFICATION OF TRANSMISSION RESULTS INFORMATION : NOTIFICATION OF VIEWING LOCATION

| CURRENTLY COMMUNICATING | STANDBY | COMMUNICATION FAILED | RECIPIENT LIST |

| RECIPIENT NAME | RECIPIENT TYPE | RECIPIENT | RESERVATION (TRANSMIT REPORT) | RESERVATION (NOTIFICATION OF VIEWING LOCATION) | RESULTS (TRANSMIT REPORT) | RESULTS (NOTIFICATION OF VIEWING LOCATION) |
|---|---|---|---|---|---|---|
| GGG | E-mail | ggg@example.com | HIGH | OFF | HIGH | OFF |
| HHH | E-mail | hhh@example.com | MEDIUM | MEDIUM | MEDIUM | MEDIUM |
| KKK | E-mail | kkk@example.com | LOW | LOW | LOW | LOW |
| MMM | E-mail | mmm@example.com | OFF | OFF | HIGH | HIGH |
| NNN | E-mail | nnn@example.com | HIGH | HIGH | OFF | OFF |
| PPP | E-mail | ppp@example.com | MEDIUM | OFF | MEDIUM | OFF |
| QQQ | E-mail | qqq@example.com | LOW | LOW | LOW | LOW |
| RRR | FAX | 0123456781 | OFF | OFF | LOW | OFF |
| SSS | FOLDER | \\server1\folder | MEDIUM | MEDIUM | MEDIUM | MEDIUM |
| TTT | FOLDER | \\server2\folder | OFF | HIGH | OFF | HIGH |
| UUU | E-mail | uuu@example.com | OFF | LOW | OFF | LOW |
| VVV | E-mail | vvv@example.com | HIGH | OFF | HIGH | OFF |
| --- | --- | --- | --- | --- | --- | --- |

| RECIPIENT NAME | RECIPIENT TYPE | RECIPIENT | RESERVATION (TRANSMIT REPORT) | RESERVATION (NOTIFICATION OF VIEWING LOCATION) | RESULTS (TRANSMIT REPORT) | RESULTS (NOTIFICATION OF VIEWING LOCATION) |
|---|---|---|---|---|---|---|
| GGG | E-mail | ggg@example.com | ON | ON | ON | ON |
| HHH | E-mail | hhh@example.com | OFF | OFF | OFF | OFF |
| KKK | E-mail | kkk@example.com | ON | OFF | ON | OFF |
| MMM | E-mail | mmm@example.com | OFF | ON | OFF | ON |
| NNN | E-mail | nnn@example.com | OFF | OFF | OFF | OFF |
| PPP | E-mail | ppp@example.com | OFF | ON | OFF | ON |
| QQQ | E-mail | qqq@example.com | ON | ON | ON | ON |
| RRR | FAX | 0123456781 | OFF | OFF | OFF | OFF |
| SSS | FOLDER | \\server1\folder | ON | OFF | ON | OFF |
| TTT | FOLDER | \\server2\folder | OFF | ON | OFF | ON |
| UUU | E-mail | uuu@example.com | OFF | OFF | OFF | OFF |
| VVV | E-mail | vvv@example.com | ON | OFF | ON | OFF |
| --- | --- | --- | --- | --- | --- | --- |

INFORMATION TRANSMISSION CONTROL APPARATUS, IMAGE PROCESSING APPARATUS, AND INFORMATION TRANSMISSION CONTROL METHOD

BACKGROUND

1. Field

The present disclosure relates to an information transmission control apparatus, an image processing apparatus, and an information transmission control method.

2. Description of the Related Art

Heretofore, there has been proposed a facsimile communication system where images of documents read by a reading device are broadcast-transmitted by facsimile transmission and email transmission (e.g., Japanese Unexamined Patent Application Publication No. 2003-78704). Further, The facsimile communication system described in Japanese Unexamined Patent Application Publication No. 2003-78704 has a transmission report compilation unit that collects transmission results of facsimile transmission and email transmission, and compiles a transmission report. Accordingly, the operator can obtain a transmission report including transmission results for each of recipients of emails transmitted by an email transmission unit, and transmission results for each of facsimile recipients. This facsimile communication system enables transmission reports to the transferred to a predetermined printer, and the transmission reports to be printed at the printer to which they have been transferred.

Now, the facsimile communication system described in Japanese Unexamined Patent Application Publication No. 2003-78704 is capable of printing transmission reports at the transmission source that has performed the broadcast transmission, or a printer specified as a transfer destination for the transmission reports. Accordingly, the transmission reports have been limited to being provided for confirmation by the operator at the transmission source and just at the side of the printer specified as a transfer destination for the transmission reports.

It has been found desirable to provide an information transmission control apparatus, an image processing apparatus, an information transmission control program, and an information transmission control method, where transmission report information including transmission destination information indicating transmission destinations of broadcast transmission can be notified to all transmission destinations of this broadcast transmission, or only notified to particular transmission destinations that match conditions set beforehand.

SUMMARY

According to an aspect of the disclosure, there is provided an image processing apparatus, including a facsimile transmission device that transmits image information in increments of pages to a facsimile device at a transmission destination, via a public telephone line, a network transmission device that transmits image information as a file to an information processing device at a transmission destination, via a network, a broadcast transmission device that performs broadcast transmission processing where same image information is transmitted to a plurality of transmission destinations at one time, by at least one of the facsimile transmission device and the network transmission device, and a transmission report notification device that makes notification of transmission report information, including transmission destination information representing the plurality of transmission destinations of the broadcast transmission processing, to the plurality of transmission destinations.

According to an aspect of the disclosure, there is provided an information transmission control apparatus, including a broadcast transmission device that performs broadcast transmission processing where same transmission object information is transmitted to a plurality of transmission destinations at one time, and a transmission report notification device that notifies transmission report information including transmission destination information representing the plurality of transmission destinations, only to one or more particular transmission destinations that have matched conditions set beforehand, out of the plurality of transmission destinations.

According to an aspect of the disclosure, there is provided an image processing apparatus including the information transmission control apparatus, and a reading device that performs image reading processing where an image of a document is read. The broadcast transmission device performs the broadcast transmission processing of image information obtained by the image reading processing, as transmission object information.

According to an aspect of the disclosure, there is provided an information transmission control method including broadcast transmitting in which broadcast transmission processing, where same transmission object information is transmitted to a plurality of transmission destinations at one time, is performed, and transmission report notifying, where transmission report information including transmission destination information representing the plurality of transmission destinations is notified only to one or more particular transmission destinations that have matched conditions set beforehand, out of the plurality of transmission destinations.

BRIEF DESCRIPTION OF THE DRAWINGS

FIGS. 3A and 3B are diagrams illustrating a transmission reservation table and a transmission results table, respectively, as transmission report information according to the first embodiment;

FIG. 19 is a diagram illustrating an example of a detailed display screen displayed on the display screen of the display unit of the image forming device according to the first embodiment;

FIG. 25 is a diagram illustrating an example of a transmission destination table stored in a storage unit of the image forming device according to the second embodiment;

FIG. 37 is a diagram illustrating an example of a transmission destination table stored in a storage unit of the image forming device according to the third embodiment.

DESCRIPTION OF THE EMBODIMENTS

First Embodiment

Figure 1:
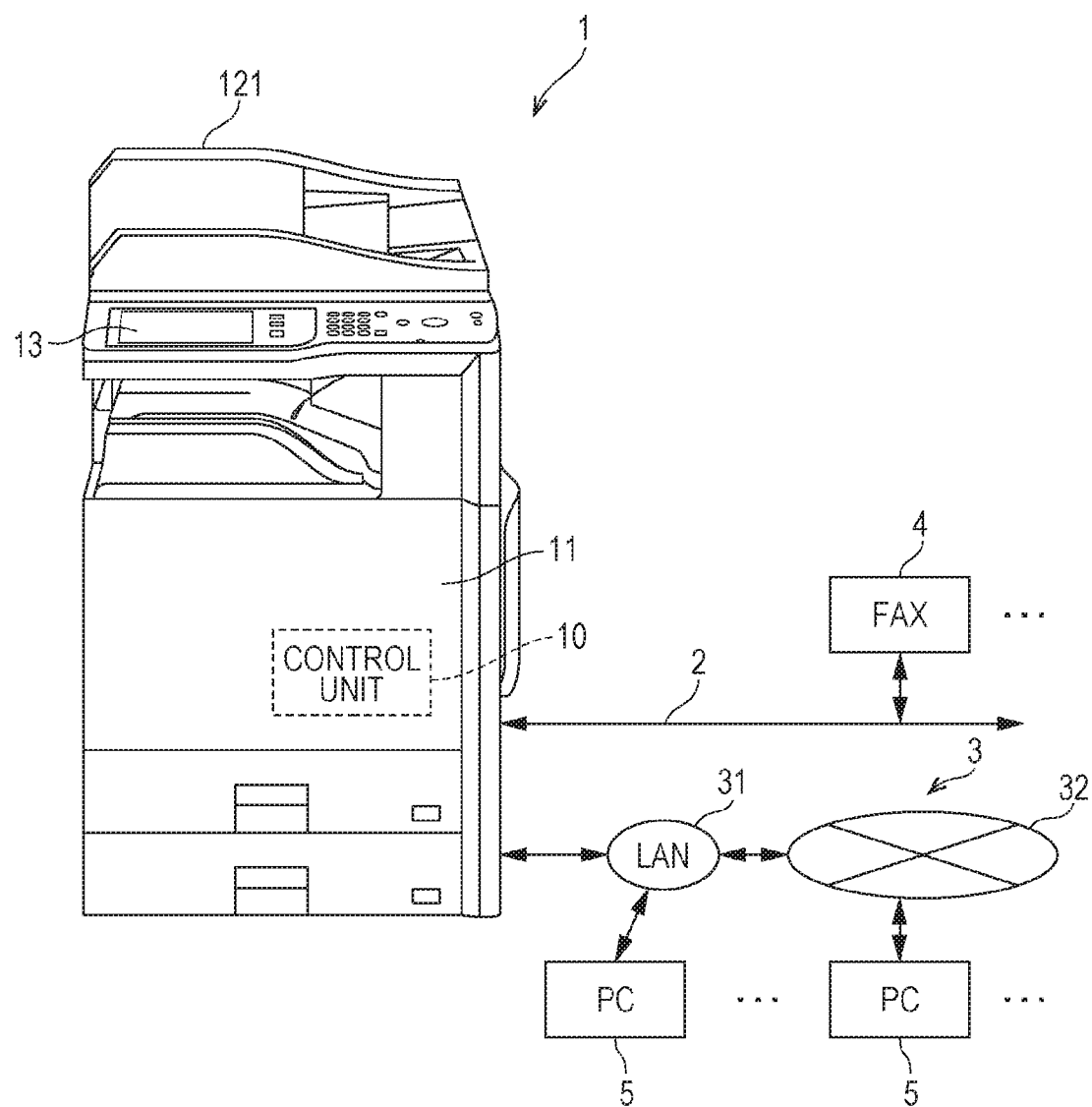
FIG. 1 is a diagram illustrating an external view of an image forming device according to a first embodiment of the present disclosure, and a schematic configuration of a communication unit relating to broadcast transmission functions of the image forming device.

FIG. 1 is a diagram illustrating an external view of an image forming device 1 according to a first embodiment of the present disclosure, and a schematic configuration of a communication unit relating to later-described broadcast communication functions of the image forming device 1. The image forming device 1 according to the first embodiment that is illustrated in FIG. 1 is a so-called multi-function peripheral (MFP) that has image forming functions of forming images on sheets that are omitted from illustration, and also has facsimile communication functions of exchanging image information with a facsimile device 4 that is an example of an external device. The image forming device 1 also has scanner functions of reading images from documents that are omitted from illustration. Further, the image forming device 1 has network communication functions of exchanging various types of transmission object information such as image information and so forth, with an information processing device such as a personal computer or the like (hereinafter referred to as "PC") 5 that is another example of an external device. Moreover, the image forming device 1 has broadcast transmission functions of transmitting the same image information to multiple transmission destinations at one time, by at least one of facsimile transmission functions regarding transmission processing included in the facsimile communication functions, and network transmission functions regarding transmission processing included in the network communication functions. The network transmission functions used for these broadcast transmission functions also includes email transmission functions and scanner transmission functions, which will be described later. Note that the facsimile transmission functions and network transmission functions as used here are examples of information transmission functions according to the present disclosure.

The image forming device 1 has at least an image forming unit 11 provided at the middle within the main unit thereof, a document conveying device 121 installed at the top of the main unit, and an operation panel unit 13 that an operator of the image forming device 1 operates. The image forming device 1 may also have a reading unit 12 (see FIG. 2) serving as a reading device that is provided at the upper portion within the main unit. The reading unit 12 is for realizing the aforementioned scanner functions, and handles image reading processing where images on documents are optically read. Documents that are the object of the image reading processing are conveyed by automatic conveying functions of the document conveying device 121 so as to pass over a document reading position of the reading unit 12 one sheet at a time, or are manually set on a contact glass that is omitted from illustration, one sheet at a time. The image forming device 1 further has a control unit 10 provided at an appropriate position within the main unit thereof. This control unit 10 controls the operations of the parts of the image forming device 1 as described later.

The image forming unit 11 is for realizing the aforementioned image forming functions, and handles image forming processing where images are formed on sheets serving as image recording medium, by a known electrophotography method, for example. that is to say, the image forming unit 11 forms an electrostatic latent image on a photosensitive member based on image data provided for the image forming processing, causes toner to be adhered to this electrostatic latent image so that the electrostatic latent image is visualized as a toner image, and further transfers this toner image onto a sheet, thereby forming the image on the sheet. To this end, the image forming unit 11 includes components such as a photosensitive drum, charging device, exposing device (laser scanning unit), developing device, transfer device, cleaning device, which are all omitted from illustration. In a case where the image forming device 1 is a monochrome device for example, one each of the components is provided. On the other hand, in a case where the image forming device 1 is a color device, four each of the components are provided, correlated with the four color components of cyan (C), magenta (M), yellow (Y), and key plate (K). The image formed on the sheet by this image forming processing is subjected to fixing processing by a fixing device omitted from illustration so as to be fixed onto the sheet, and is thus printed, so as to say.

Examples of image data provided to the aforementioned image forming processing include document image data obtained by the image reading processing by the reading unit 12. Examples of image data provided to the aforementioned image forming processing also include image data stored in an image storage device omitted from illustration, that is built into the image forming device 1, or an external storage device that is omitted from illustration, which can be detachably mounted to the image forming device 1. Examples of image data provided to the aforementioned image forming processing further include image data and so forth sent from the later-described facsimile device 4 or information processing device 5. Note that the image forming unit 11 is not restricted to the electrophotography method, and may form images by other methods, such as the ink-jet method and so forth.

The image forming device 1 can connect to a public telephone line 2 and a network 3, for communication with the aforementioned external device. The network 3 is, for example, a local area network (LAN) 31, or the Internet 32 to which connection is made via the LAN 31 or a wide area network (WAN) that is omitted from illustration. Multiple facsimile devices 4 can connect to the public telephone line 2. Multiple PCs 5 can connect to the network 3. Note that the image forming device 1 may be arranged to directly connect to the Internet 32. The network 3 including the Internet 32 may also use wireless at least partially.

Figure 2:
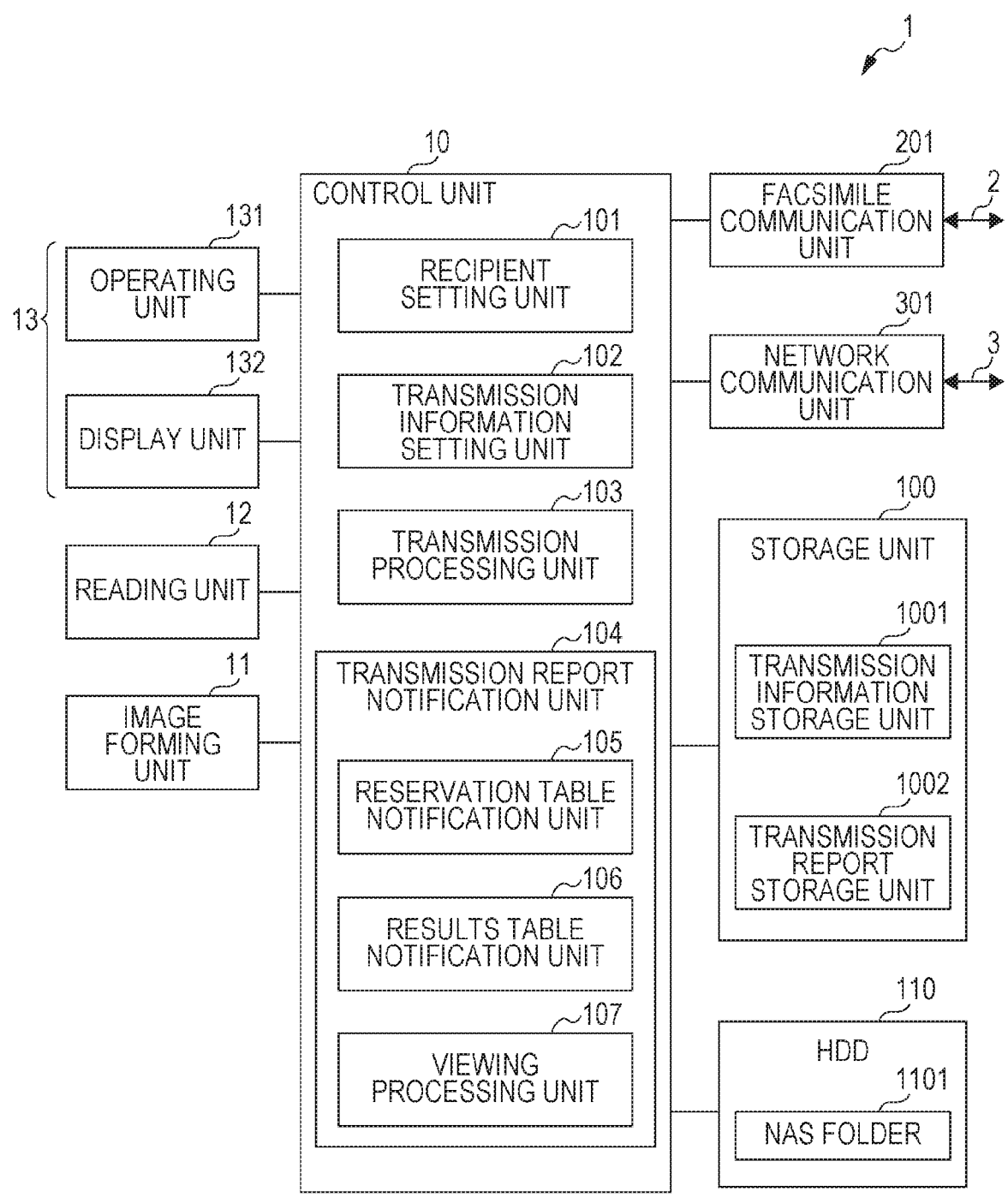
FIG. 2 is a block diagram illustrating an electrical configuration of portions relating to the broadcast transmission functions of the image forming device according to the first embodiment.

In FIG. 2, the control unit 10 includes a so-called microcontroller that has a central processing unit (CPU) omitted from illustration. The image forming unit 11, reading unit 12, operation panel unit 13, and a storage unit 100 are connected to this control unit 10. The operation panel unit 13 has an operating unit 131 and a display unit 132. Also connected to the control unit 10 are a facsimile communication unit 201 and a network communication unit 301. The facsimile communication unit 201 has a modem and network control unit (NCU) that are omitted from illustration, and is connected to the public telephone line 2. The network communication unit 301 includes a network interface card (NIC), and is connected to the network 3.

An operating unit 131 is an example of an operation accepting device that accepts input instructions by an operator, which are so-called user operations, and includes operating keys, for example. A display unit 132 is an example of a display device having a display screen, and visual information such as images and text is displayed on the display screen as suitable under control of the control unit 10. Also note that a transparent thin-layer touch panel is disposed on the display screen of the display unit 132, although details are omitted from illustration, this touch panel also making up part of the operating unit 131. The touch panel may be a capacitive touchscreen, but is not restricted to being a capacitive arrangement, and other types may be used, such as inductive, resistive, infrared, and so forth. The display unit 132 is a liquid crystal display (LCD) device for example, but is not restricted to being an LCD arrangement, and may be an electroluminescent (EL) display or the like.

The storage unit 100 is a so-called main storage device that has a memory area storing control programs and so forth that the control unit 10 executes to perform various types of computation processing, and a work area that is a temporary storage region for when the control unit 10 performs various types of computation processing. The storage unit 100 also includes a transmission information storage unit 1001 and a transmission report storage unit 1002. Of these, the transmission information storage unit 1001 stores information to be transmitted, such as image information and so forth to be transmitted to the facsimile device 4 or PC 5 which are external devices. On the other hand, the transmission report storage unit 1002 stores later-described transmission report information and so forth, including transmission destination information representing transmission destinations of the information to be transmitted. The storage unit 100 is made up of semiconductor memory such as read-only memory (ROM), random access memory (RAM), electrically erasable programmable ROM (EEPROM, a registered trademark), and so forth.

Further, connected to the control unit 10 is a hard disk drive (hereinafter referred to as "HDD") 110 as an auxiliary storage device, for example. A later-described network-attached storage (NAS) folder 1101 is formed in the HDD 110 beforehand.

The control unit 10 executes computation processing following an information transmission control program out of the control programs, and thereby functions as a recipient setting unit 101, a transmission information setting unit 102, a transmission processing unit 103, and a transmission report notification unit 104. Out of these, the transmission report notification unit 104 may include a reservation table notification unit 105, a results table notification unit 106, and a viewing processing unit 107. This configuration of the control unit 10 realizes broadcast transmission functions.

As described above, the broadcast transmission functions according to the first embodiment is functions for transmitting the same image information to multiple transmission destinations at once, which is so-called broadcast transmission, by at least one of facsimile transmission functions and network transmission functions. For example, image information transmitted by the facsimile transmission functions is transmitted in increments of pages to one or more facsimile devices 4 optionally specified as transmission destinations. Network transmission functions include email transmission functions and scanner transmission functions. According to the email transmission functions thereof, image information is transmitted to one or more PCs 5, or more accurately to one or more email addresses optionally specified as transmission destinations, as a file of a format following communication stipulations set beforehand (electronic file). At this time, the image information is transmitted in a state of being attached to the email, i.e., as an attachment file. According to the scanner transmission functions, the image information is transmitted to a folder in one or more PCs 5 specified as transmission destinations beforehand, as a file of a format following communication stipulations decided beforehand, i.e., as a file of the same format as with the email transmission functions, for example. Note that multiple of facsimile devices 4, email addresses, and folders in PCs 5 may be the specified transmission destination, and multiple of this may be specified in a coexisting state. In other words, broadcast transmission may be performed by just one of the facsimile transmission functions, email transmission functions, and scanner transmission functions, or broadcast transmission may be performed by two or more of these three transmission functions.

Furthermore, the image forming device 1 according to the first embodiment has transmission report notification functions of notifying all transmission destinations of transmission report information including transmission destination information indicating each transmission destination, as accessory functions of the broadcast transmission functions. The transmission report notification functions have a transmission reservation notification mode and a transmission results notification mode. Further, the transmission results notification mode includes a results table transmission mode and a viewing location notification mode.

Of these, according to the transmission reservation notification mode, when broadcast transmission is started, a transmission reservation table 1051 such as illustrated in FIG. 3A is compiled. The transmission reservation table 1051 is then transmitted to each transmission destination along with the image information that is the transmission object information. For example, for transmission to a transmission destination where the image information that is the transmission object information is transmitted by facsimile transmission functions (facsimile device 4), the transmission reservation table 1051 is transmitted in a state of being appended after a predetermined page in the image information, which may be the final page. At this time, the transmission reservation table 1051 is converted into information (data) in increments of pages the same as the image information transmitted together, and then attached after the predetermined page in this image information. Also, for transmission to a transmission destination where the image information is transmitted by email transmission functions (email address recipient), the transmission reservation table 1051 is transmitted in a state of being attached along with the image information as an email attachment file. At this time, the transmission reservation table 1051 is converted into a file of a format decided beforehand, such as a file of the same format as the image information transmitted together for example, and then transmitted. Further, for transmission to a transmission destination where the image information is transmitted by scanner transmission functions (folder in PC 5), the transmission reservation table 1051 is transmitted along with the image information. At this time, the transmission reservation table 1051 is converted into a file of a format decided beforehand, such as a file of the same format as the image information transmitted together for example, and then transmitted.

Note that the transmission reservation table 1051 illustrated in FIG. 3A is an example of a transmission reservation table according to the present disclosure, and also is an example of transmission reservation information according to the present disclosure. This transmission reservation table 1051 includes a No. representing the order of specification (reservation) of transmission destinations (recipient) that are the other parties of broadcast transmission, and information identifying the transmission destinations (facsimile No., email address, folder information). This transmission reservation table 1051 also includes information to the effect that information relating to the communication method, more specifically that image information that is the object of transmission will be sequentially transmitted to the transmission destinations by broadcast transmission functions. Further, the transmission reservation table 1051 also includes information indicating the page count (number of pages) of image information. In addition, the transmission reservation table 1051 includes information representing the date and time of compilation thereof. Thus, the transmission reservation table 1051 includes various types of information, but it is sufficient for the transmission reservation table 1051 to include information identifying the transmission destinations (facsimile No., email address, folder information), i.e., transmission destination information. Accordingly, each of the transmission destinations can receive the image information, and at the same time recognize other transmission destinations from the transmission reservation table 1051. Now, according to the transmission reservation table 1051 illustrated in FIG. 3A, it can be seen that three facsimile Nos. and one email address are specified, i.e., that four transmission destinations are specified.

Also, according to the results table transmission mode in the above-described transmission results notification mode, after broadcast transmission has been performed, a transmission results table 1061 such as illustrated in FIG. 3B is compiled. The transmission results table 1061 is then transmitted to the same transmission destinations as in the broadcast transmission. For example, the transmission results table 1061 is transmitted by the facsimile transmission functions to the transmission destinations regarding which the image information that is the transmission object information was transmitted by the facsimile transmission functions in the broadcast transmission (facsimile devices 4). At this time, the transmission results table 1061 is converted into information that is in increments of pages, in the same way as with the image information that has already been transmitted, and thus transmitted. Also, the transmission results table 1061 is transmitted by the email transmission functions to the transmission destinations regarding which the image information was transmitted by the email transmission functions in the broadcast transmission (email address recipients). At this time, the transmission results table 1061 is converted into a file of a format that has been decided beforehand, e.g., a file of the same format as the image information that has already been transmitted, and thus transmitted as an email attachment file. Further, the transmission results table 1061 is transmitted by the scanner transmission functions to the transmission destinations regarding which the image information was transmitted by the scanner transmission functions in the broadcast transmission (folder of the PC 5). At this time, the transmission results table 1061 is converted into a file of a format that has been decided beforehand, e.g., a file of the same format as the image information that has already been transmitted, and thus transmitted. With regard to transmission destinations where the image information was transmitted by the scanner transmission functions in the broadcast transmission, there are cases where an optional email address is registered as a hyperlink destination beforehand. In this case, the transmission results table 1061 is transmitted as an email attachment file to the email address that is the hyperlink destination. In a case where this hyperlink destination is registered, the transmission results table 1061 may be transmitted to both the email address that is the hyperlink destination, and the transmission destination that is the link source (folder of the PC 5).

Note that the transmission results table 1061 illustrated in FIG. 3B is an example of a transmission results table according to the present disclosure, and also is an example of transmission results information according to the present disclosure. This transmission results table 1061 includes a No. representing the order of transmission of image information to the transmission destinations by broadcast transmission, and code identifying the transmission destinations (facsimile No., email address, folder information). This transmission results table 1061 also includes information representing the date and time at which broadcast transmission was started. The transmission results table 1061 further includes information indicating the page count (number of pages) of image information actually transmitted to each transmission destination. Moreover, the transmission results table 1061 may also include results information representing whether transmission of image information to the respective transmission destinations has been successful or not. In addition, the transmission results table 1061 includes information representing the date and time of compilation thereof. Thus, the transmission results table 1061 includes various types of information, but it is sufficient to include transmission destination information identifying at least the transmission destinations in the transmission results table 1061, in the same way as in the transmission reservation table 1051, and additionally to include results information.

Accordingly, each of the transmission destinations can recognize other transmission destinations from the transmission results table 1061 after having received the image information, and recognize the results of whether transmission of the image information to the transmission destinations has been successful or not. Now, according to the transmission results table 1061 illustrated in FIG. 3B, it can be seen that transmission of image information has been successful for three of the four transmission destinations, and transmission of image information has failed for the remaining one.

Also, according to the viewing location notification mode in the transmission results notification mode, after broadcast transmission has been performed, the transmission results table 1061 is compiled in the same way as in the above-described results table transmission mode. This transmission results table 1061 is placed in the transmission report storage unit 1002 of the storage unit 100, and thus stored. At this time, the transmission report storage unit 1002 functions as a bulletin board memory box. Identification information serving as storage information representing the storage location of the transmission results table 1061 stored in the transmission report storage unit 1002, such as a known F-code, for example, is stored in the transmission report storage unit 1002 in a manner correlated with the transmission results table 1061. The transmission results table 1061 is also stored in the NAS folder 1101 within the HDD 110. The transmission report storage unit 1002 serving as the bulletin board memory box and the NAS folder 1101, in which the transmission results table 1061 is stored, is an example of a storage device according to the present disclosure.

Based on this, when performing the broadcast transmission, the above-described F-code is transmitted attached to the image information, to the transmission destination regarding which the image information that is the transmission object information has been transmitted by the facsimile transmission functions at the time of the broadcast transmission (facsimile device 4). Thus, this F-code is annunciated to the transmission destination. Accordingly, the transmission destination that has received this broadcast of the F-code can recognize the storage location of the transmission results table 1061 from this F-code, and can recognize that the transmission results table 1061 is stored in the bulletin board memory box (transmission report storage unit 1002). When a viewing request (transmission request) using this F-code is performed at the transmission destination that has received annunciation of the F-code, the F-code attached to this viewing request and the F-code attached to the transmission results table 1061 stored in the transmission report storage unit 1002 are matched against each other. If the F-codes agree, the transmission results table 1061 stored in the transmission report storage unit 1002 may be read out from the transmission report storage unit 1002 and transmitted by the facsimile transmission functions to the transmission destination that has made the viewing request, which is so-called polling transmission. At this time, the transmission results table 1061 is converted into information in increments of pages, in the same way as image information, and thus transmitted. Note that the F-code can also be annunciated by other methods such as by manual email transmission, telephone communication, or the like. In this case as well, the transmission destination that has received the annunciation can obtain the transmission results table 1061 by making a viewing request using the F-code.

Also, an email describing the link destination of the NAS folder 1101 where the transmission results table 1061 is stored is transmitted to the transmission destination to which the image information has been transmitted by the email transmission functions at the time of broadcast transmission (email address recipient). That is to say, the link destination of the NAS folder 1101 is annunciated to the transmission destination as storage information representing the storage location of the transmission results table 1061. Accordingly, the transmission destination that has received this annunciation can recognize that the transmission results table 1061 is stored in the NAS folder 1101, from the link destination of the NAS folder 1101 relating to this annunciation. The transmission destination that has received the annunciation can make a viewing request, which is to access the link destination of the NAS folder 1101, and thereby can read out the transmission results table 1061 stored in the NAS folder 1101. Note that annunciation of the link destination of the NAS folder 1101 to the transmission destination may be performed by describing the link destination of the NAS folder 1101 in the email transmitted at the time of broadcast transmission.

Further, with regard to transmission destinations where the image information has been transmitted by scanner transmission functions at the time of broadcast transmission (folder of PC 5), annunciation of the link destination of the above-described NAS folder 1101 is performed in a case where an optional email address is registered beforehand as a hyperlink destination. In more detail, an email describing the hyperlink destination of the NAS folder 1101 is transmitted to the email address recipient of the hyperlink destination. Accordingly, the link destination of the NAS folder 1101 is annunciated to the transmission destination as storage information representing the storage location of the transmission results table 1061. Thus, the transmission destination that has received this annunciation can recognize that the transmission results table 1061 is stored in the NAS folder 1101, from the link destination of the NAS folder 1101 regarding this annunciation. The transmission destination that has received the annunciation can make a viewing request, which is to access the link destination of the NAS folder 1101, and thereby can read out the transmission results table 1061 stored in the NAS folder 1101.

According to the transmission report notification function in the viewing location notification mode, the transmission results table 1061 is not uniformly transmitted to all transmission destination, but rather the transmission results table 1061 is only transmitted to transmission destinations that have made a viewing request. Accordingly, the transmission destinations can recognize other transmission destinations by making viewing requests whenever suitable.

The recipient setting unit 101 sets transmission destinations for broadcast transmission, for the broadcast transmission functions and the transmission report notification functions that are accessory thereto. In more detail, upon the operating unit 131 accepting a user operation to set an optional transmission destination to serve as the other party of broadcast transmission in a facsimile mode corresponding to the above-described facsimile transmission function, the recipient setting unit 101 response by setting this optional transmission destination as the other part of broadcast transmission. This setting of the transmission destination is performed by temporarily storing information of this transmission destination (facsimile No., email address, folder information) in the transmission report storage unit 1002. Note that the procedures for user operations performed when setting the transmission destination includes a procedure of selecting an optional transmission destination from a recipient list registered beforehand, and a procedure of directly inputting information of the optional transmission destination. This is not restricted to the facsimile mode, and operations can be performed in the same way in a scanner mode corresponding to the scanner transmission functions as well. These user operation procedures will be described later in detail.

Upon the operating unit 131 accepting a user operation instructing start of broadcast transmission in a state where a document is set on the above-described contact glass or the document conveying device 121, the transmission information setting unit 102 response by causing reading unit 12 to perform image reading processing. The transmission information setting unit 102 then temporarily stores the document image data, obtained by the image reading processing by the reading unit 12, in the transmission information storage unit 1001 as image information to serve as transmission object information. Note that in a case where a facsimile No. is included in transmission destinations set as the other party of broadcast transmission by the recipient setting unit 101, this image information is stored in the transmission information storage unit 1001 upon having been converted into image information in page increments, corresponding to the facsimile transmission function. In a case where an email address or folder information is included in transmission destinations set as the other party of broadcast transmission, this image information is stored in the transmission information storage unit 1001 upon having been converted into a file of a format following the aforementioned communication stipulations.

Upon storage of image information relating to all documents in the transmission information storage unit 1001 having ended, the transmission processing unit 103 reads out the image information stored in the transmission information storage unit 1001 and performs broadcast transmission processing of sequentially transmitting to the transmission destinations. In a case where the transmission destination is a facsimile device 4 in this broadcast transmission processing, image information in page increments, corresponding to the facsimile transmission function, is input to the facsimile communication unit 201. The facsimile communication unit 201 transmits this image information in page increments by the facsimile transmission function, i.e., transmits to the facsimile device 4 of the transmission destination via the public telephone line 2. Also, in a case where the transmission destination is an email address recipient, image information converted into a file of the aforementioned format is input to the network communication unit 301. The network communication unit 301 transmits this image information converted into a file by the email transmission function. That is to say, the network communication unit 301 attaches the image converted into this file to an email, and transmits this email to the email address recipient of the transmission destination via the network 3. Further, in a case where the transmission destination is a folder of a PC 5 as well, image information converted into a file of the aforementioned format is input to the network communication unit 301. The network communication unit 301 transmits this image information converted into a file by the scanner transmission function, i.e., transmits to the folder of the PC 5 of the transmission destination via the network 3.

Note that the facsimile communication unit 201 is an example of a facsimile transmission device according to the present disclosure. The network communication unit 301 is an example of a network transmission device according to the present disclosure. The part of the network communication unit 301 that relates to the email transmission functions is an example of an email transmission device according to the present disclosure, and the part of the network communication unit 301 relating to scanner transmission functions is an example of a scanner transmission device according to the present disclosure. Further, the transmission processing unit 103 is an example of a broadcast transmission device according to the present disclosure.

The reservation table notification unit 105 of the transmission report notification unit 104 handles the transmission reservation notification mode in the transmission report notification functions. That is to say, the reservation table notification unit 105 reads out, from the transmission report storage unit 1002, information of transmission destinations set by the recipient setting unit 101 as the other party of broadcast transmission, and compiles a transmission reservation table 1051. The reservation table notification unit 105 then formats this transmission reservation table 1051 into information corresponding to the respective transmission destinations, at the time of broadcast transmission processing by the transmission processing unit 103. Thereupon, the reservation table notification unit 105 correlates the formatted transmission reservation table 1051 with the image information, so as to be transmitted along with the image information. Accordingly, the transmission reservation table 1051 is transmitted to the transmission destinations along with the image information at the time of broadcast transmission processing. This reservation table notification unit 105 is an example of a transmission reservation table compiling device according to the present disclosure.

The results table notification unit 106 handles the results table transmission mode in the transmission report notification functions. That is to say, the results table notification unit 106 reads out, from the transmission report storage unit 1002, information of transmission destinations set by the recipient setting unit 101 as the other party of broadcast transmission, and compiles a transmission results table 1061. The results table notification unit 106 also monitors the results of broadcast transmission processing by the transmission processing unit 103, and confirms the results of transmission-successful/failed of image information to each transmission destination. The results table notification unit 106 includes the transmission-successful/failed results in the transmission results table 1061. Thereupon, after the broadcast transmission processing by the transmission processing unit 103 has ended, the results table notification unit 106 transmits the transmission results table 1061 to the same transmission destinations as when performing the broadcast transmission. At this time, the results table notification unit 106 converts the transmission results table 1061 into information of formats corresponding to the respective transmission destinations. This results table notification unit 106 is an example of a transmission results table compiling device according to the present disclosure.

The viewing processing unit 107 handles the viewing location notification mode in the transmission report notification functions. That is to say, the viewing processing unit 107 also compiles a transmission results table 1061 and includes transmission-successful/failed results, regarding transmission of image information to the transmission destinations, in the transmission results table 1061, in the same way as the results table notification unit 106. The viewing processing unit 107 then stores the transmission results table 1061 in the transmission report storage unit 1002 serving as a bulletin board memory box. At this time, the viewing processing unit 107 stores the F-code in the transmission report storage unit 1002 in a state where the F-code has been correlated with the transmission results table 1061. The viewing processing unit 107 also stores the transmission results table 1061 in the NAS folder 1101 within the HDD 110.

Having done so, the viewing processing unit 107 annunciates, to the transmission destinations, storage information representing the storage location of the transmission results table 1061. In more detail, as described earlier, with regard to transmission destinations where the image information that is transmission object information has been transmitted by the facsimile transmission functions at the time of broadcast transmission (facsimile device 4), this broadcast transmission is performed in a state where an F-code serving as storage information is attached to the image information. With regard to transmission destinations where the image information has been transmitted by the email transmission functions at the time of broadcast transmission (email address recipient), an email is transmitted that describes the link destination of the NAS folder 1101 as storage information. With regard to transmission destinations where the image information has been transmitted by the scanner transmission functions at the time of broadcast transmission (folder of PC 5), in a case where an optional email address has been registered as a hyperlink destination beforehand, an email is transmitted to the email address recipient of that hyperlink destination, describing the link destination of the NAS folder 1101 as storage information.

Upon receiving a viewing request from any transmission destination, the viewing processing unit 107 responds by transmitting the transmission results table 1061 to the transmission destination that has made this viewing request. At this time, the viewing processing unit 107 formats the transmission results table 1061 in accordance with the respective transmission destinations, and transmits. This viewing processing unit 107 is an example of an annunciation device according to the present disclosure. The viewing processing unit 107 also is an example of the transmission results table compiling device according to the present disclosure. The transmission report notification unit 104 including the reservation table notification unit 105, results table notification unit 106, and viewing processing unit 107 is an example of a transmission report notification device according to the present disclosure.

Figure 4A:
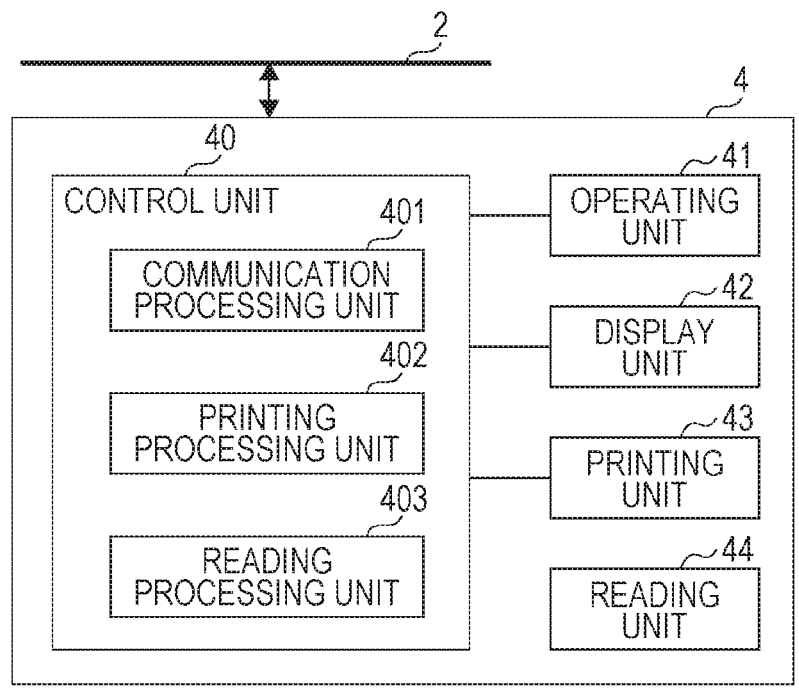
FIGS. 4A and 4B are block diagrams illustrating electric configurations of portions relating to broadcast transmission of a facsimile device and an information processing device, respectively, which are external devices according to the first embodiment.

The facsimile device 4 and PC 5 will now be described with reference to FIGS. 4A and 4B. Of these, the facsimile device 4 has a control unit 40, as illustrated in FIG. 4A. The control unit 40 includes a microcontroller having a CPU, that is omitted from illustration. An operating unit 41, a display unit 42, a printing unit 43, and a reading unit 44 are connected to this control unit 40. The operating unit 41 accepts input instructions from the operator of the facsimile device 4, i.e., user operations. The display unit 42 has a display screen, and displays visual information such as images, text, and so forth, in accordance with control of the control unit 40, on the display screen as suitable. The printing unit 43 forms images, in increments of pages, on sheets that are omitted from illustration, following image information received via the public telephone line 2, thus performing printing. The reading unit 44 reads images of a document omitted from illustration in a case where the facsimile device 4 is the transmitting side. The control unit 40 functions as a communication processing unit 401, a printing processing unit 402, and a reading processing unit 403, by executing control programs stored in a storage unit that is omitted from illustration. The communication processing unit 401 controls polling reception with regard to polling transmission using the F-code described above, besides performing transmission/reception of image information. The printing processing unit 402 controls the printing unit 43 so that the printing unit 43 prints images and so forth following the image information received by the communication processing unit 401. The reading processing unit 403 controls the reading unit 44 so that the reading unit 44 reads images of documents. Image data of documents read by the reading unit 44 are input to the communication processing unit 401.

Figure 4B:
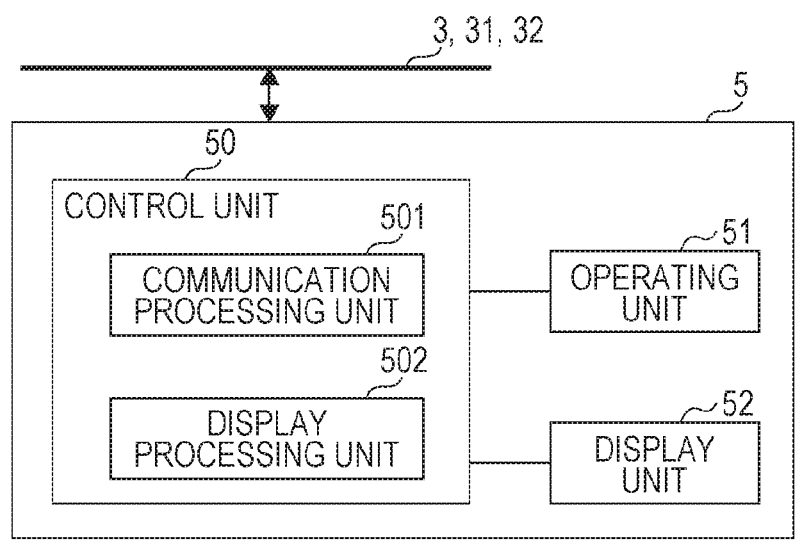

The PC 5 has a control unit 50, as illustrated in FIG. 4B. This control unit 50 includes a microcontroller having a CPU that is omitted from illustration. An operating unit 51 and a display unit 52 are connected to this control unit 50. The operating unit 51 accepts input instructions from the operator of the PC 5, i.e., user operations. The display unit 52 has a display screen, and displays visual information such as images, text, and so forth, in accordance with control of the control unit 50, on the display screen as suitable. The control unit 50 functions as a communication processing unit 501 and a display processing unit 502 by executing control programs stored in a storage unit omitted from illustration. The communication processing unit 501 performs viewing request processing as to the NAS folder 1101 of the image forming device 1, besides performing transmission/reception of image information. The display processing unit 502 controls the display unit 52 so as to display various types of information such as images following image information received by the communication processing unit 501 on the display unit 52. Note that the PC 5 functions as an external device of the image forming device 1, and also has various types of information processing functions such as document creation functions and so forth.

Figure 5:
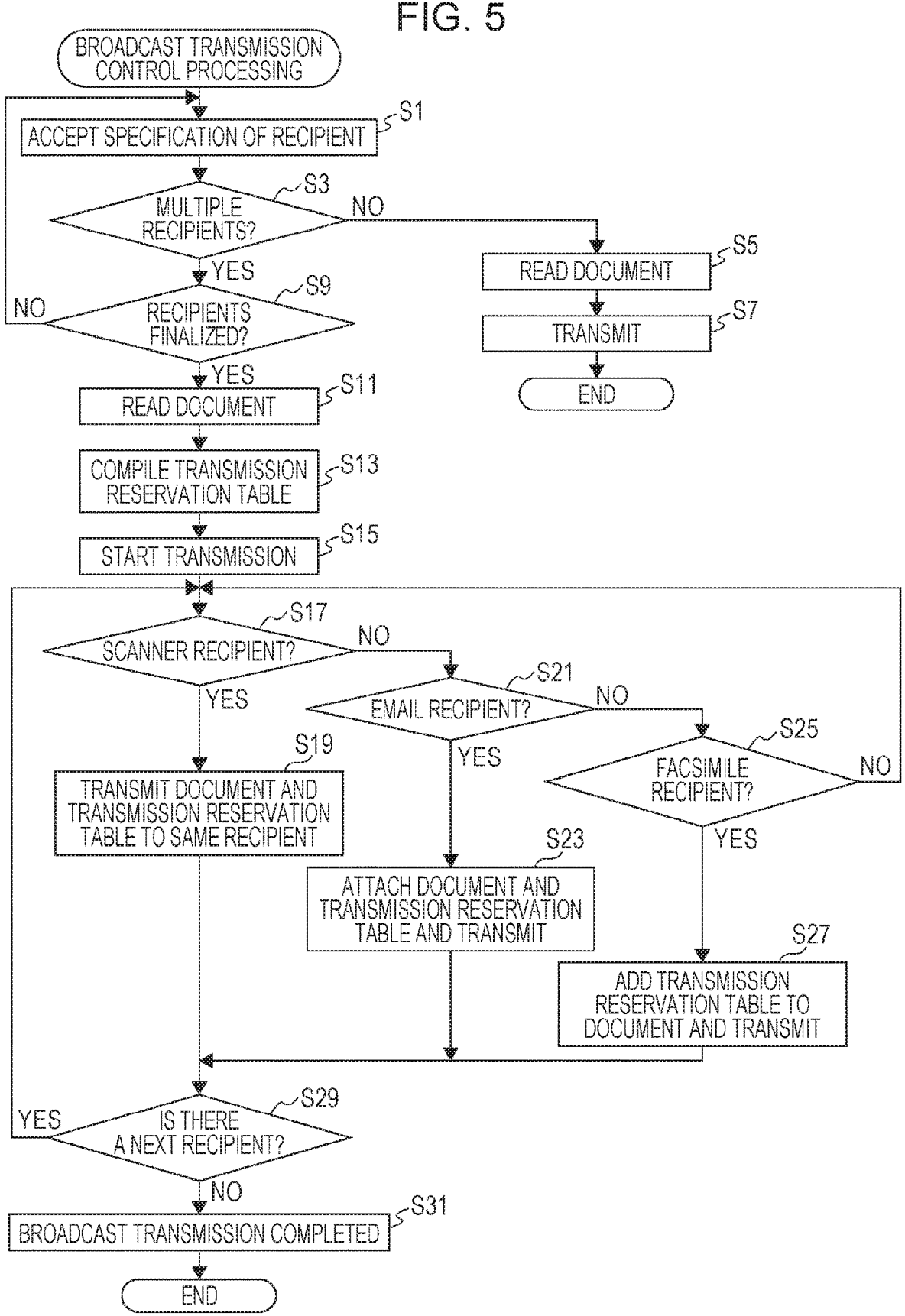
FIG. 5 is a flowchart illustrating an example of broadcast transmission control processing in a transmission reservation notification mode that a control unit of the image forming device according to the first embodiment executes.

Next, operations of the control unit 10 of the image forming device 1 to realize the above-described broadcast transmission functions and transmission report notification functions will be described. The operations of the control unit 10 differ depend on whether in the transmission reservation notification mode or the transmission results notification mode of the transmission report notification functions. For example, in a case of being in the transmission reservation notification mode, the control unit 10 performs broadcast transmission control processing in accordance with the transmission reservation notification mode following the procedures illustrated in the flowchart in FIG. 5, following an information transmission control program.

First, in step S1, the control unit 10 accepts specification of a transmission destination (recipient). The control unit 10 then advances the flow to step S3, and determines whether or not the number of specified transmission destinations accepted in step S1 is multiple or not. In a case where the number of specified transmission destinations is singular (just one, i.e., NO in S3), which is to say in a case of normal transmission that is not broadcast transmission but simply transmitting to one transmission destination, the control unit 10 advances the flow to step S5. In step S5, the control unit 10 causes the reading unit 12 to perform image reading processing so that the reading unit 12 reads images of a document. The control unit 10 then advances the flow to step S7, and transmits the image information to just one transmission destination. The control unit 10 ends the broadcast transmission control processing at the point of having executed this step S7.

On the other hand, in the above-described step S3, in a case where the number of specified transmission destinations received in step S1 is multiple (YES in S3), the control unit 10 advances the flow to step S9. In step S9, the control unit 10 then determines whether or not all transmission destinations have been finalized. In a case where all transmission destinations have not been finalized (NO in S9), which is to say in a case where there are more transmission destinations to be accepted, for example, the control unit 10 returns the flow to step S1. On the other hand, in a case where all transmission destinations have been finalized (YES in S9), the control unit 10 advances the flow from step S9 to step S11.

In step S11, the control unit 10 causes the reading unit 12 to execute image reading processing, so that the reading unit 12 reads images of the document. The control unit 10 then advances the flow to step S13, and compiles a transmission reservation table 1051. Thereafter, the control unit 10 advances the flow to step S15 and starts transmission, i.e., starts broadcast transmission processing.

When starting the broadcast transmission processing, the control unit 10 advances the flow to step S17 and determines whether the transmission destination is a transmission destination by the scanner transmission functions (scanner recipient). In a case where the transmission destination is a transmission destination by the scanner transmission functions, for example (YES in S17), the control unit 10 advances the flow to step S19, and transmits the image information that is the transmission object information, and the transmission reservation table 1051, to the same transmission destination. The control unit 10 then advances the flow to step S29.

On the other hand, in a case where the transmission destination is not a transmission destination by the scanner transmission functions (NO in S17), the control unit 10 advances the flow to step S21 and determines in step S21 whether the transmission destination is a transmission destination by the email transmission functions (email recipient). In a case where the transmission destination is a transmission destination by the email transmission functions, for example (YES in S21), the control unit 10 advances the flow to step S23, and attaches the image information that is the transmission object information, and the transmission reservation table 1051, to an email, and transmits to this transmission destination. The control unit 10 then advances the flow to step S29.

Further, in a case where the transmission destination is not a transmission destination by the email transmission functions (NO in S21), the control unit 10 advances the flow to step S25 and determines in step S25 whether the transmission destination is a transmission destination by the facsimile transmission functions (facsimile recipient). In a case where the transmission destination is a transmission destination by the facsimile transmission functions, for example (YES in S25), the control unit 10 advances the flow to step S27. In step S27, the control unit 10 attaches the transmission reservation table 1051 after a predetermined page of image information that is transmission object information, and transmits this to the transmission destination. The control unit 10 then advances the flow to step S29. Note that in step S25, in a case where the transmission destination is not a transmission destination by the facsimile transmission functions (NO in S25), the control unit 10 returns the flow to step S17.

In step S29, the control unit 10 determine whether or not there is a next transmission destination, i.e., whether or not the image information and transmission reservation table 1051 have been transmitted to all transmission destinations. In a case where there is a next transmission destination for example (YES in S29), the control unit 10 returns the flow to step S17. On the other hand, in a case where there is no next transmission destination in step S29 (NO in S29), the control unit 10 advances the flow to step S31, and completes the broadcast transmission processing. Upon executing this step S31, the control unit 10 ends the broadcast transmission control processing.

Figure 6:
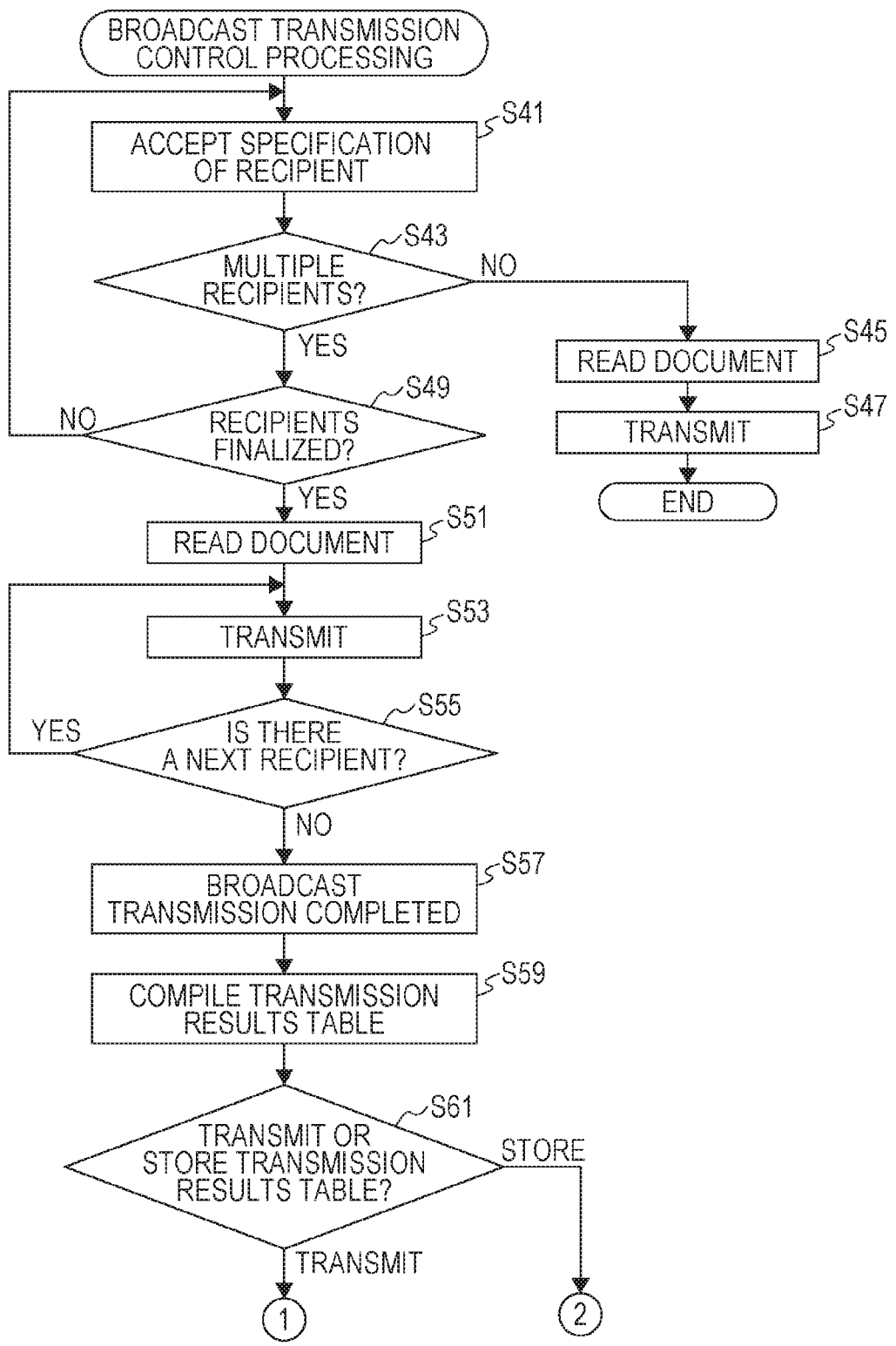
FIG. 6 is a flowchart illustrating part of an example of broadcast transmission control processing in a transmission results notification mode that the control unit of the image forming device according to the first embodiment executes.
Figure 7:
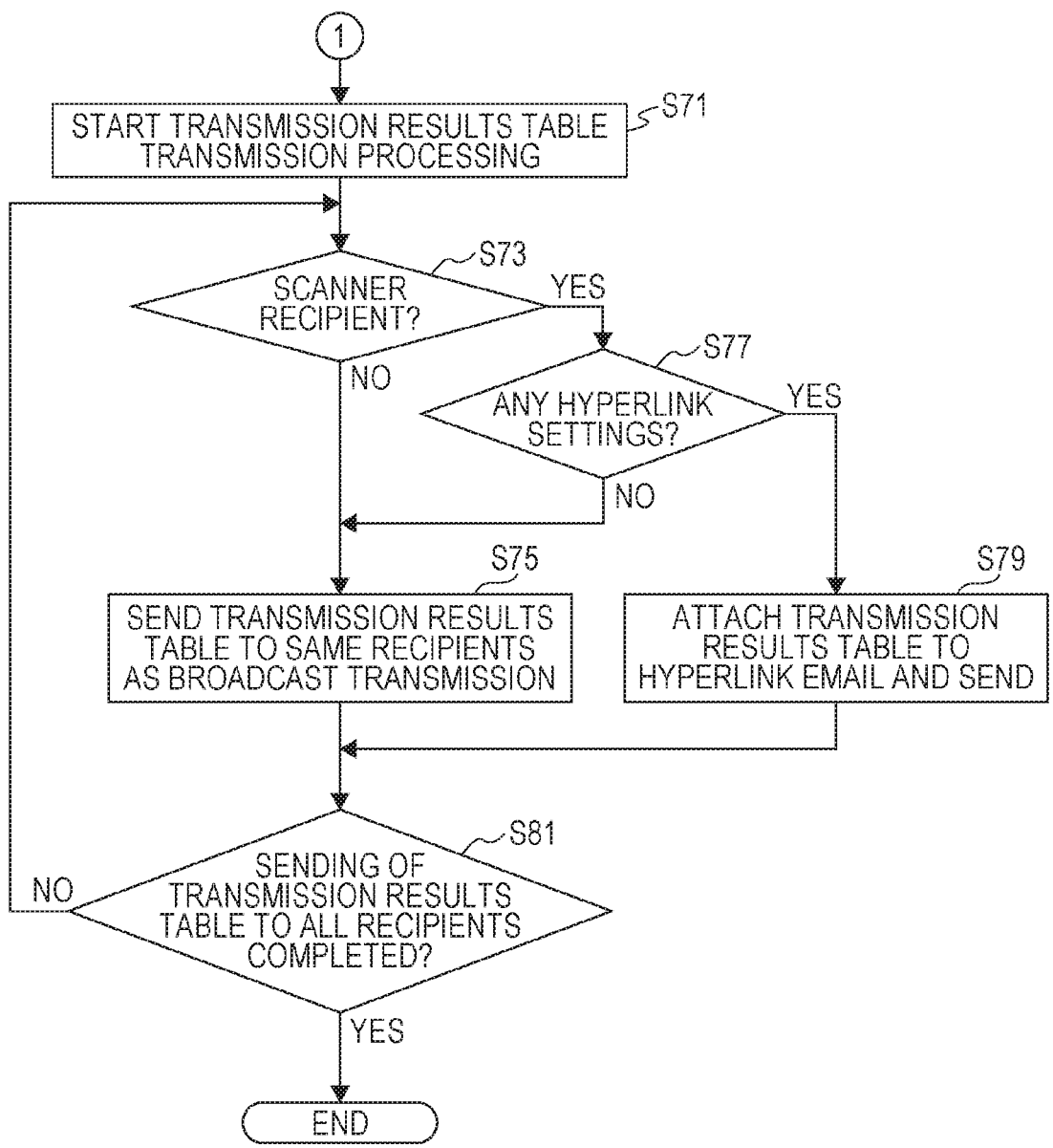
FIG. 7 is a flowchart illustrating another part of the example of broadcast transmission control processing in the transmission results notification mode according to the first embodiment.
Figure 8:
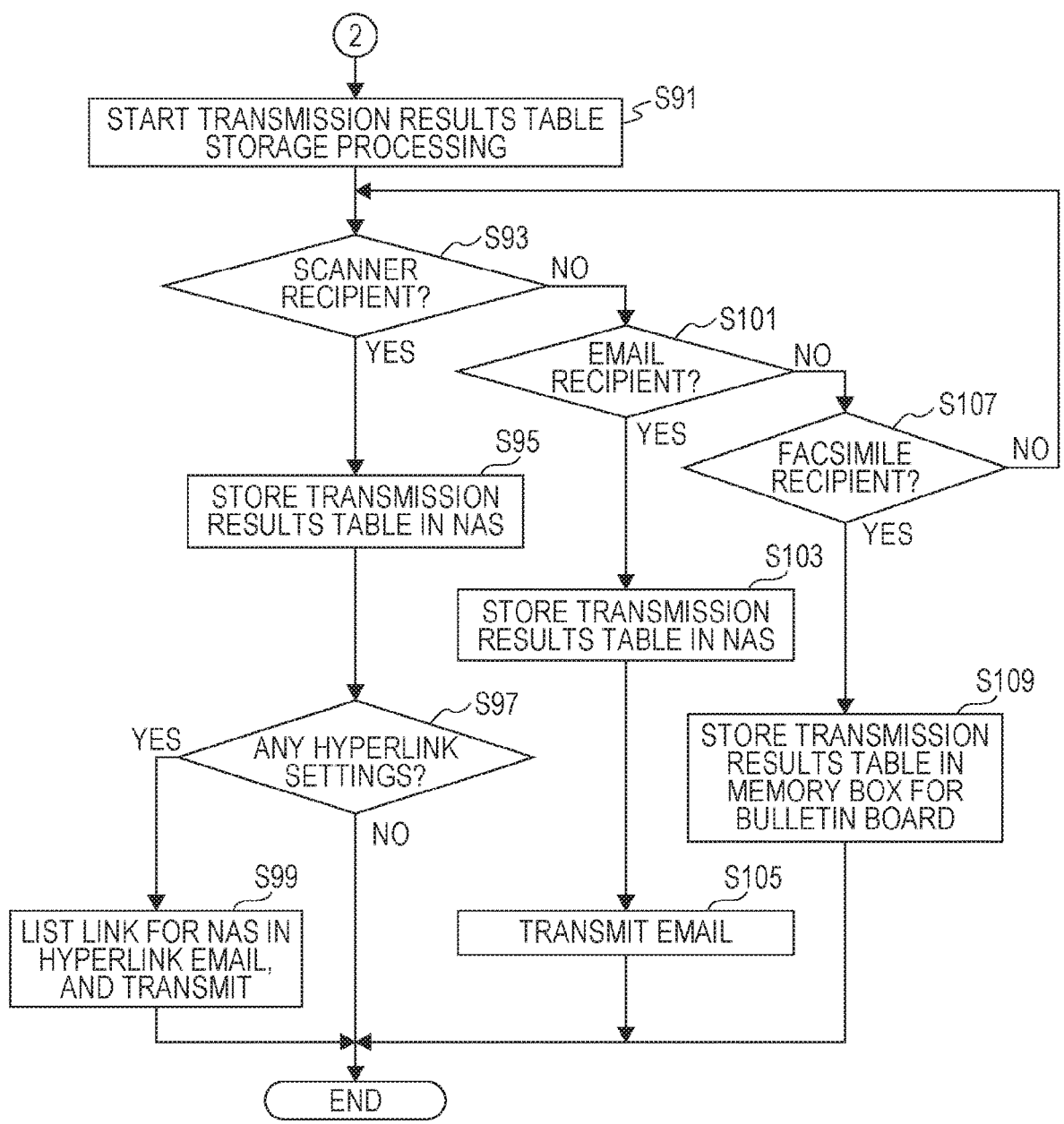
FIG. 8 is a flowchart illustrating the remaining part of the example of broadcast transmission control processing in the transmission results notification mode according to the first embodiment.

Next, the operations of the control unit 10 in the transmission results notification mode will be described. In this case, the control unit 10 performs broadcast transmission control processing in accordance with the transmission results notification mode following the procedures illustrated in the flowchart in FIGS. 6 through 8, following the information transmission control program. Note that steps S41 through S51 in the broadcast transmission control processing according to the transmission results notification mode (FIG. 6) are the same as steps S1 through S11 in the above-described broadcast transmission control processing according to the transmission reservation notification mode (FIG. 5), so description thereof will be omitted.

In step S51, the control unit 10 causes the reading unit 12 to read images on the document, thereafter advances the flow to step S53, and transmits the image information that is transmission object information to the transmission destinations. At this time, the control unit 10 transmits image information with the above-described F-code attached to transmission destinations by the facsimile transmission functions. After executing this step S53, the control unit 10 advances the flow to step S55 and determines whether or not there is a next transmission destination, i.e., whether or not image information has been transmitted to all transmission destinations. In a case where there is a next transmission destination for example (YES in S55), the control unit 10 returns the flow to step S53. On the other hand, in a case where there is no next transmission destination (NO in S55), the control unit 10 advances the flow from step S55 to step S57.

In step S57, the control unit 10 completes the broadcast transmission processing. The control unit 10 then advances the flow to step S59, and compiles a transmission results table 1061. The control unit 10 further advances the flow to step S61, and determines which transmission results mode of the results table transmission mode and viewing location notification mode has been selected. That is to say, determination is made regarding whether to transmit the transmission results table 1061 to each transmission destination, or to store the transmission results table 1061 in preparation for an above-described viewing request. In a case of transmitting the transmission results table 1061 to the transmission destinations (TRANSMIT in S61), i.e., the results table transmission mode has been selected for the transmission results notification mode, the control unit 10 advances the flow to step S71.

In step S71, the control unit 10 starts processing to transmit the transmission results table 1061 to the transmission destinations. At this time, the control unit 10 advances the flow to step S73, and determines whether the transmission destination is a transmission destination by the scanner transmission functions (scanner recipient). In a case where the transmission destination is not a transmission destination by the scanner transmission functions, for example, which is to say that this transmission destination is a transmission destination by email transmission functions (email recipient) or a transmission destination by the facsimile transmission functions (facsimile recipient) (NO in S73), the control unit 10 advances the flow to step S75. In this step S75, the control unit 10 transmits the transmission results table 1061 to the same transmission destination as in the broadcast transmission. After executing this step S75, the control unit 10 advances the flow to step S81.

On the other hand, in a case where the transmission destination is a transmission destination by the scanner transmission functions (scanner recipient) in step S73 (YES in S73), the control unit 10 advances the flow to step S77. The control unit 10 then determines in this step S77 whether or not an email address has been set (registered) as a hyperlink destination for the transmission destination. In a case where no email address has been set as a hyperlink destination for the transmission destination (NO in S77), the control unit 10 advances the flow to step S75.

On the other hand, in a case where an email address has been set as a hyperlink destination for the transmission destination (YES in S77), the control unit 10 advances the flow to step S79. In step S79, the control unit 10 attaches the transmission results table 1061 to an email, and transmits this email to the email address recipient at the hyperlink destination. After executing this step S79, the control unit 10 advances the flow to step S81.

In step S81, the control unit 10 determines whether or not the transmission results table 1061 has been transmitted to all transmission destinations. Now, in a case where the transmission results table 1061 has not been transmitted to all transmission destinations yet, for example (NO in S81), the control unit 10 returns the flow to step S73. On the other hand, in a case where the transmission results table 1061 has been transmitted to all transmission destinations (YES in S81), the control unit 10 ends the broadcast transmission control processing.

Further, in a case of storing the transmission results table 1061 in step S61 described above, i.e., in a case where the viewing location notification mode has been selected for the transmission results notification mode (STORE in S61), the control unit 10 advances the flow to step S91.

In step S91, the control unit 10 starts processing to store the transmission results table 1061. At this time, the control unit 10 advances the flow to step S93, and determines whether the transmission destination is a transmission destination by the scanner transmission functions (scanner recipient). In a case where the transmission destination is a transmission destination by the scanner transmission functions for example (YES in S93), the control unit 10 advances the flow to step S95. In this S95, the control unit 10 stores the transmission results table 1061 in the NAS folder 1101 within the HDD 110. Further, the control unit 10 advances the flow to step S97.

In step S97, the control unit 10 determines whether or not an email address is set for the transmission destination as a hyperlink destination. In a case where no email address is set for the transmission destination as a hyperlink destination here, for example (NO in S97), the control unit 10 ends the control processing. On the other hand, in a case where an email address is set for the transmission destination as a hyperlink destination (YES in S97), the control unit 10 advances the flow to step S99. In this step S99, the control unit 10 transmits an email describing the link destination of the NAS folder 1101 to the email address recipient at the hyperlink destination. After executing this step S99, the control unit 10 ends the broadcast transmission control processing.

In a case where the transmission destination is not a transmission destination by the scanner transmission functions in the above-described step S93 (NO in S93), the control unit 10 advances the flow to step S101. In this step S101, the control unit 10 determines whether or not the transmission destination is a transmission destination by the email transmission functions (email recipient). In a case where the transmission destination is a transmission destination by the email transmission functions here, for example (YES in S101), the control unit 10 advances the flow to step S103, and stores the transmission results table 1061 in the NAS folder 1101. The control unit 10 then advances the flow to step S105, and transmits an email describing the link destination of the NAS folder 1101 to the transmission destination. Upon executing this step S105, the control unit 10 ends the broadcast transmission control processing.

Further, in a case where the transmission destination is not a transmission destination by the email transmission functions (NO in S101), the control unit 10 advances the flow to step S107. In this step S107, the control unit 10 determines whether or not the transmission destination is a transmission destination by the facsimile transmission functions (facsimile recipient). In a case where the transmission destination is a transmission destination by the facsimile transmission functions here, for example (YES in S107), the control unit 10 advances the flow to step S109. In this step S109, the control unit 10 stores the transmission results table 1061 in the transmission report storage unit 1002 serving as a bulletin board memory box. At this time, the control unit 10 stores the F-code in the transmission report storage unit 1002 in a manner with the F-code correlated with the transmission results table 1061. Upon executing this step S109, the control unit 10 ends the broadcast transmission control processing.

Figure 9:
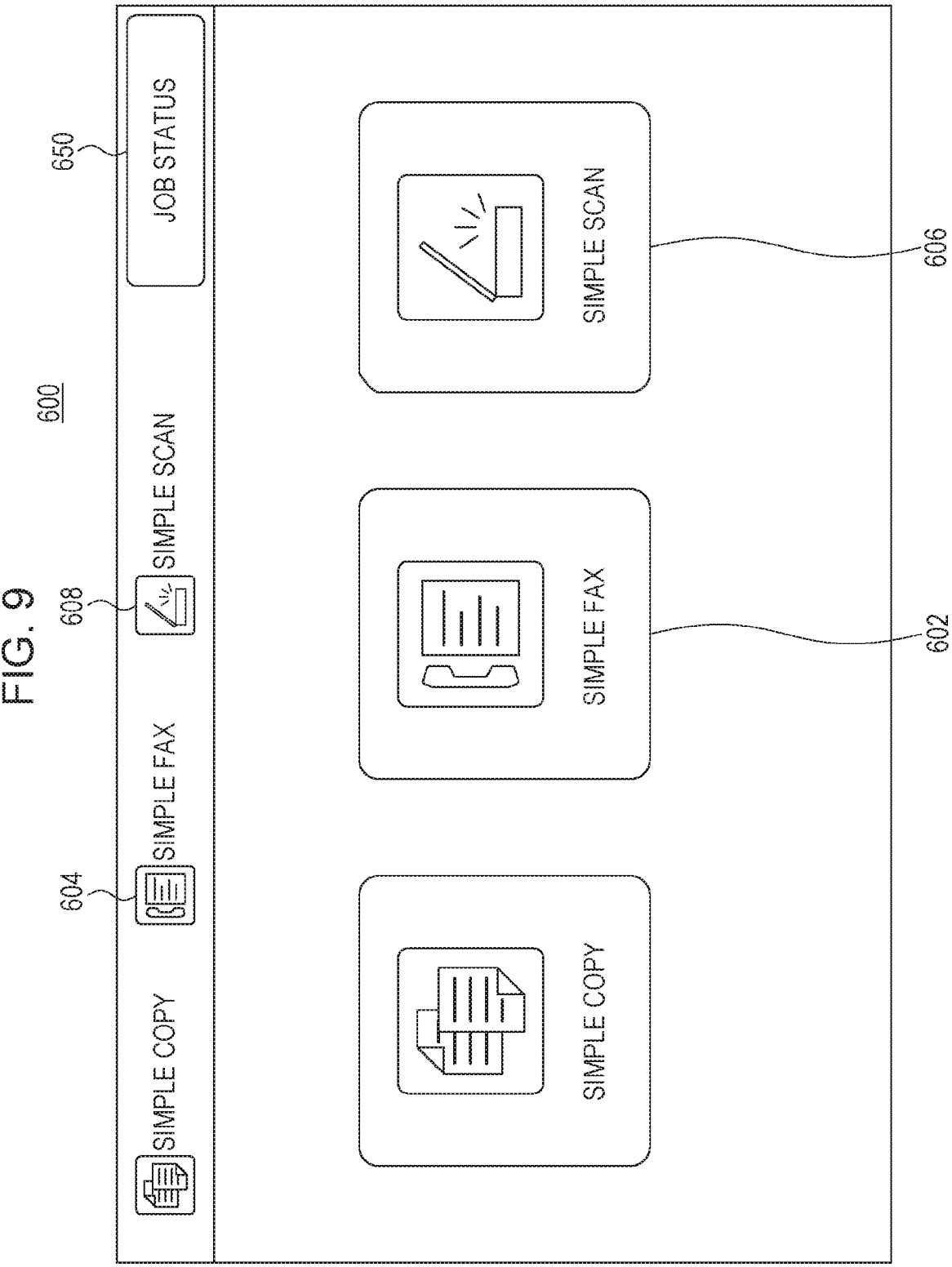
FIG. 9 is a diagram illustrating an example of a home screen displayed on a display screen of a display unit of the image forming device according to the first embodiment.
Figure 10:
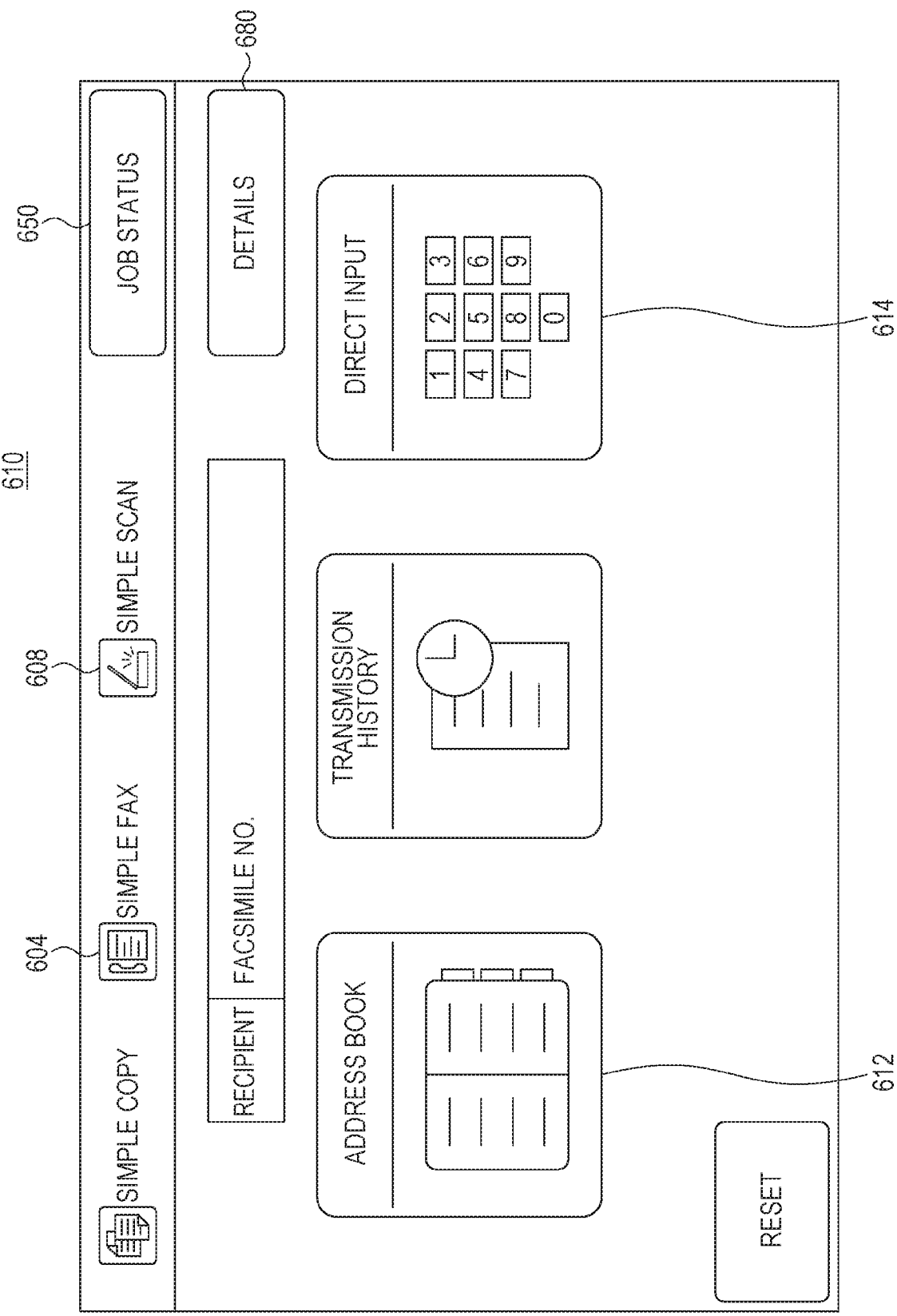
FIG. 10 is a diagram illustrating an example of a simple fax screen displayed on the display screen of the display unit of the image forming device according to the first embodiment.

Now, the facsimile mode, for example, is selected to set a transmission destination in broadcast transmission, as described earlier. In detail, in a state where a home screen 600 such as illustrated in FIG. 9 is displayed on the display unit 132, a "simple fax" button 602 is pressed (touched) by user operations. This brings up a simple fax screen 610 such as illustrated in FIG. 10, on the display screen of the display unit 132, instead of the home screen 600. Thus, the facsimile mode is selected. Note that in a case where a "simple fax" icon 604 at the top of the home screen 600 illustrated in FIG. 9 is pressed, the facsimile mode is selected in the same way. That is to say, pressing this icon 604 brings up the simple fax screen 610 illustrated in FIG. 10 on the display unit 132 instead of the home screen 600.

Figure 11:
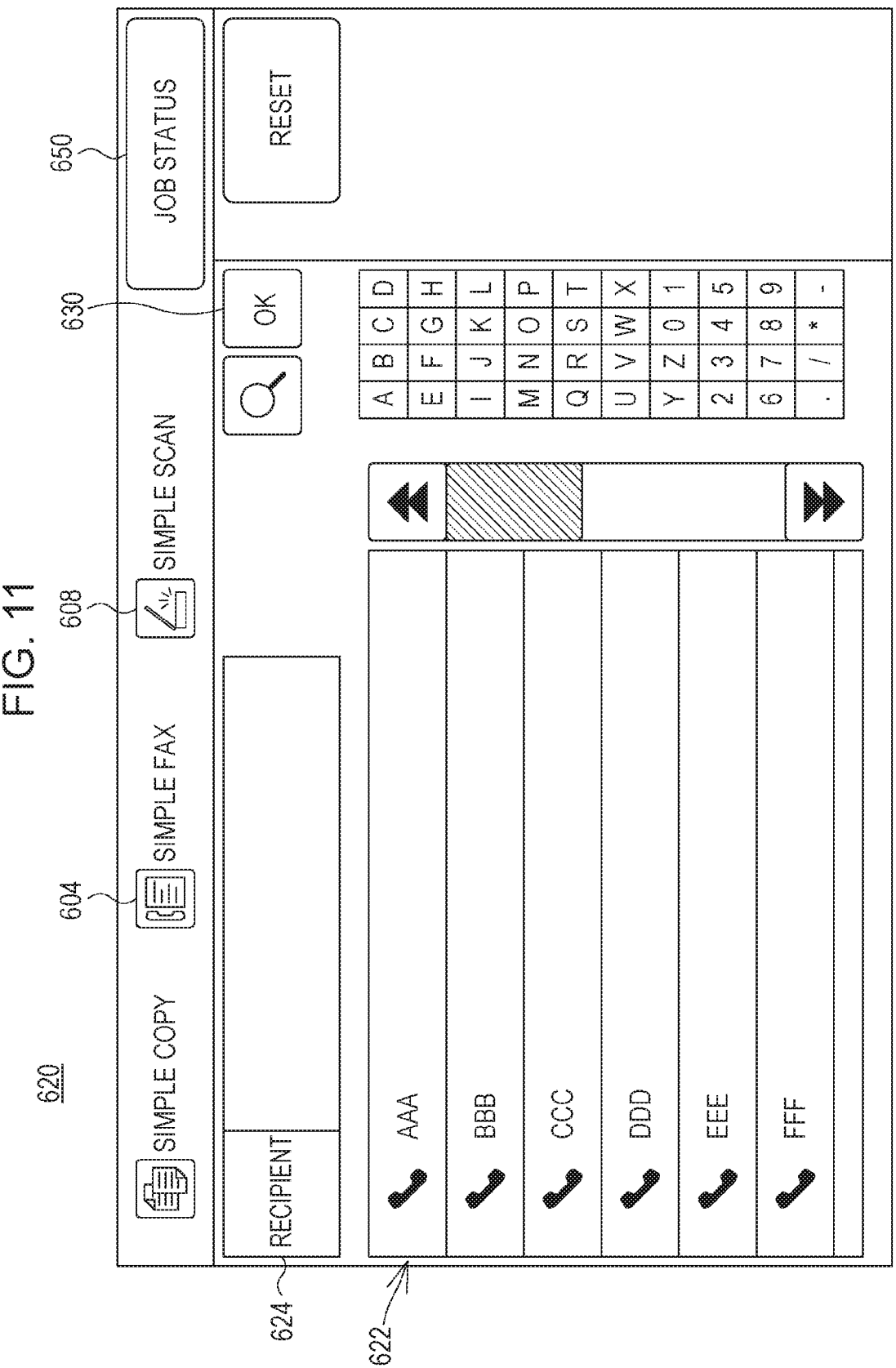
FIG. 11 is a diagram illustrating an example of a recipient settings screen displayed on the display screen of the display unit of the image forming device according to the first embodiment.
Figure 12:
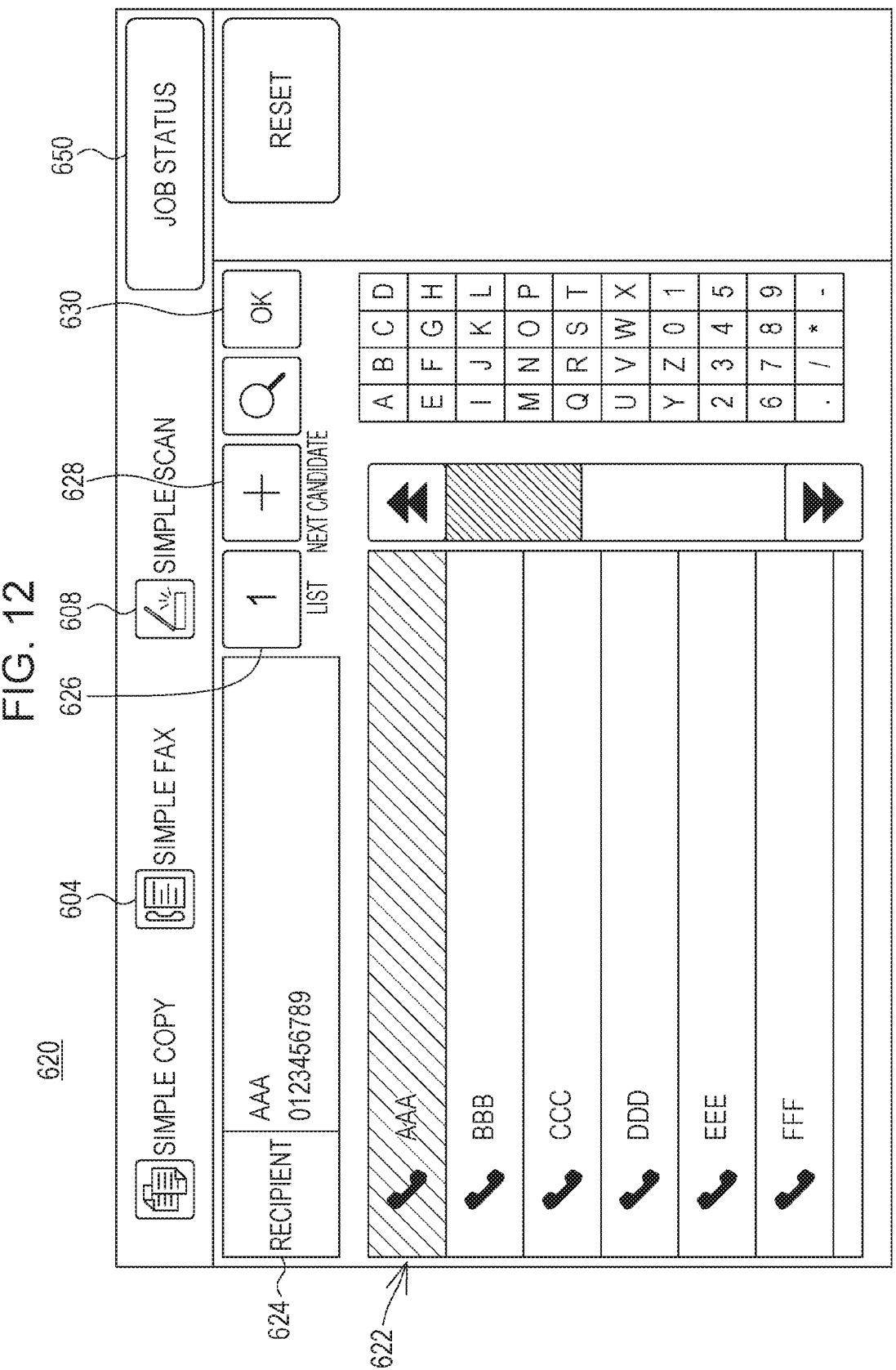
FIG. 12 is a diagram illustrating an example where the state of the recipient settings screen has changed.

When an "address book" button 612 is pressed in the simple fax screen 610, a recipient setting screen 620 such as illustrated in FIG. 11 is displayed on the display unit 132 instead of the simple fax screen 610. Thus, recipient setting screen 620 includes a transmission destination list 622 representing the contents of a recipient list registered beforehand. When any transmission destination name (more particularly, a field where the transmission destination name is displayed) is pressed in this transmission destination list 622, that transmission destination is set as a transmission destination candidate. For example, if the transmission destination name "AAA" at the top of the transmission destination list 622 is pressed, the recipient setting screen 620 transitions to a state such as illustrated in FIG. 12. That is to say, the field where the transmission destination name "AAA" is displayed modified one way or another, such as some sort of color being applied thereto. Information of the transmission destination candidate that has been set is displayed in a "recipient" field 624 above the transmission destination list 622. Also, the total number of transmission destination candidates that have been set is displayed in a "list" button 626 to the right side of the "recipient" field 624. Pressing a "next candidate" button 628 that is to the right side of the "list" button 626 enables the next transmission destination candidate to be set.

Figure 13:
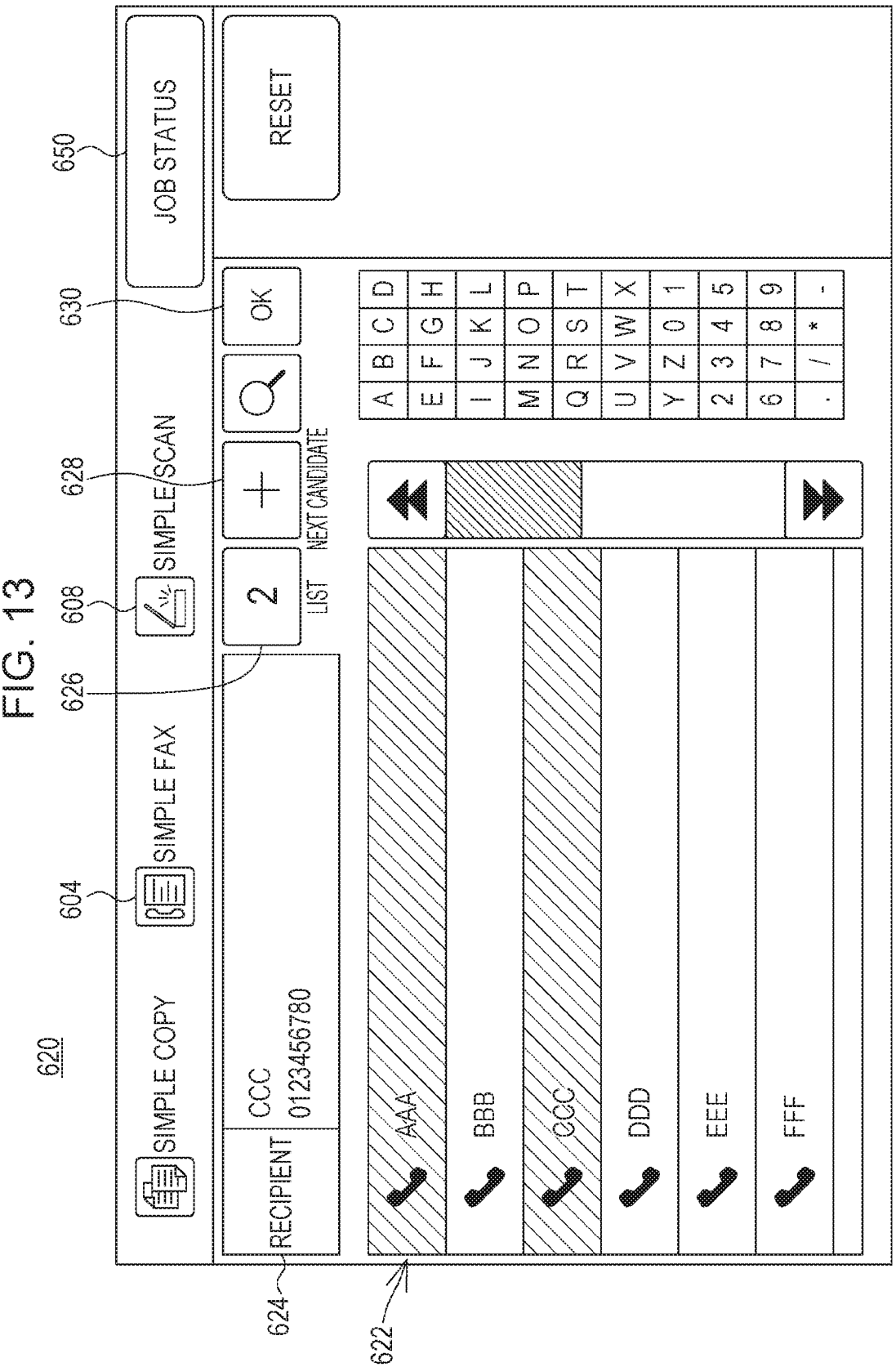
FIG. 13 is a diagram illustrating another example where the state of the recipient settings screen has changed.
Figure 14:
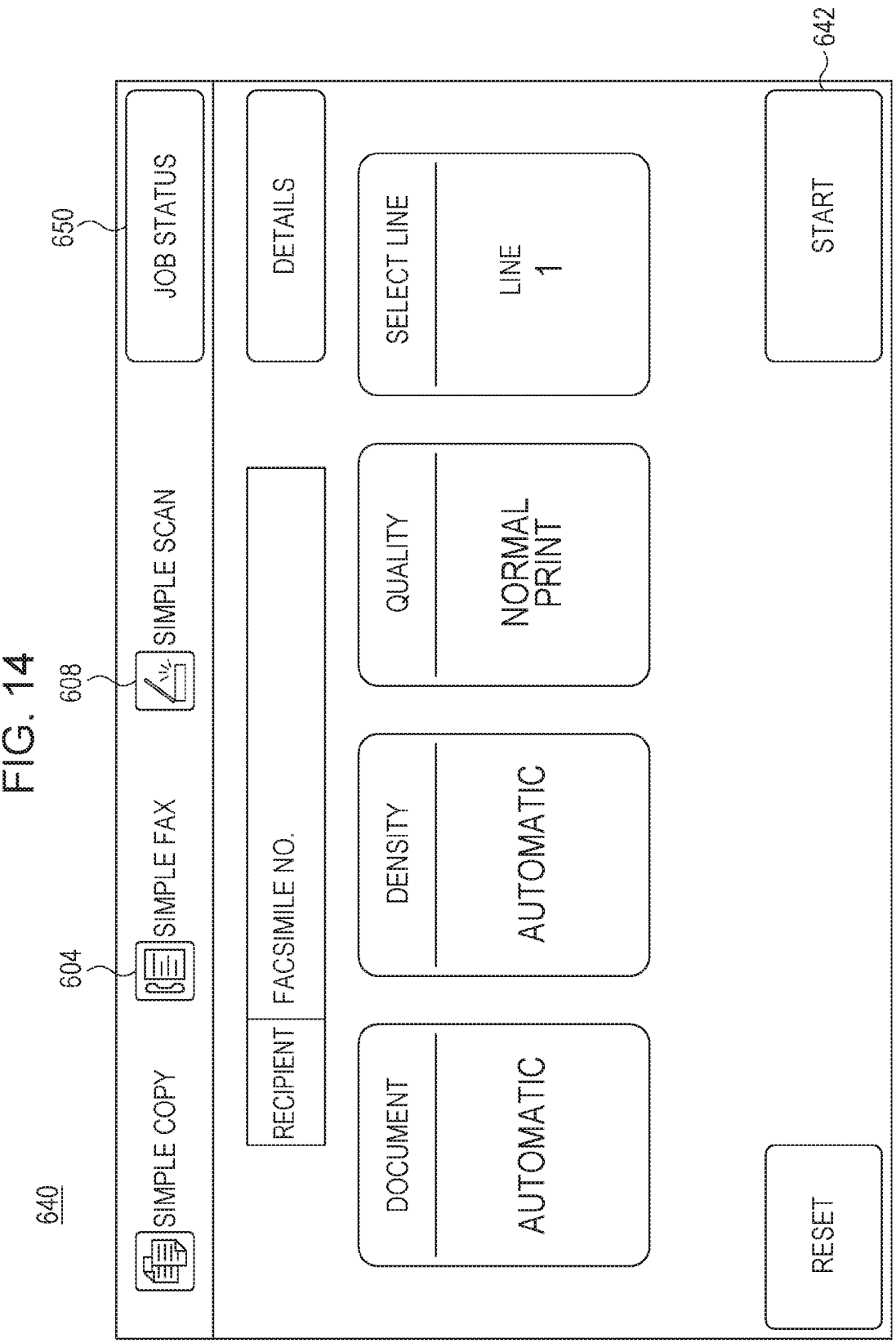
FIG. 14 is a diagram illustrating an example of a transmission start screen displayed on the display screen of the display unit of the image forming device according to the first embodiment.

FIG. 13 illustrates a state where a transmission destination candidate "CCC" has been added in addition to the aforementioned transmission destination candidate "AAA". In the recipient setting screen 620 illustrated in FIG. 13, the field where the transmission destination name "CCC" is displayed modified one way or another. Also, information of the transmission destination candidate that has been newly set is displayed in the "recipient" field 624. Further, the total number of transmission destination candidates that have been set is displayed in the "list" button 626. Pressing the "next candidate" button 628 enables the next transmission destination candidate to be set. On the other hand, when an "OK" button 630 is pressed, the transmission destinations set as transmission destination candidates are formally set as formal transmission destinations. In this case, a transmission start screen 640 such as illustrated in FIG. 14 is displayed on the display screen of the display unit 132 instated of the recipient setting screen 620 illustrated in FIG. 13.

Figure 15:
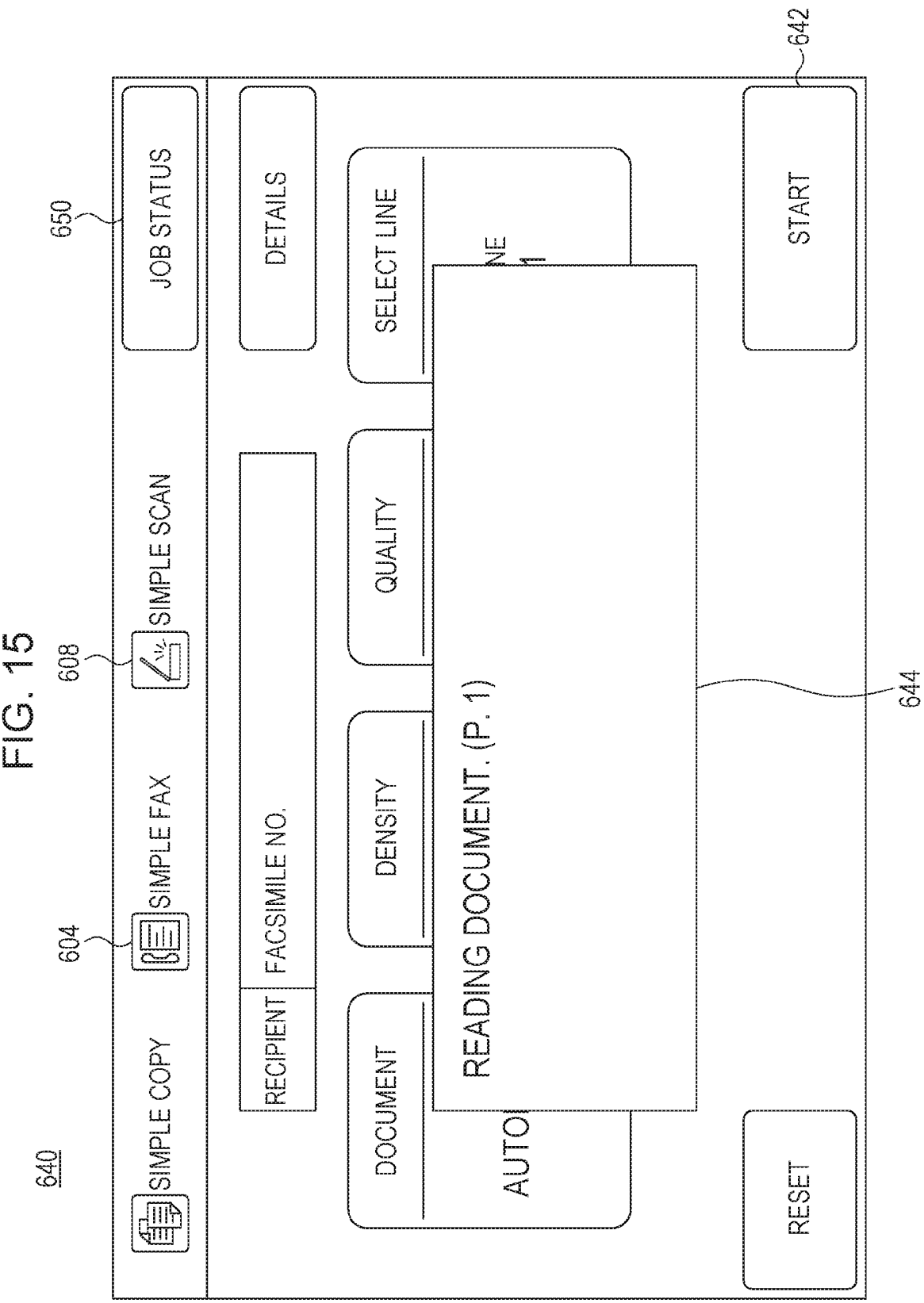
FIG. 15 is a diagram illustrating an example of a message image displayed on a transmission start screen.

In a state where the transmission start screen 640 is displayed, and a document is set on the aforementioned contact glass or the document conveying device 121, and a "start" button 642 in the transmission start screen 640 is pressed, reading of the document is started. That is to say, image reading processing by the reading unit 12 is started. Thereupon, a message image 644 such as illustrated in FIG. 15 is displayed over the transmission start screen 640 as an overlay display, for example. The message image 644 indicates that the document currently is being read.

Figure 16:
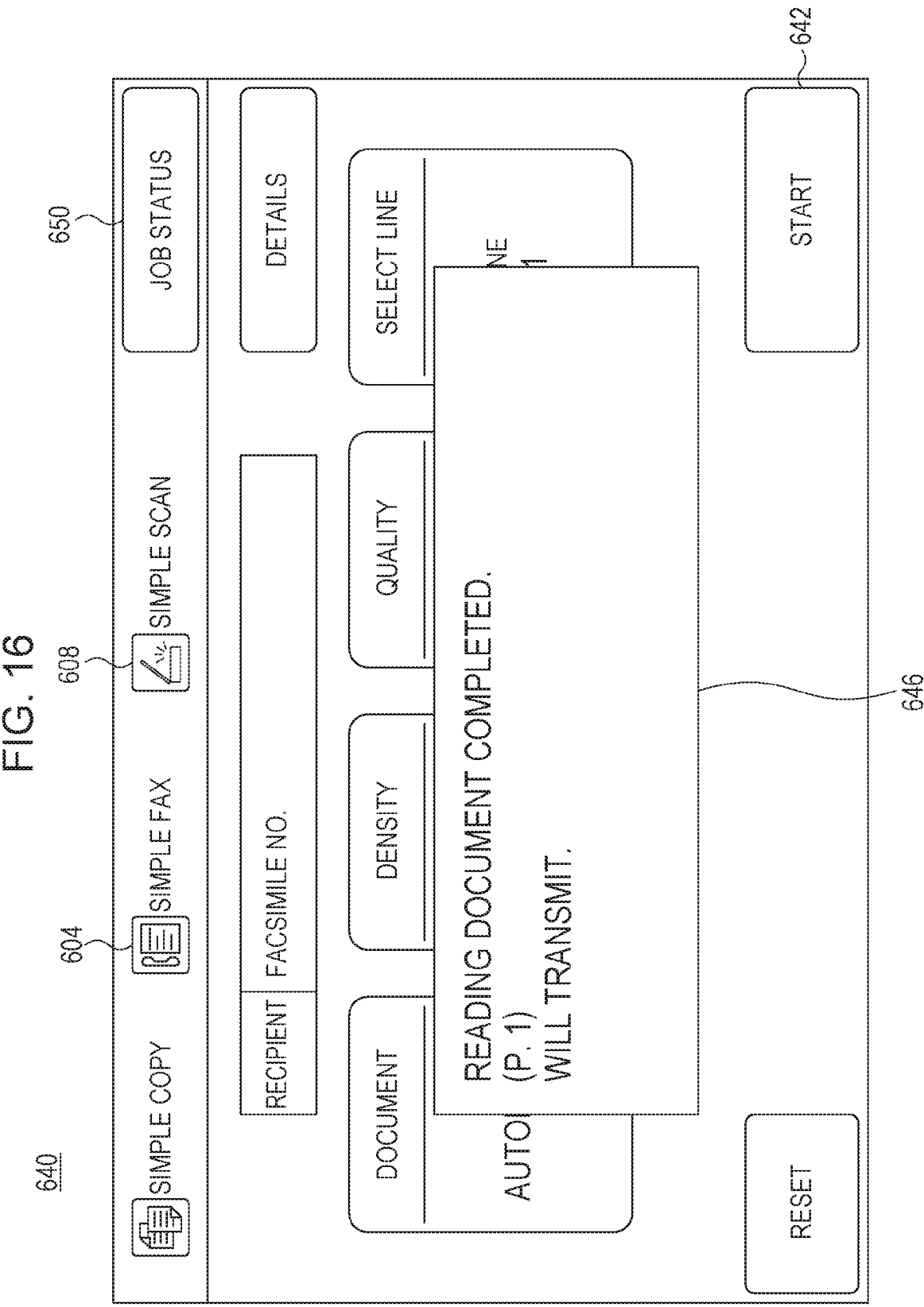
FIG. 16 is a diagram illustrating another example of a message image displayed on a transmission start screen.

Once reading of the document has ended, a separate message image 646 such as illustrated in FIG. 16 is displayed over the transmission start screen 640 as an overlay display, instead of the message image 644 illustrated in FIG. 15. This message image 646 indicates that reading of the document has ended, and that broadcast transmission will start. Accordingly, broadcast transmission according to the procedures described above is started, i.e., broadcast transmission processing by the transmission processing unit 103 starts. Also, in a case where the transmission report notification functions are on (enabled), transmission report information (transmission reservation table 1051 or transmission results table 1061) according to the respective modes (transmission reservation notification mode or transmission results notification mode) of the transmission report notification functions is notified to the transmission destinations. After this notification, the display screen of the display unit 132 returns to the simple fax screen 610 illustrated in FIG. 10.

Note that as described above, setting of the transmission destinations in broadcast transmission is not restricted to the facsimile mode, and can be performed by the scanner mode as well. In this case, a "simple scan" button 606 or "simple scan" icon 608 is pressed in the home screen 600 illustrated in FIG. 9. This displays a simple scan screen on the display screen of the display unit 132, although omitted from illustration here. This selects the scanner mode. This simple scan screen is provided with an "address book" button in the same way as in the simple fax screen 610 illustrated in FIG. 10. Pressing the "address book" button in the simple scan screen displays a recipient setting screen on the display screen of the display unit 132 in the same way as with that illustrated in FIG. 11. Accordingly, transmission destinations can be optionally set in the recipient setting screen in this scanner mode, as well.

Setting of transmission destinations is not restricted to optional facsimile devices 4, and optional email addresses and optional PC 5 folders can be set as transmission destinations. Upon a "direct input" button 614 in the simple fax screen 610 illustrated in FIG. 10 being pressed, a direct input screen is displayed on the display screen of the display unit 132 instead of the simple fax screen 610, although omitted from illustration. Setting of transmission destinations can be performed by direct input of facsimile Nos. or the like of transmission destinations to this direct input screen as well. A "direct input" button for displaying this direct input screen is also provided to the above-described simple scan screen. Accordingly, optional transmission destinations can be set in the direct input screen in this simple scan screen as well.

Figure 17:
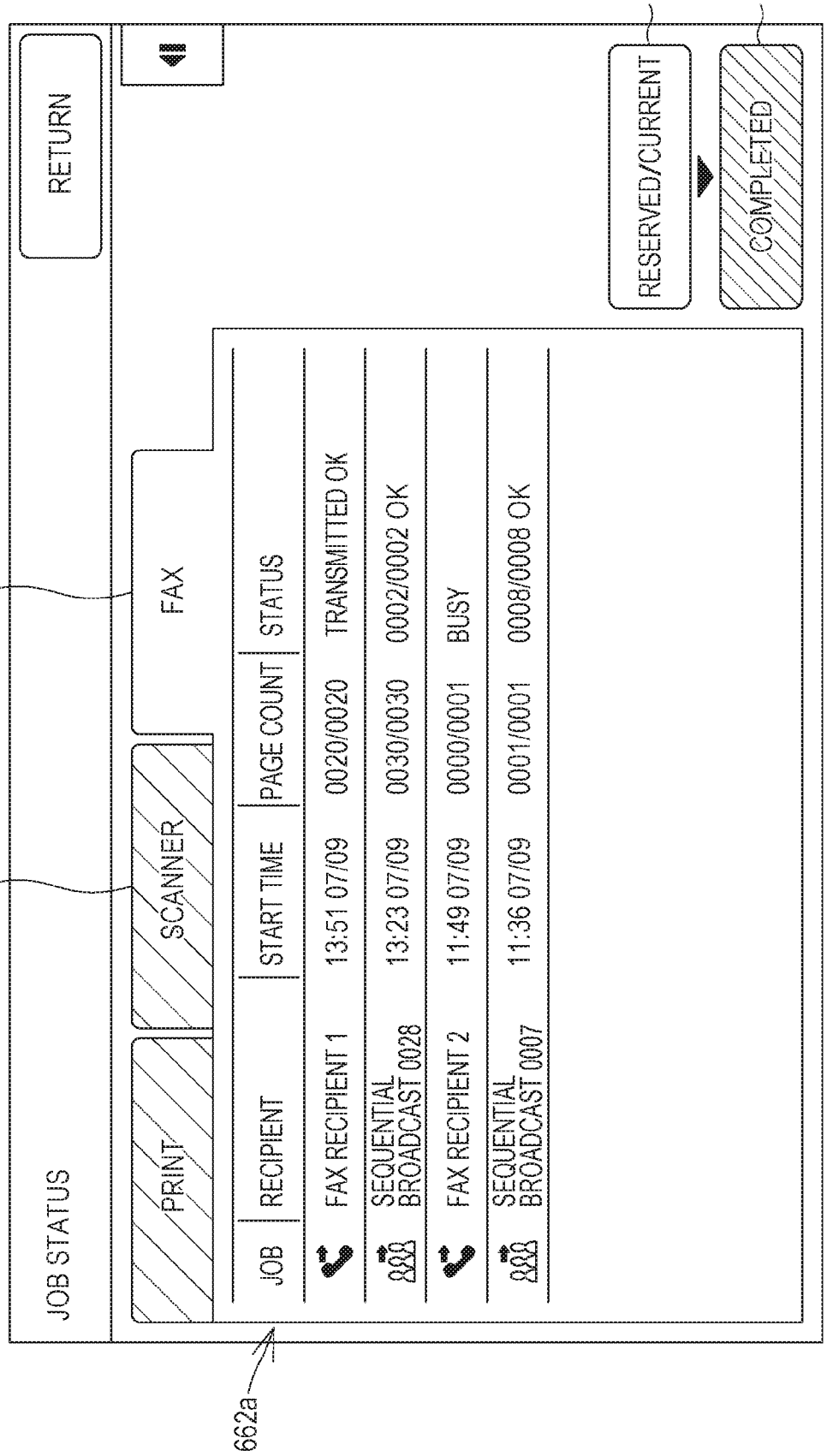
FIG. 17 is a diagram illustrating an example of a transmission history screen displayed on the display screen of the display unit of the image forming device according to the first embodiment.

Further, upon a "job status" button 650 provided to the upper right of the home screen 600 or the like being pressed, a transmission history screen 660 such as illustrated in FIG. 17 is displayed on the display screen of the display unit 132. The transmission history screen 660 illustrated in FIG. 17 is a screen showing history relating to all transmissions, including normal transmission and broadcast transmission. According to the transmission history screen 660 illustrated in FIG. 17, pressing a "fax" tab 662 and pressing a "completed" button 664 brings up a list 662a of jobs regarding which transmission by the facsimile transmission functions has been completed. The history relating to broadcast transmission within this list 662a is history relating to broadcast transmission including transmission destinations to which transmission has been made by the facsimile transmission functions, i.e., including facsimile devices 4 for transmission destinations. The start time of the broadcast transmission, page count of document, and transmission results regarding each transmission destination, are displayed in this history relating to broadcast transmission. When a "reserved/current" button 666 is pressed in the transmission history screen 660 illustrated in FIG. 17, a list of jobs regarding which transmission by the facsimile transmission functions has been reserved, and jobs regarding which transmission by the facsimile transmission functions is currently underway, is displayed, although omitted from illustration here. When a "scanner" tab 668 is pressed in the transmission history screen 660 illustrated in FIG. 17, the transmission history screen 660 transitions to a state such as illustrated in FIG. 18.

Figure 18:
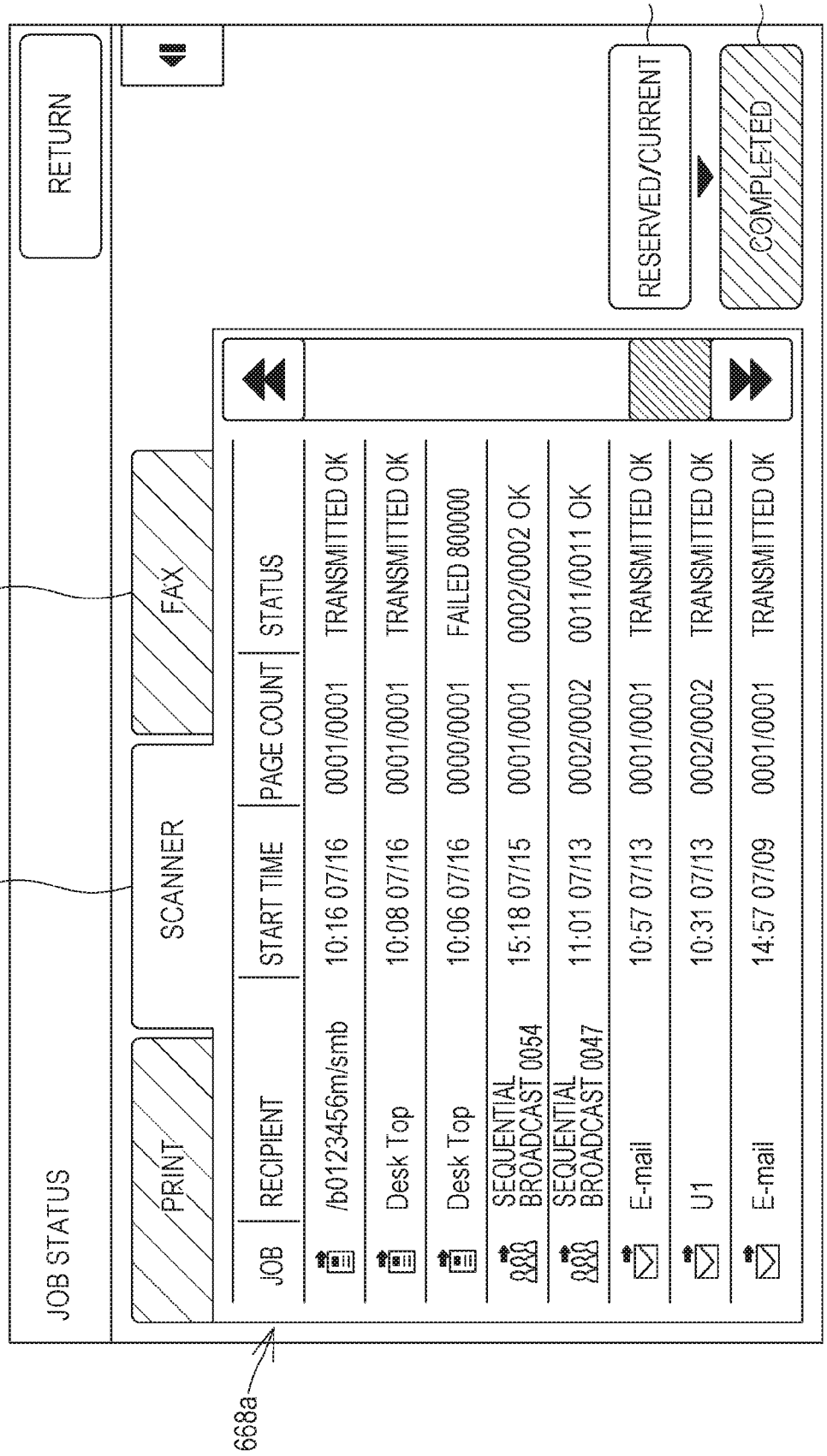
FIG. 18 is a diagram illustrating an example where the state of the transmission history screen has changed.

The transmission history screen 660 illustrated in FIG. 18 shows a list 668a of jobs regarding which transmission by the network transmission functions (email transmission functions and scanner transmission functions) has ended. This list 668a also includes history relating to broadcast transmission. This history relating to broadcast transmission is history including transmission destinations to which transmission has been performed by the network transmission functions, i.e., is history including at least one of email addresses and PC 5 folders for transmission destinations. When the "reserved/current" button 666 is pressed in the transmission history screen 660 illustrated in FIG. 18 as well, a list of jobs regarding which transmission by the network transmission functions has been reserved, and jobs regarding which transmission by the network transmission functions is currently underway, is displayed, although omitted from illustration here.

Further, when any transmission destination name is pressed in the list 662a in FIG. 17 or the likes 668a in FIG. 18 is pressed, a detailed display screen 670 such as illustrated in FIG. 19 is displayed on the display screen of the display unit 132. The detailed display screen 670 illustrated in FIG. 19 is a screen showing detailed information relating to individual jobs. According to the detailed display screen 670 in FIG. 19, pressing a "currently communicating" tab 672 displays detailed information of current communication with the transmission destination. This detailed information includes the name of the transmission destination (contact name), information for identifying the transmission destination (recipient No.), current status, suitable reference No., page count of document, and type of communication line. In a case of broadcast transmission, the type of communication line is not displayed, and handled as being unidentified, so as to speak. Also, in a case of broadcast transmission, whether or not to make notification with transmission reservation information, i.e., whether or not to transmit the transmission reservation table 1051, is displayed. Similarly, with transmission results information, whether or not to notify, i.e., whether or not to transmit the transmission results table 1061, is displayed. Further, in a case where notification of the transmission results table 1061 is by the viewing location notification mode, display is made to that effect. According to the detailed display screen 670 in FIG. 19, pressing a "standby" tab 674 displays detailed information in a case where transmission to a transmission destination is in standby. Further, pressing a "communication failed" tab 676 displays detailed information in a case where transmission to the transmission destination has failed. Moreover, pressing a "recipient list" tab 678 displays a list of recipients of broadcast transmission.

Thus, according to the first embodiment, in a case where broadcast transmission is performed, transmission report information relating to the transmission destinations of the broadcast transmission is notified to all transmission destinations. Accordingly, each of the transmission destinations can know other transmission destinations relating to the broadcast transmission.

Note that which mode of the transmission reservation notification mode and transmission results notification mode (results table transmission mode and viewing location notification mode) is to be used for notification regarding the transmission report information can be optionally selected. Further, two or more modes can be selected.

Second Embodiment

Next, a second embodiment of the present disclosure will be described. Although the transmission report information relating to broadcast transmission is notified to all transmission destinations in the first embodiment, the transmission report information is only notified to particular transmission destinations matching conditions decided beforehand in a second embodiment.

Also, although no viewing location notification mode is provided for the transmission reservation notification mode in the first embodiment, a viewing location notification mode is provided for the transmission reservation notification mode as well in the second embodiment. That is to say, the transmission reservation notification mode according to the second embodiment includes a reservation table transmission mode and a viewing location notification mode. In the reservation table transmission mode of the transmission reservation notification mode, the transmission reservation table 1051 is compiled as transmission report information following the same procedures as in the first embodiment. However, the transmission reservation table 1051 is only notified to particular transmission destinations, which will be described later. On the other hand, in the viewing location notification mode of the transmission reservation notification mode, the transmission reservation table 1051 is compiled following the same procedures as in the reservation table transmission mode. The transmission reservation table 1051 is then stored following the same procedures as the transmission results table 1061, i.e., stored in the transmission report storage unit 1002 of the storage unit 100 and also stored in the NAS folder 1101 within the HDD 110. Also, with regard to the transmission reservation table 1051 stored in the transmission report storage unit 1002, an F-code representing the storage location thereof is stored in this transmission report storage unit 1002 in a manner correlated with this transmission reservation table 1051. Subsequently, storage information representing the storage location of this transmission reservation table 1051, i.e., an F-code or a link destination of the NAS folder 1101, is notified only to particular transmission destinations, which will be described later.

Note that the transmission report storage unit 1002 of the storage unit 100 and NAS folder 1101 within the HDD 110, which are storage locations of the transmission reservation table 1051, are an example of a first storage device according to the present disclosure. The F-code representing the storage location of the transmission reservation table 1051, and link destination of the NAS folder 1101, are an example of first storage information according to the present disclosure.

Further, the transmission results notification mode according to the second embodiment includes the results table transmission mode and viewing location notification mode, the same as with the transmission results notification mode according to the first embodiment. Note however, that in the results table transmission mode of the transmission results notification mode in the second embodiment, the transmission results table 1061 is transmitted as transmission report information only to particular transmission destinations, which will be described later. In the viewing location notification mode of the transmission results notification mode in the second embodiment, storage information representing the storage location of the transmission results table 1061, i.e., the F-code or link destination of the NAS folder 1101, is transmitted only to particular transmission destinations, which will be described later.

The transmission report storage unit 1002 and NAS folder 1101 that are storage locations of the transmission results table 1061 are an example of a second storage device according to the present disclosure. The F-code and link destination of the NAS folder 1101, representing the storage location of the transmission results table 1061, are an example of second storage information according to the present disclosure.

Hereinafter, description of portions that are the same as in the first embodiment will be omitted. Also, the viewing location notification mode in the transmission reservation notification mode may be referred to as "reservation table viewing location notification mode", and the viewing location notification mode in the transmission results notification mode may be referred to as "results table viewing location notification mode", for the sake of distinguishing terms.

In the second embodiment, degree of priority (degree of importance) is set to image information that is transmission object information, as one of the attributes thereof, by user operations. Also, notification conditions, so as to say, regarding what sort of cases of degree of priority of the image information that is transmission object information cause the respective transmission destinations to be the object of notification of the transmission report information, are set by user operations performed separately from the above user operations. By making these settings, the transmission report information is notified only to particular transmission destinations that match conditions to be the object of notification of the transmission report information.

Figure 20:
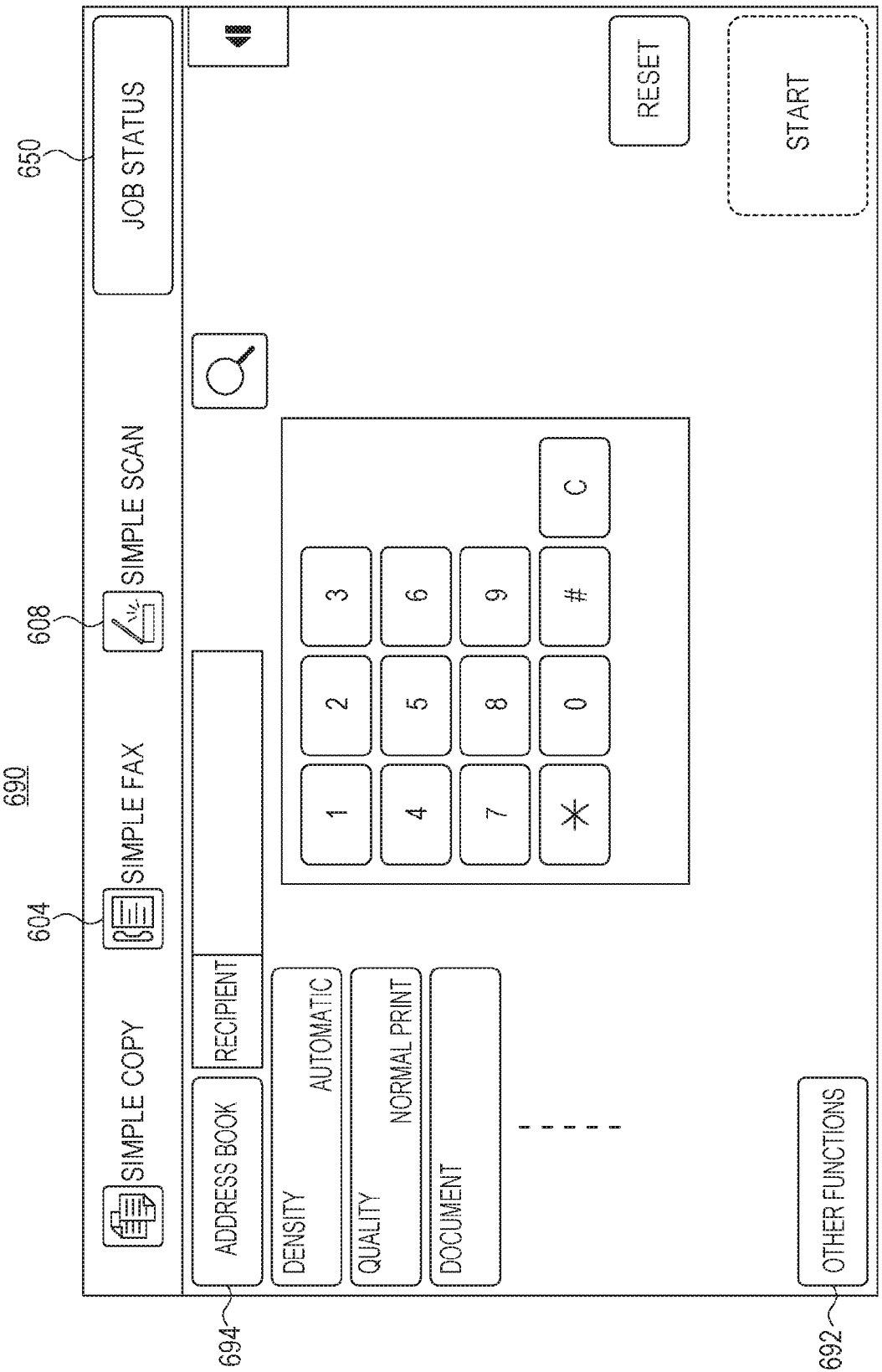
FIG. 20 is a diagram illustrating an example of a detailed fax screen displayed on a display screen of a display unit of an image forming device according to a second embodiment of the present disclosure.

In more detail, pressing a "details" button 680 at the upper right portion in the simple fax screen 610 illustrated in FIG. 10 displays a detailed fax screen 690 such as illustrated in FIG. 20 on the display screen of the display unit 132 instead of this simple fax screen 610. In a case of an "other functions" button 692 at the lower left being pressed in this detailed fax screen 690, an other functions setting screen 700 such as illustrated in FIG. 21 is displayed on the display screen of the display unit 132 instead of this detailed fax screen 690.

The detailed fax screen 690 illustrated in FIG. 20 is also provided with an "address book" button 694. The recipient setting screen 620 illustrated in FIG. 11 can also be displayed on the display screen of the display unit 132 by pressing this "address book" button 694. A "details" button, the same as that in the simple fax screen 610 illustrated in FIG. 10, is also provided to the simple scan screen described above. Pressing the "details" button in this simple scan screen displays a detailed scan screen the same as the detailed fax screen in FIG. 20 on the display screen of the display unit 132. Further, an "other functions" button the same as that in the detailed fax screen 690 in FIG. 20 is also provided to this detailed scan screen. The other functions setting screen 700 illustrated in FIG. 21 is displayed on the display screen of the display unit 132 by the "other functions" button in the recipient setting screen relating to the scanner mode being pressed, as well.

Figure 21:
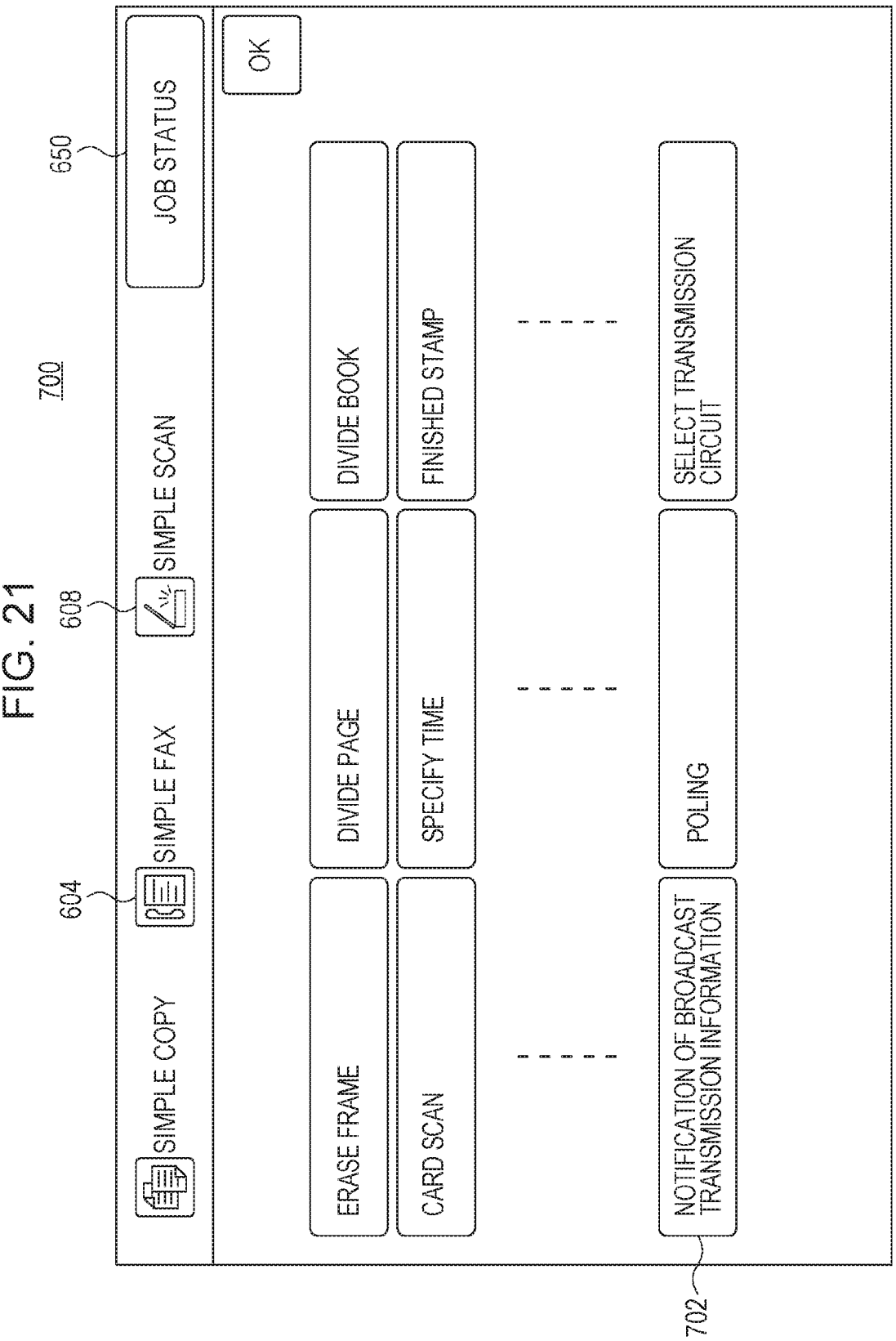
FIG. 21 is a diagram illustrating an example of an other-functions settings screen displayed on the display screen of the display unit of the image forming device according to the second embodiment.

The other functions setting screen 700 illustrated in FIG. 21 is provided with a "notification of broadcast transmission information" button 702 at the lower left portion thereof, for example. Pressing the "notification of broadcast transmission information" button 702 displays a degree of priority setting screen 710 such as illustrated in FIG. 22 on the display screen of the display unit 132.

Figure 22:
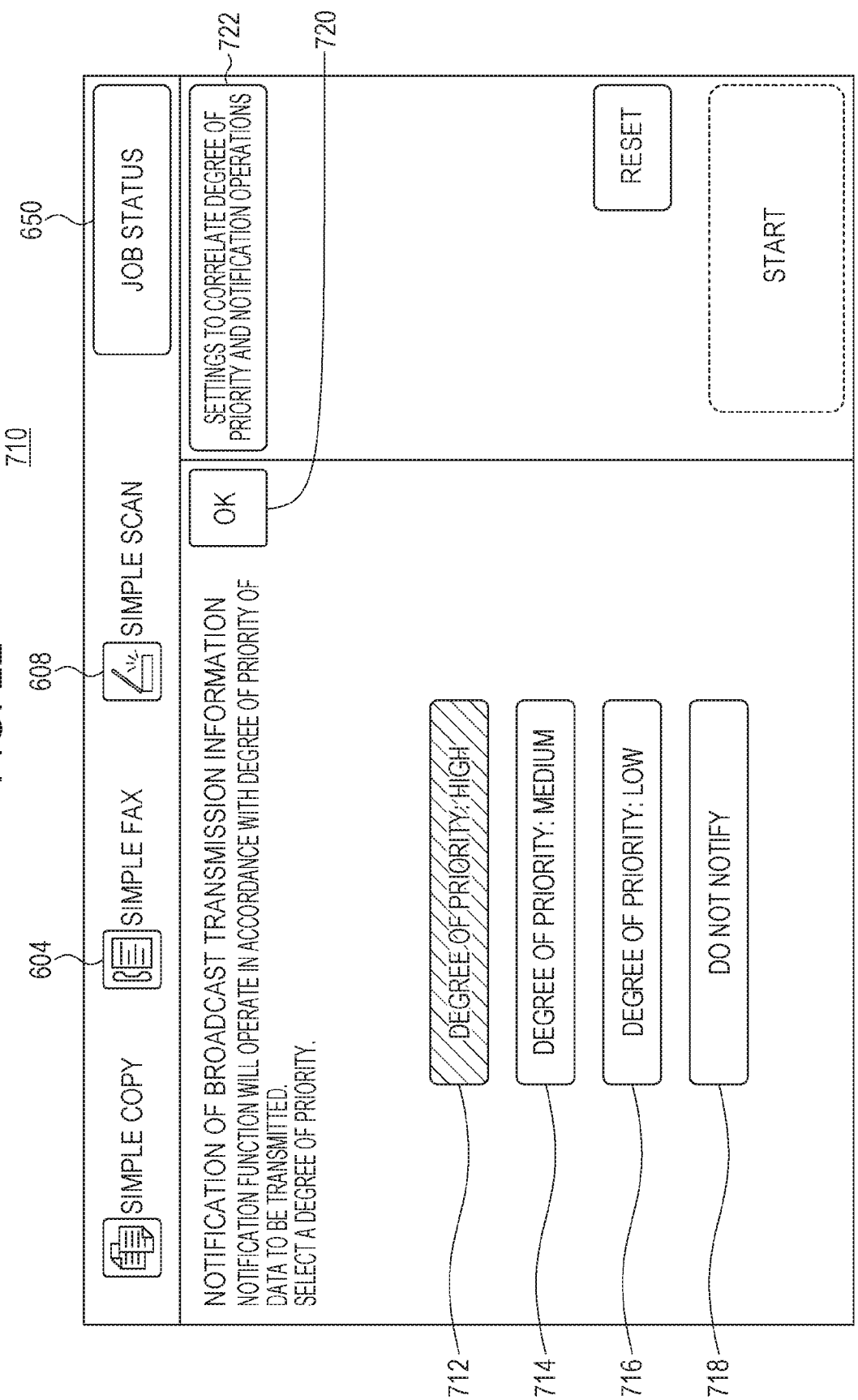
FIG. 22 is a diagram illustrating an example of a degree-of-priority settings screen displayed on the display screen of the display unit of the image forming device according to the second embodiment.

The degree of priority setting screen 710 illustrated in FIG. 22 is a screen for setting the aforementioned degree of priority for the image information that is transmission object information. In a case where a "priority: high" button 712 is pressed in the degree of priority setting screen 710, the degree of priority of the image information that is transmission object information is set to "high", or rather more accurately, is tentatively set. If a "priority: medium" button 714 is pressed, the degree of priority of the image information is tentatively set to "medium". Further, if a "priority: low" button 716 is pressed, the degree of priority of the image information is tentatively set to "low". If a "do not notify" button 718 is pressed, no transmission of transmission report information, i.e., turning the transmission report notification functions off (disabled) is tentatively set. Pressing an "OK" button 720 upon having performed such tentative settings formally sets the contents that had been tentatively set. This setting is performed by the control unit 10. Pressing of the buttons 712 through 718 in the degree of priority setting screen 710 is an example of a first user operations according to the present disclosure. The control unit 10 that formally sets the contents tentatively set by pressing of the buttons 712 through 718, in response to the "OK" button 720 having been pressed, is an example of a first setting device according to the present disclosure. Pressing this "OK" button 720 displays the other functions setting screen 700 illustrated in FIG. 21 on the display screen of the display unit 132 again. That is to say, the state of the display screen of the display unit 132 returns to the state of the other functions setting screen 700 illustrated in FIG. 21.

Figure 23:
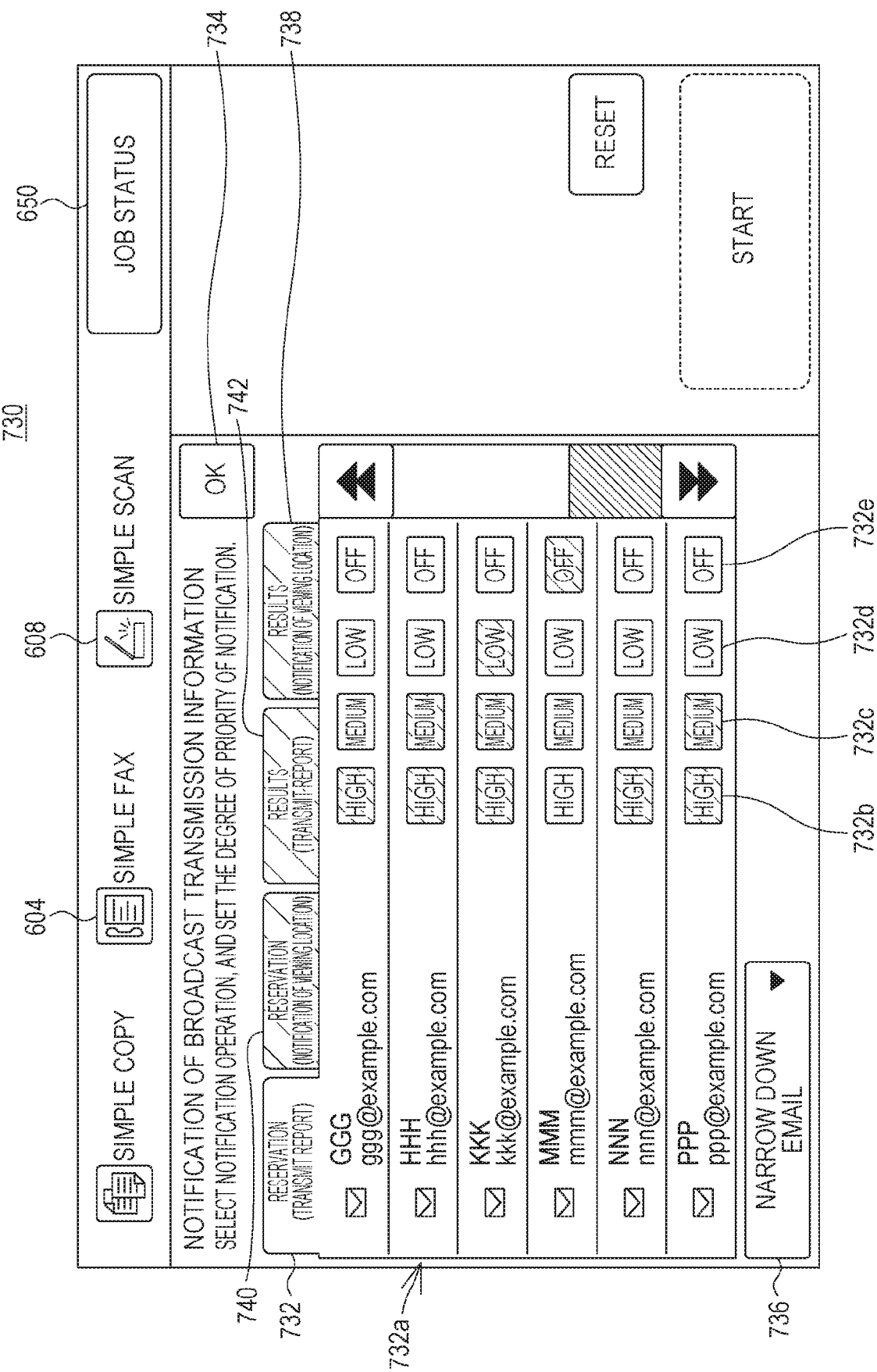
FIG. 23 is a diagram illustrating an example of a notification conditions settings screen displayed on the display screen of the display unit of the image forming device according to the second embodiment.

Further, pressing a "settings to correlate degree of priority and notification operations" button 722 at the upper right portion of the degree of priority setting screen 710 illustrated in FIG. 22 displays a notification conditions setting screen 730 such as illustrated in FIG. 23 on the display screen of the display unit 132 instead of this degree of priority setting screen 710. This notification conditions setting screen 730 is a screen for setting communication conditions regarding what sort of cases of degree of priority of the image information that is transmission object information cause the respective transmission destinations, registered in the above-described recipient list, to be the object of notification of the transmission report information. Setting of notification conditions is performed for each of the above-described transmission reservation notification mode and transmission results notification mode, and accordingly is performed for each mode (notification form) of reservation table transmission mode, reservation table viewing location notification mode, results table transmission mode, and results table viewing location notification mode.

The notification conditions setting screen 730 illustrated in FIG. 23 represent a state in which a "reservation (transmit report)" tab 732 has been pressed. Communication conditions relating to the reservation table transmission mode are set in this notification conditions setting screen 730 illustrated in FIG. 23. That is to say, the notification conditions setting screen 730 in FIG. 23 includes a list 732a of transmission destinations registered in the recipient list. Four buttons 732b through 732e are provided for each transmission destination. These four buttons 732b through 732e are operation members for setting what sort of degree of priority of image information each transmission destination causes each transmission destination to become the object of notification of transmission report information relating thereto (transmission reservation table 1051 here). For example, when the "high" button 732b is pressed, a setting is made for the corresponding transmission destination to be the object of notification of transmission report information relating to image information of which the degree of priority is "high" or higher, or rather more accurately, is tentatively set. When the "medium" button 732c is pressed, a setting is tentatively made for the corresponding transmission destination to be the object of notification of transmission report information relating to image information of which the degree of priority is "medium" or higher. Also, when the "low" button 732d is pressed, a setting is tentatively made for the corresponding transmission destination to be the object of notification of transmission report information relating to image information of which the degree of priority is "low" or higher. When the "off" button 732e is pressed, a setting is tentatively made for the corresponding transmission destination not to be the object of notification of transmission report information, regardless of the degree of priority of the image information.

Looking at a transmission destination "GGG" in the notification conditions setting screen 730 illustrated in FIG. 23 for example, the transmission destination "GGG" is in a state where the "high" button 732b has been pressed. The pressed "high" button 732b is displayed modified one way or another, such as some sort of color being applied thereto. A transmission destination "HHH" is in a state where the "middle" button 732c has been pressed. Transmission destinations which have the "middle" button 732c pressed are in a state where the "high" button 732b also is pressed. Further, a transmission destination "KKK" is in a state where the "low" button 732d has been pressed. Transmission destinations which have the "low" button 732d pressed are in a state where the "high" button 732b and "middle" button 732c also are pressed. A transmission destination "MMM" is in a state where the "off" button 732e is pressed.

Upon tentative settings being performed by pressing these buttons 732b through 732e, pressing the "OK" button 734 formally sets the contents which had been tentatively set. These settings are also performed by the control unit 10. Pressing of the buttons 732b through 732e in the notification conditions setting screen 730 is an example of second user operations according to the present disclosure. The control unit 10 that formally sets the contents tentatively set by pressing of the buttons 732b through 732e, in response to the "OK" button 734 having been pressed, is an example of a second setting device according to the present disclosure. Pressing this "OK" button 734 displays the degree of priority setting screen 710 illustrated in FIG. 22 on the display screen of the display unit 132 again. That is to say, the state of the display screen of the display unit 132 returns to the state displayed in the degree of priority setting screen 710 illustrated in FIG. 22. Note that while only email addresses are displayed in the list 732a of transmission destinations in the notification conditions setting screen 730 illustrated in FIG. 23, this is due to narrowing down having been performed by the "narrow down" button 736 at the lower left portion of the notification conditions setting screen 730. That is to say, the transmission destinations displayed in the list 732a can be narrowed down as suitable by operating this "narrow down" button 736.

Figure 24:
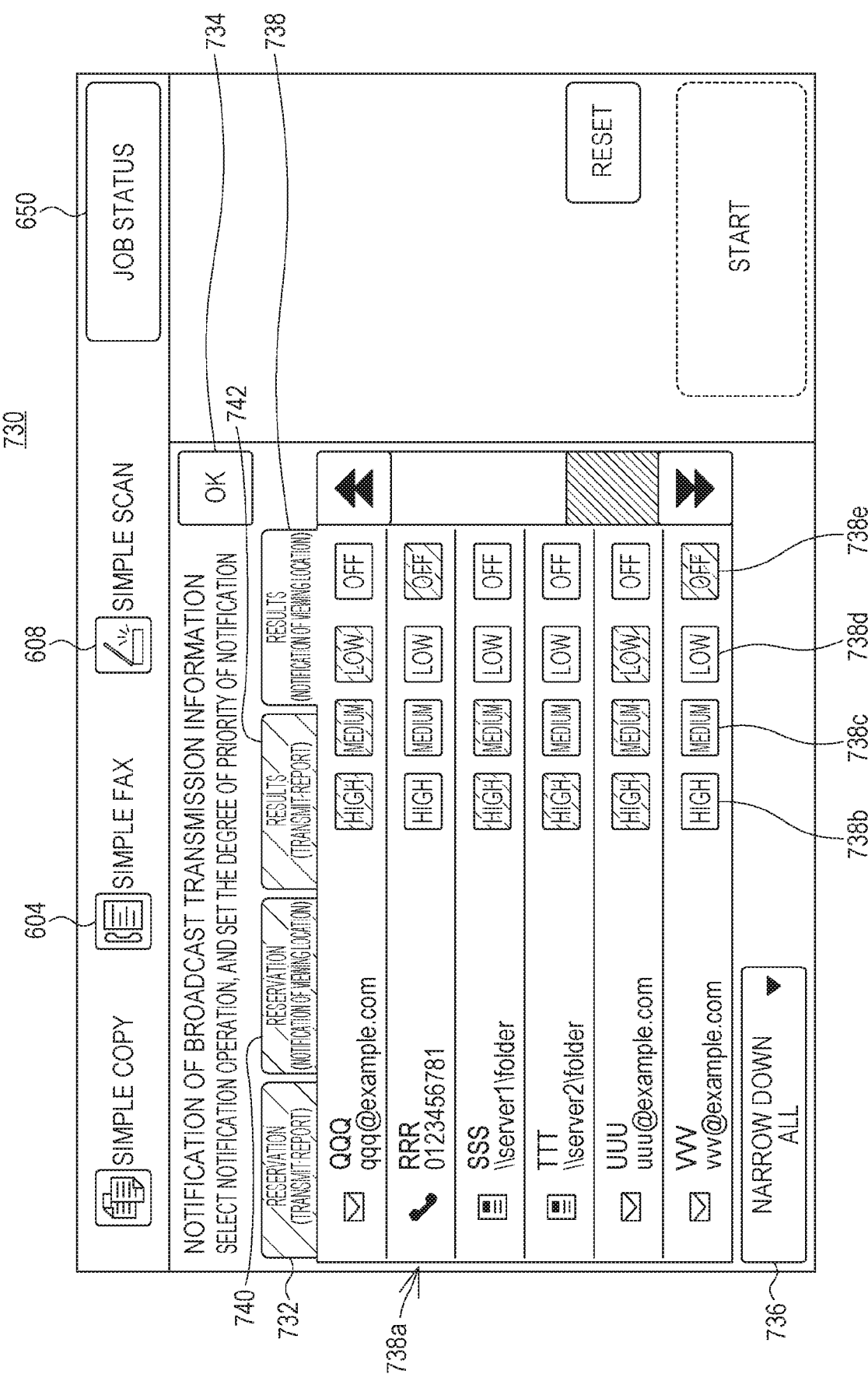
FIG. 24 is a diagram illustrating an example where the state of the notification conditions settings screen according to the second embodiment has changed.

Further, pressing a "results (notification of viewing location)" tab 738 in the notification conditions setting screen 730 illustrated in FIG. 23 causes the notification conditions setting screen 730 to transition to a state such as illustrated in FIG. 24. The notification conditions setting screen 730 illustrated in FIG. 24 is a settings screen relating to the results table viewing location notification mode. A list 738a of transmission destinations is displayed on the notification conditions setting screen 730 illustrated in FIG. 24 as well. Four buttons 738b through 738e are provided for each transmission destination. Note that all transmission destinations are displayed in the list 738a of transmission destinations in FIG. 24, due to the aforementioned "narrow down" button 736 having been operated. For example, a transmission destination "QQQ" is an email address, a transmission destination "RRR" is a facsimile device 4, and a transmission destination "SSS" is a PC 5 folder.

When a "reservation (notification of viewing location)" tab 740 is pressed in the notification conditions setting screen 730 in FIG. 23 or 24, the notification conditions setting screen 730 transitions to a settings screen for the reservation table viewing location notification mode, although omitted from illustration. When a "results (transmit report)" tab 742 is pressed, the notification conditions setting screen 730 transitions to a settings screen for the results table transmission mode.

As a result of settings being performed in the notification conditions setting screen 730 in this way, a transmission destination table 750 such as illustrate in FIG. 25 is compiled and stored in the storage unit 100, for example. Looking at the transmission destination "GGG" in the transmission destination table 750 for example, an email address is set for the transmission destination "GGG". With regard to this transmission destination "GGG", notification of transmission report information by the reservation table transmission mode is performed in a case where the degree of priority of the image information that is transmission object information is "high" or higher, i.e., the transmission reservation table 1051 is transmitted by the email transmission functions. Also, with regard to this transmission destination "GGG", notification of transmission report information by the results table transmission mode is performed in a case where the degree of priority of the image information that is transmission object information is "high" or higher, i.e., the transmission results table 1061 is transmitted by the email transmission functions. On the other hand, notification of transmission report information by the reservation table viewing location notification mode is not performed regarding the transmission destination "GGG", i.e., transmission of storage information representing the storage location of the transmission reservation table 1051 is not performed. Further, notification of transmission report information by the results table viewing location notification mode is not performed regarding the transmission destination "GGG", i.e., transmission of storage information representing the storage location of the transmission results table 1061 is not performed.

Further, looking at the transmission destination "RRR", a facsimile No. is set for the transmission destination "RRR". With regard to this transmission destination "RRR", only notification of transmission report information by the results table transmission mode is performed in a case where the degree of priority of the image information that is transmission object information is "low" or higher, i.e., just the transmission results table 1061 is transmitted by the facsimile transmission functions. With regard to this transmission destination "RRR", notification of transmission report information by the reservation table transmission mode is not performed, i.e., the transmission reservation table 1051 is not transmitted. Also, with regard to this transmission destination "RRR", notification of transmission report information by the reservation table viewing location notification mode is not performed, i.e., transmission of storage information representing the storage location of the transmission reservation table 1051 is not performed. Further, notification of transmission report information by the results table viewing location notification mode is not performed regarding the transmission destination "RRR", i.e., transmission of storage information representing the storage location of the transmission results table 1061 is not performed.

Also, for example, looking at the transmission destination "SSS", folder of a PC 5 is set for the transmission destination "SSS". With regard to this transmission destination "SSS", notification of transmission report information by all of the reservation table transmission mode, reservation table viewing location notification mode, results table transmission mode, and results table viewing location notification mode, is performed in a case where the degree of priority of the image information that is transmission object information is "middle" or higher. That is to say, the transmission reservation table 1051, storage information representing the storage location of the transmission reservation table 1051, transmission results table 1061, and storage information representing the storage location of the transmission results table 1061, are transmitted to the transmission destination "SSS" by scanner transmission functions.

Note that in the transmission destination table 750 illustrated in FIG. 25, the portion surrounded by a dashed line corresponds to the contents set at the notification conditions setting screen 730 illustrated in FIG. 23. Also, in this transmission destination table 750, the portion surrounded by a dotted line corresponds to the contents set at the notification conditions setting screen 730 illustrated in FIG. 24.

Figure 26:
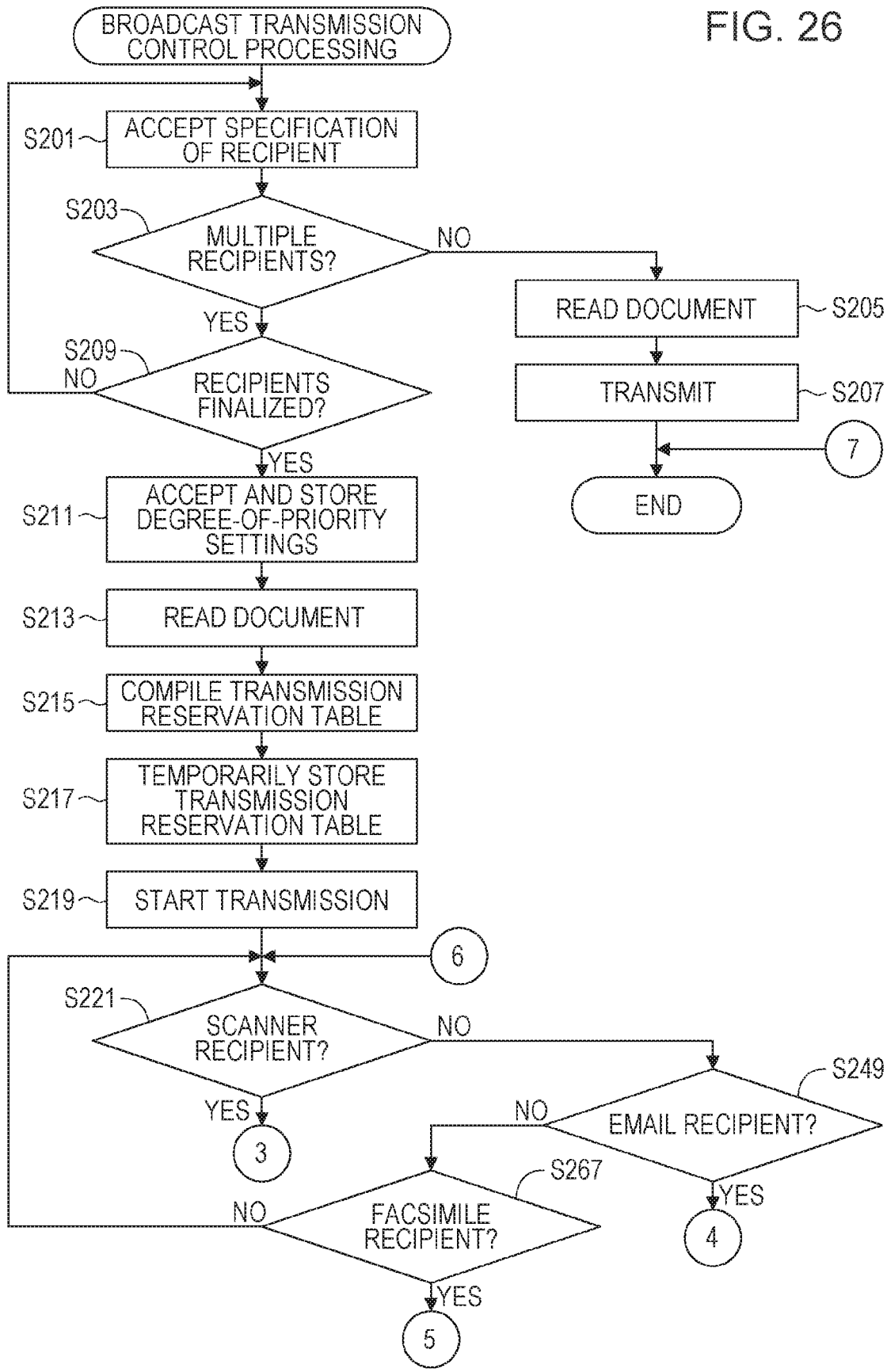
FIG. 26 is a flowchart illustrating part of an example of broadcast transmission control processing in a transmission reservation notification mode that a control unit of the image forming device according to the second embodiment executes.
Figure 27:
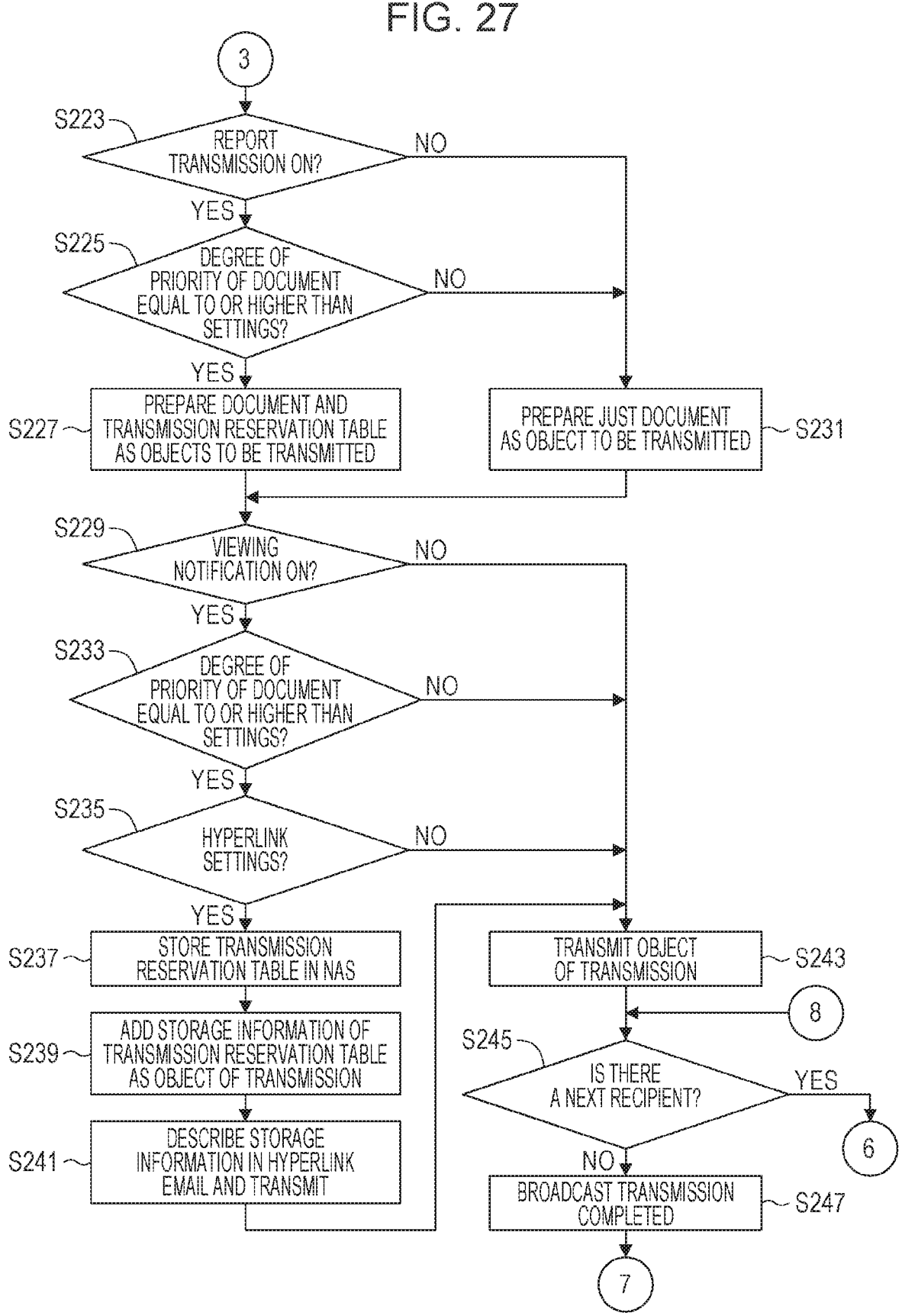
FIG. 27 is a flowchart illustrating another part of the example of the broadcast transmission control processing in the transmission reservation notification mode according to the second embodiment.
Figure 28:
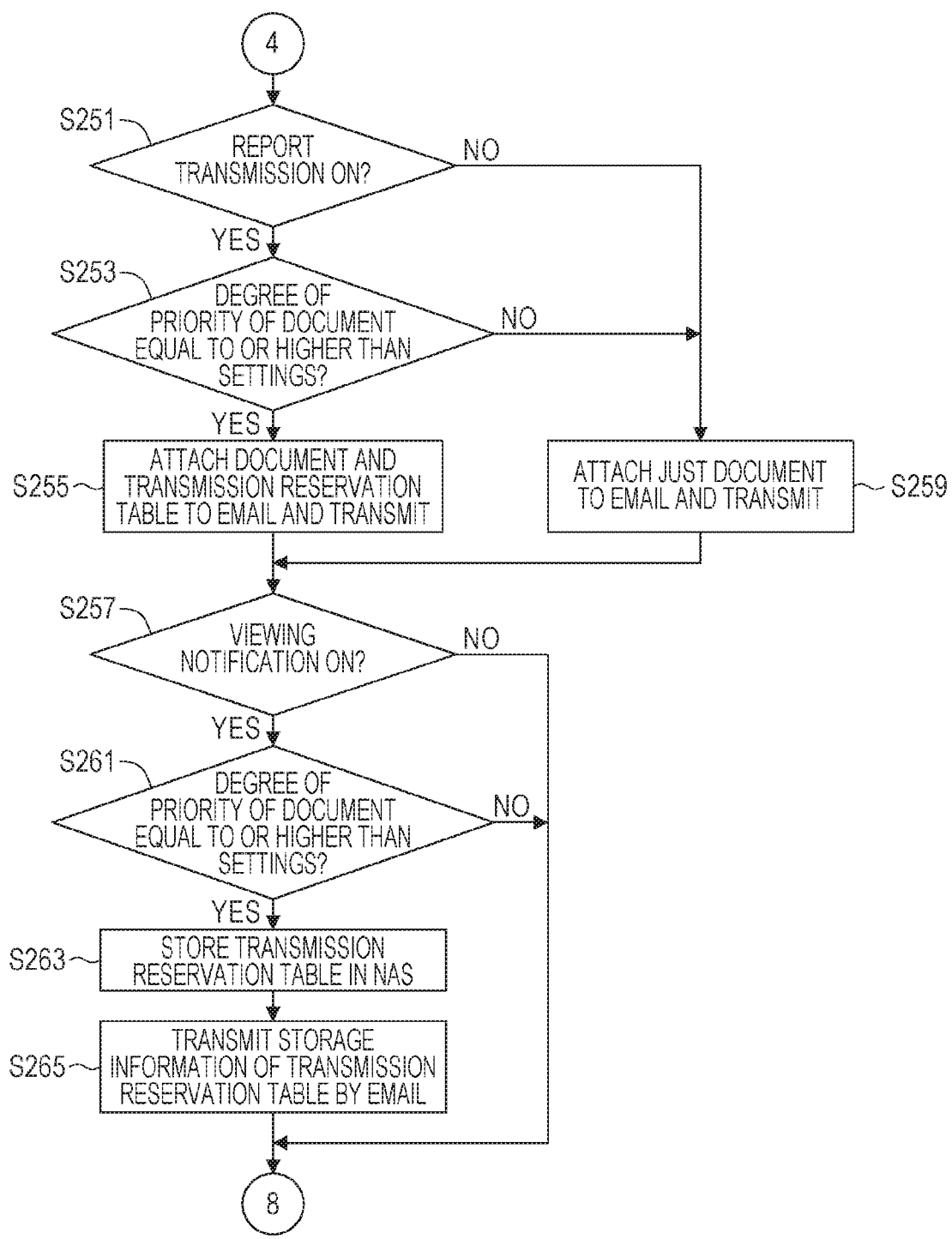
FIG. 28 is a flowchart illustrating yet another part of the example of the broadcast transmission control processing in the transmission reservation notification mode according to the second embodiment.
Figure 29:
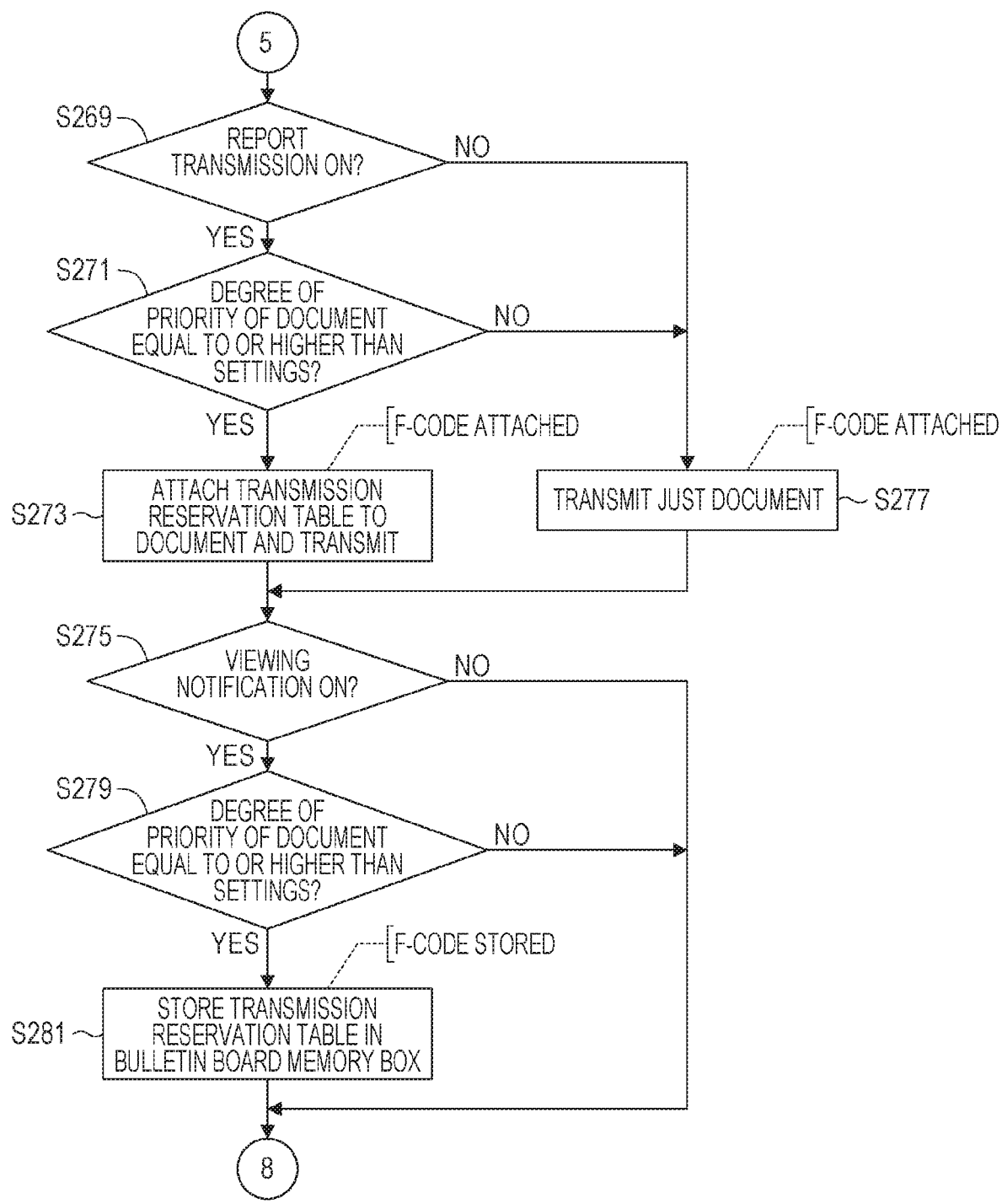
FIG. 29 is a flowchart illustrating the remaining part of the example of the broadcast transmission control processing in the transmission reservation notification mode according to the second embodiment.

The control unit 10 of the image forming device 1 according to the second embodiment as described above operates as follows. The operations of the control unit 10 differ depend on whether in the transmission reservation notification mode or the transmission results notification mode of the transmission report notification functions, in the same way as in the above-described first embodiment. For example, in a case of being in the transmission reservation notification mode, the control unit 10 performs broadcast transmission control processing in accordance with the transmission reservation notification mode following the procedures illustrated in the flowchart in FIGS. 26 through 29, following an information transmission control program. Note that steps S201 through S209 in the broadcast transmission control processing according to the transmission reservation notification mode according to the second embodiment (FIG. 26) are the same as steps S1 through S9 in the above-described broadcast transmission control processing according to the transmission reservation notification mode according to the first embodiment (FIG. 5), so description thereof will be omitted. Settings are performed using the notification conditions setting screen 730 illustrated in FIGS. 23 and 24 before the broadcast transmission control processing according to this transmission reservation notification mode is executed, thereby compiling the transmission destination table 750 illustrated in FIG. 25.

In step S209, once all transmission destinations have been finalized (YES in S209), the control unit 10 advances the flow to step S211. In step S211, the control unit 10 accepts settings of the degree of priority of image information that is transmission object information in accordance with user operations using the degree of priority setting screen 710 illustrated in FIG. 22, and also stores the accepted degree of priority in the storage unit 100. The control unit 10 then advances the flow to step S213.

In step S213, the control unit 10 causes the reading unit 12 to execute image reading processing, so that the reading unit 12 reads images of the document. The control unit 10 then advances the flow to step S215, and compiles a transmission reservation table 1051. Thereafter, the control unit 10 advances the flow to step S217 and temporarily stores the transmission reservation table 1051 in the storage unit 100. Thereafter, the control unit 10 advances the flow to step S219, and starts transmission, i.e., starts broadcast transmission processing.

When starting the broadcast transmission processing, the control unit 10 advances the flow to step S221 and determines whether the transmission destination is a transmission destination by the scanner transmission functions (scanner recipient). In a case where the transmission destination is a transmission destination by the scanner transmission functions for example (YES in S221), the control unit 10 advances the flow to step S223.

In step S223, the control unit 10 determines whether or not the settings for the current transmission destination are that notification of transmission report information is to be performed by the reservation table transmission mode (report transmission on). This determination is performed by referencing the above-described transmission destination table 750. That is to say, if the settings for notification of transmission report information by the reservation table transmission mode are other than "off" for the current transmission destination in the transmission destination table 750, determination is made that the settings for the current transmission destination are that notification of transmission report information is to be performed by the reservation table transmission mode. In a case where settings for the current transmission destination are that notification of transmission report information is to be performed by the reservation table transmission mode, for example (YES in S223), the control unit 10 advances the flow to step S225.

In step S225, the control unit 10 determines whether or not the degree of priority set to the image information that is transmission object information is equal to or higher than the degree of priority set to the current transmission destination in the reservation table transmission mode. This determination is also made by referencing the above-described transmission destination table 750. In a case where the degree of priority set to the image information is equal to or higher than the degree of priority set to the current transmission destination in the reservation table transmission mode (YES in S225), i.e., in a case where these conditions are satisfied, the control unit 10 advances the flow to step S227.

In step S227, the control unit 10 prepares the image information of the document and the transmission reservation table 1051 as objects to be transmitted to the current transmission destination. The control unit 10 then advances the flow to step S229.

Note that in a case where the current transmission destination is not set for notification of transmission report information in the reservation table transmission mode in the above step S223 (NO in S223), the control unit 10 advances the flow to step S231. In this step S231, the control unit 10 prepares only the image information of the document as the object of transmission to the current transmission destination. The control unit 10 then advances the flow to step S229. Also, in a case where the degree of priority set to the image information that is transmission object information is not equal to or higher than the degree of priority set to the current transmission destination in the reservation table transmission mode (NO in S225), the control unit 10 advances the flow to step S231.

In step S229, the control unit 10 determines whether settings have been made regarding the current transmission destination where notification is performed by the reservation table viewing location notification mode (viewing notification on). This determination is also performed by referencing the above-described transmission destination table 750. That is to say, in a case where settings for notification by the reservation table viewing location notification mode in the transmission destination table 750 are other than "off", determination is made that the settings regarding the current transmission destination are that notification is performed by the reservation table viewing location notification mode. In a case where the settings regarding the current transmission destination are that notification of transmission report information is performed by the reservation table viewing location notification mode here for example (YES in S229), the control unit 10 advances the flow to step S233.

In step S233, the control unit 10 determines whether or not the degree of priority set to the image information that is transmission object information is equal to or higher than the degree of priority set to the current transmission destination in the reservation table viewing location notification mode. This determination is also made by referencing the above-described transmission destination table 750. In a case where the degree of priority set to the image information is equal to or higher than the degree of priority set to the current transmission destination in the reservation table viewing location notification mode here for example (YES in S233), the control unit 10 advances the flow to step S235.

In step S235, the control unit 10 determines whether or not an email address is set for the transmission destination as a hyperlink destination. Now, in a case where an email address is set for the transmission destination as a hyperlink destination for example (YES in S235), the control unit 10 advances the flow to step S237. In this step S237, the control unit 10 stores the transmission reservation table 1051 in the NAS folder 1101. The control unit 10 then advances the flow to step S239.

In step S239, the control unit 10 adds storage information (first storage information) representing the link destination for the NAS folder 1101, which is the storage location of the transmission reservation table 1051, as an object to be transmitted. The control unit 10 then advances the flow to step S241, and transmits an email with the storage information representing the link destination of the NAS folder 1101 described therein to the email address of the hyperlink destination. Thereafter, the control unit 10 advances the flow to step S243, and transmits the object of transmission to the transmission destination.

Note that in a case where the settings regarding the current transmission destination are not that notification is performed by the reservation table viewing location notification mode here for example (NO in S229), the control unit 10 advances the flow to step S243. Also, in a case where the degree of priority set to the image information that is transmission object information is not equal to or higher than the degree of priority set to the current transmission destination in the reservation table viewing location notification mode here for example (NO in S233), the control unit 10 advances the flow to step S243. Further, in a case where an email address is not set for the transmission destination as a hyperlink destination (NO in S235), the control unit 10 advances the flow to step S243.

After executing step S243, the control unit 10 advances the processing to step S245. The control unit 10 then in step S245 determines whether or not there is a next transmission destination, i.e., whether or not at least image information has been transmitted to all transmission destinations. In a case where there is a next transmission destination for example (YES in S245), the control unit 10 returns the flow to step S221. On the other hand, in a case where there is no next transmission destination in step S245 (NO in S245), the control unit 10 advances the flow to step S247, and completes the broadcast transmission processing. Upon executing this step S247, the control unit 10 ends the broadcast transmission control processing by the transmission reservation notification mode.

Further, in a case where the transmission destination is not a transmission destination by the scanner transmission functions in step S221 (NO in S221), the control unit 10 advances the flow to step S249. In step S249, the control unit 10 determines whether the transmission destination is a transmission destination by the email transmission functions. In a case where the transmission destination is a transmission destination by the email transmission functions in step S249 (YES in S249) for example, the control unit 10 advances the flow to step S251.

In step S251, the control unit 10 determines whether or not the settings for the current transmission destination are that notification of transmission report information is to be performed by the reservation table transmission mode, in the same way as the above-described step S223. In a case where settings for the current transmission destination are that notification of transmission report information is to be performed by the reservation table transmission mode, for example (YES in S251), the control unit 10 advances the flow to step S253.

In step S253, the control unit 10 determines whether or not the degree of priority set to the image information that is transmission object information is equal to or higher than the degree of priority set to the current transmission destination in the reservation table transmission mode, in the same way as the above-described step S225. In a case where the degree of priority set to the image information is equal to or higher than the degree of priority set to the current transmission destination in the reservation table transmission mode (YES in S253), i.e., in a case where these conditions are satisfied, the control unit 10 advances the flow to step S255.

In step S255, the control unit 10 attaches the image information of the document and the transmission reservation table 1051 to an email, and transmits to the current transmission destination. The control unit 10 then advances the flow to step S257.

Note that in a case where the current transmission destination is not set for notification of transmission report information in the reservation table transmission mode in the above step S251 (NO in S251), the control unit 10 advances the flow to step S259. In this step S259, the control unit 10 attaches only the image information of the document to an email and transmits to the current transmission destination. The control unit 10 then advances the flow to step S257. Also, in a case where the degree of priority set to the image information that is transmission object information is not equal to or higher than the degree of priority set to the current transmission destination in the reservation table transmission mode (NO in S253), the control unit 10 advances the flow to step S259.

In step S257, the control unit 10 determines whether settings have been made regarding the current transmission destination where notification is performed by the reservation table viewing location notification mode, in the same way as in the above-described step S229. In a case where the settings regarding the current transmission destination are that notification of transmission report information is performed by the reservation table viewing location notification mode here for example (YES in S257), the control unit 10 advances the flow to step S261.

In step S261, the control unit 10 determines whether the degree of priority set for the image information that is transmission object information is equal to or higher than the degree of priority set to the current transmission destination with regard to the reservation table viewing location notification mode, in the same way as in the above-described step S233. In a case where the degree of priority set for the image information is equal to or higher than the degree of priority set to the current transmission destination with regard to the reservation table viewing location notification mode (YES in S261), the control unit 10 advances the flow to step S263.

In step S263, the control unit 10 stores the transmission reservation table 1051 in the NAS folder 1101. In the same way as in step S237. The control unit 10 then advances the flow to step S265, and transmits an email in which is described storage information (first storage information) representing the link destination for the NAS folder 1101, which is the storage location of the transmission reservation table 1051, to the current transmission destination. The control unit 10 then advances the flow to step S245.

Note that in a case where the current transmission destination is not set for notification of transmission report information in the reservation table viewing location notification mode in the above step S257 (NO in S257), the control unit 10 advances the flow to step S245. Also, in the above step S261, in a case where the degree of priority set to the image information that is transmission object information is not equal to or higher than the degree of priority set to the current transmission destination in the reservation table viewing location notification mode (NO in S261), the control unit 10 advances the flow to step S245.

Further, in a case where the transmission destination not is a transmission destination by the email transmission functions in the above-described step S249 (NO in S249), the control unit 10 advances the flow to step S267. In this step S267, the control unit 10 determines whether or not the transmission destination is a transmission destination by the facsimile transmission functions. In a case where the transmission destination is a transmission destination by the facsimile transmission functions here for example (YES in S267), the control unit 10 advances the flow to step S269. Note that in a case where the transmission destination is not a transmission destination by the facsimile transmission functions in step S267 (NO in S267), the control unit 10 returns the flow to step S221.

In step S269, the control unit 10 determines whether or not the settings for the current transmission destination are that notification of transmission report information is to be performed by the reservation table transmission mode, in the same way as the above-described steps S223 and S251. In a case where settings for the current transmission destination are that notification of transmission report information is to be performed by the reservation table transmission mode, for example (YES in S269), the control unit 10 advances the flow to step S271.

In step S271, the control unit 10 determines whether or not the degree of priority set to the image information that is transmission object information is equal to or higher than the degree of priority set to the current transmission destination in the reservation table transmission mode, in the same way as in the above-described steps S225 and S253. In a case where the degree of priority set to the image information is equal to or higher than the degree of priority set to the current transmission destination in the reservation table transmission mode here for example (YES in S271), the control unit 10 advances the flow to step S273.

In step S273, the control unit 10 attaches the transmission reservation table 1051 to the image information of the document, and transmits to the current transmission destination. The control unit 10 at this time transmits the image information in a state where the above-described F-code is attached to this image information. Thereafter, the control unit 10 advances the flow to step S275.

Note that in a case where the settings for the current transmission destination in the above-described step S269 are not that notification of transmission report information is to be performed by the reservation table transmission mode (NO in S269), the control unit 10 advances the flow to step S277. In this step S277, the control unit 10 transmits only the image information of the document to the current transmission destination. At this time as well, the control unit 10 transmits the image information in a state where the F-code is attached to this image information, in the same way as step S273. The control unit 10 then advances the flow to step S275. Also, in a case where the degree of priority set to the image information that is transmission object information is not equal to or higher than the degree of priority set to the current transmission destination (NO in S271), the control unit 10 advances the flow to step S277.

In step S275, the control unit 10 determines whether settings have been made regarding the current transmission destination where notification is performed by the reservation table viewing location notification mode, in the same way as in the above-described steps S229 and S257. In a case where the settings regarding the current transmission destination are that notification of the transmission report information is performed by the reservation table viewing location notification mode here for example (YES in S275), the control unit 10 advances the flow to step S279.

In step S279, the control unit 10 determines whether the degree of priority set for the image information that is transmission object information is equal to or higher than the degree of priority set to the current transmission destination with regard to the reservation table viewing location notification mode, in the same way as in the above-described steps S233 and S261. In a case where the degree of priority set for the image information is equal to or higher than the degree of priority set to the current transmission destination with regard to the reservation table viewing location notification mode (YES in S279), the control unit 10 advances the flow to step S281.

In step S281, the control unit 10 stores the transmission reservation table 1051 in the transmission report storage unit 1002 serving as the bulletin board memory box described earlier. The control unit 10 at this time stores the F-code in the transmission report storage unit 1002 in a state where the F-code is correlated with the transmission reservation table 1051. The control unit 10 then advances the flow to step S245.

In a case where the settings regarding the current transmission destination are not that notification of transmission report information is performed by the reservation table viewing location notification mode in the above-described step S275 (NO in S275), the control unit 10 advances the flow to step S245. Also, in a case where the degree of priority set for the image information that is transmission object information is not equal to or higher than the degree of priority set to the current transmission destination with regard to the reservation table viewing location notification mode in the above-described step S279 (NO in S279), the control unit 10 advances the flow to step S245.

Now, execution of the above-described steps S273 or S277 annunciates the F-code to all transmission destinations (i.e., all fax recipients) by the facsimile transmission functions. In other words, the F-code is annunciated to transmission destinations where settings are not that notification is performed by the reservation table viewing location notification mode, and to transmission destinations where there is a relation that the degree of priority set to the image information that is transmission object information is lower than the degree of priority set in the reservation table viewing location notification mode. That is to say, this F-code is annunciated to transmission destinations which need no annunciation of the F-code. The following configuration, for example, may be employed to inhibit such meaningless F-code annunciation.

That is to say, two steps, which are a step like step S275 and a step like step S279 are provided before step S273 (after YES in step S271). Step S273 is executed only in a case where both of these two steps yield positive (in a case of YES), with image information having the F-code attached thereto, and the transmission reservation table 1051 attached to the image information, being transmitted to the transmission destination. After executing step S273, steps S275 and S279 are skipped, and step S281 is executed. On the other hand, in a case where at least one of these two steps yields negative (in a case of NO), image information without having the F-code attached thereto, and the transmission reservation table 1051 attached to the image information, are transmitted to the transmission destination. Thereafter, steps S275, S279, and S281 are skipped, and step S245 is executed.

In conjunction with this, two steps, which are a step like step S275 and a step like step S279 are provided in front of step S277 (after NO in step S269 and after NO in step S271). Step S277 is executed only in a case where both of these two steps yield positive (in a case of YES), with only image information having the F-code attached thereto being transmitted to the transmission destination. After executing step S277, steps S275 and S279 are skipped, and step S281 is executed. On the other hand, in a case where at least one of these two steps yields negative (in a case of NO), only image information without having the F-code attached thereto is transmitted to the transmission destination. Thereafter, steps S275, S279, and S281 are skipped, and step S245 is executed.

According to this configuration, the F-code is annunciated only to transmission destinations that have to receive annunciation of the F-code. That is to say, meaningless F-code annunciation such as described above is inhibited.

Figure 30:
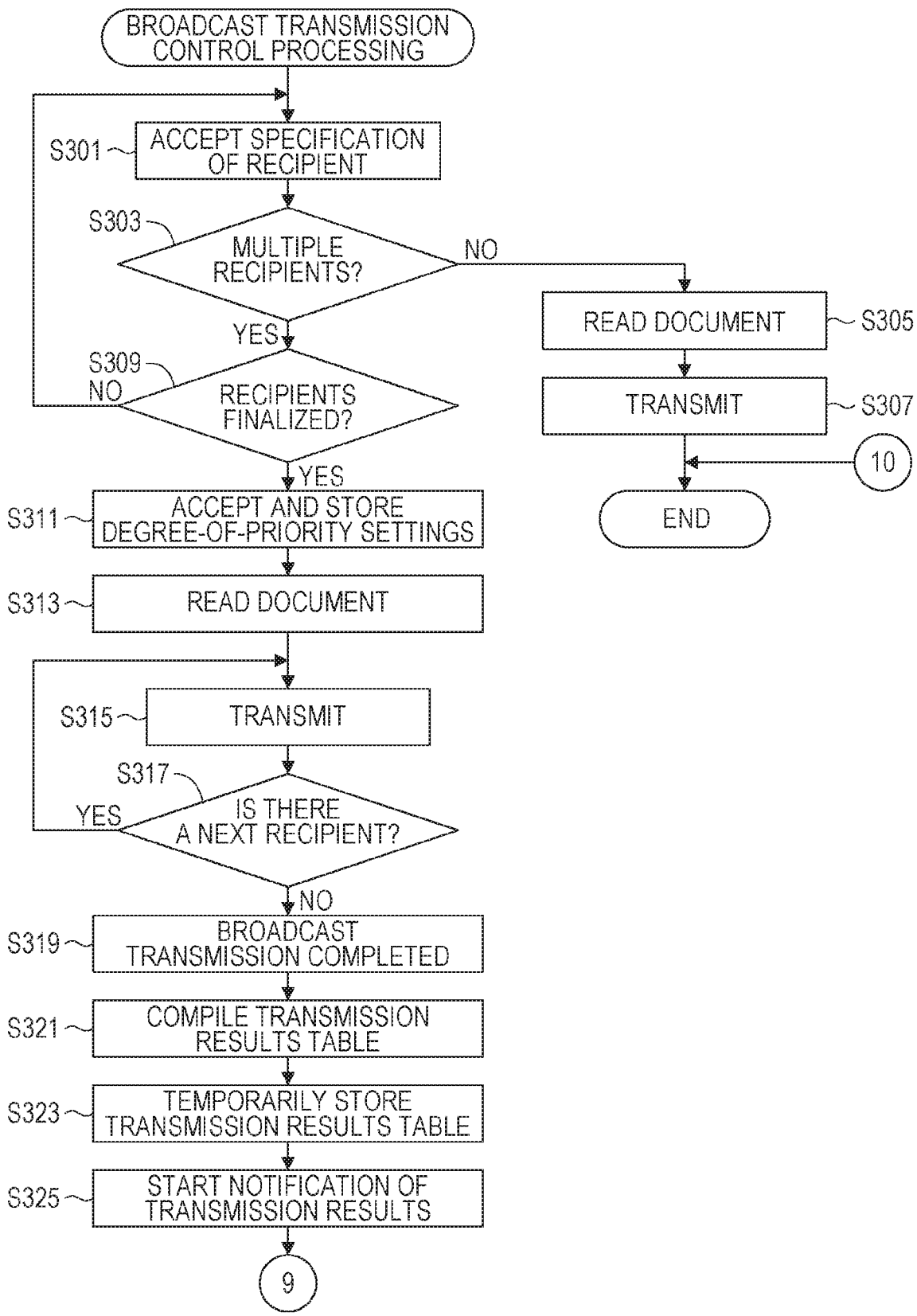
FIG. 30 is a flowchart illustrating part of an example of broadcast transmission control processing in a transmission results notification mode that the control unit of the image forming device according to the second embodiment executes.
Figure 31:
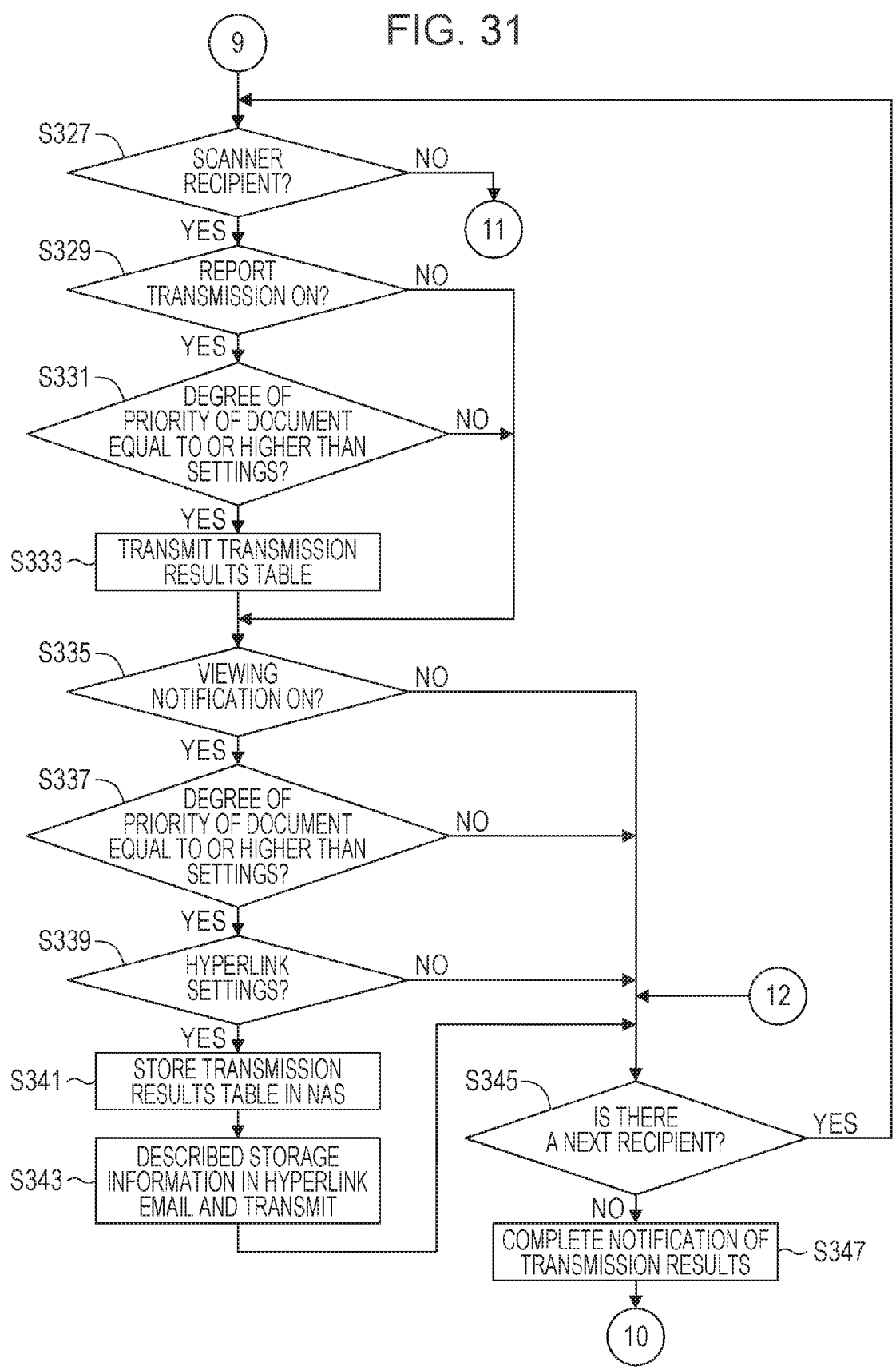
FIG. 31 is a flowchart illustrating another part of the example of the broadcast transmission control processing in the transmission results notification mode according to the second embodiment.
Figure 32:
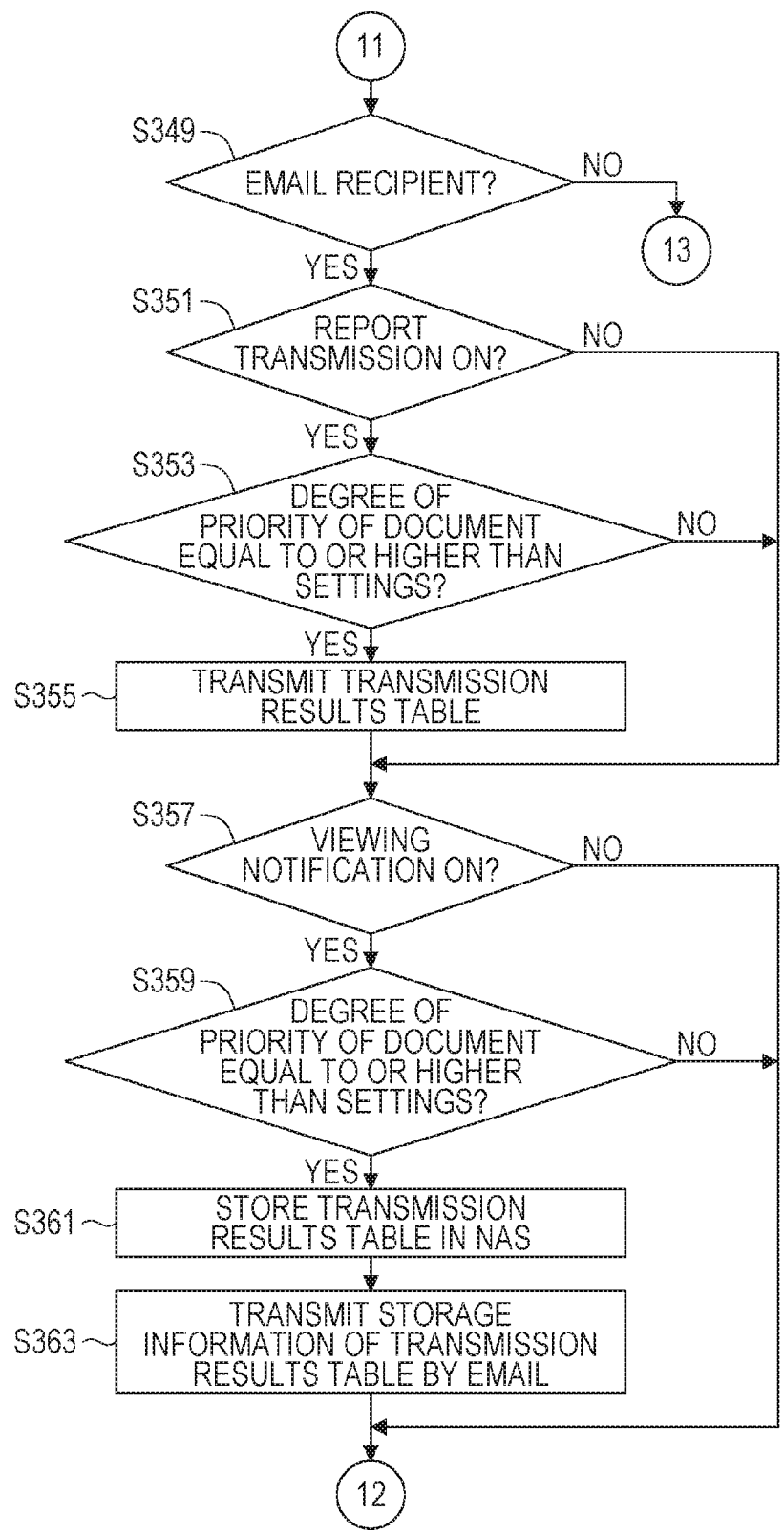
FIG. 32 is a flowchart illustrating yet another part of the example of the broadcast transmission control processing in the transmission results notification mode according to the second embodiment.
Figure 33:
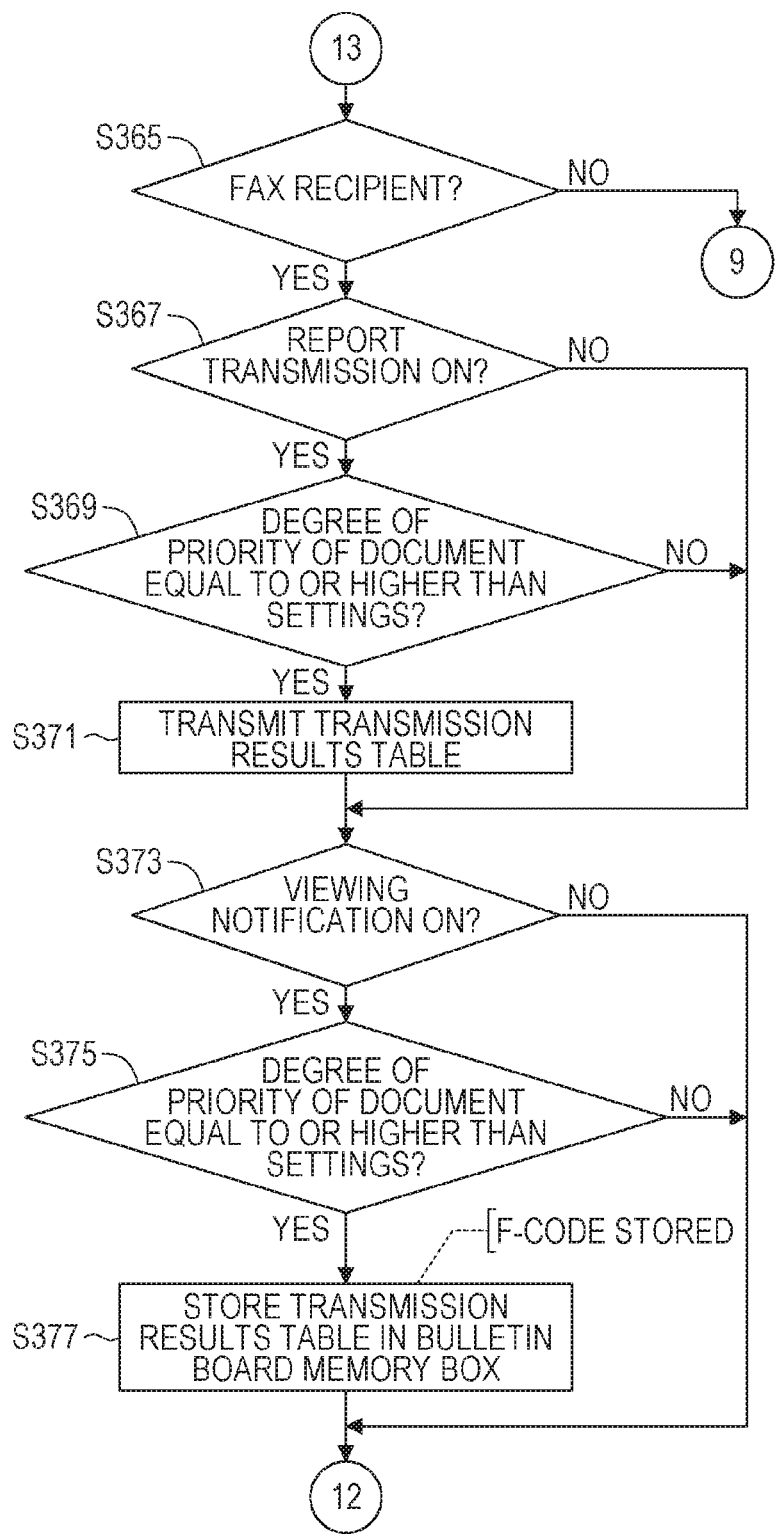
FIG. 33 is a flowchart illustrating the remaining part of the example of the broadcast transmission control processing in the transmission results notification mode according to the second embodiment.

Next, operations of the control unit 10 in the transmission results notification mode will be described. In this case, the control unit 10 performs broadcast transmission control processing in accordance with the transmission results notification mode following the procedures illustrated in the flowchart in FIGS. 30 through 33, following the information transmission control program. Note that steps S301 through S313 in the broadcast transmission control processing according to the transmission results notification mode (FIG. 30) are the same as steps S201 through S213 in the above-described broadcast transmission control processing according to the transmission reservation notification mode (FIG. 26), so description thereof will be omitted. Settings are performed using the notification conditions setting screen 730 illustrated in FIGS. 23 and 24 beforehand when executing the broadcast transmission control processing according to this transmission results notification mode as well, thereby compiling the transmission destination table 750 illustrated in FIG. 25.

The control unit 10 causes the reading unit 12 to execute image reading processing in step S313, and thereafter advances the flow to step S315. In this step S315, the image information that is transmission object information is transmitted to each of the transmission destinations, i.e., broadcast transmission processing is started. At this time, the control unit 10 transmits image information with the F-code attached to transmission destinations by the facsimile transmission functions. The control unit 10 then advances the flow to step S317, and determines whether or not there is a next transmission destination. In a case where there is a next transmission destination here for example (YES in S317), the control unit 10 returns the flow to step S315. On the other hand, in a case where there is no next transmission destination (NO in S317), the control unit 10 advances the flow to step S319.

In step S319, the control unit 10 completes the broadcast transmission processing, and advances the flow to step S321. In this step S321, the control unit 10 compiles a transmission results table 1061. Further, the control unit 10 advances the flow to step S323, and temporarily stores the transmission results table 1061 compiled in step S321 in the storage unit 100.

After executing step S323, the control unit 10 advances the flow to step S325. In this step S325, the control unit 10 starts notification of the transmission report information that is the transmission results table 1061. At the time of starting this notification, the control unit 10 advances the flow to step S327, and determines whether the transmission destination is a transmission destination by the scanner transmission functions. In a case where the transmission destination is a transmission destination by the scanner transmission functions here for example (YES in S327), the control unit 10 advances the flow to step S329.

In step S329, the control unit 10 determines whether or not the settings for the current transmission destination are that notification of transmission report information is to be performed by the results table transmission mode (report transmission on). This determination is performed by referencing the above-described transmission destination table 750. That is to say, if the settings for notification of transmission report information by the results table transmission mode in the transmission destination table 750 are other than "off" for the current transmission destination, determination is made that the settings for the current transmission destination are that notification of transmission report information is to be performed by the results table transmission mode. In a case where settings for the current transmission destination are that notification of transmission report information is to be performed by the results table transmission mode, for example (YES in S329), the control unit 10 advances the flow to step S331.

In step S331, the control unit 10 determines whether or not the degree of priority set to the image information that is transmission object information is equal to or higher than the degree of priority set to the current transmission destination in the results table transmission mode. This determination is also made by referencing the above-described transmission destination table 750. In a case where the degree of priority set to the image information is equal to or higher than the degree of priority set to the current transmission destination in the results table transmission mode (YES in S331), i.e., in a case where these conditions are satisfied, the control unit 10 advances the flow to step S333.

In step S333, the control unit 10 transmits the transmission results table 1061 to the current transmission destination. The control unit 10 then advances the flow to step S335.

Note that in a case where the current transmission destination is not set for notification of transmission report information in the results table transmission mode in the above step S329 (NO in S329), the control unit 10 advances the flow to step S335. Also, in a case where the degree of priority set to the image information that is transmission object information is not equal to or higher than the degree of priority set to the current transmission destination in the results table transmission mode (NO in S331), the control unit 10 advances the flow to step S335.

In step S335, the control unit 10 determines whether settings have been made regarding the current transmission destination where notification is performed by the results table viewing location notification mode (viewing notification on). This determination is also performed by referencing the above-described transmission destination table 750. That is to say, in a case where settings for notification by the results table viewing location notification mode are other than "off" in the transmission destination table 750, determination is made that the settings regarding the current transmission destination are that notification is performed by the results table viewing location notification mode. In a case where the settings regarding the current transmission destination are that notification of transmission report information is performed by the results table viewing location notification mode here for example (YES in S335), the control unit 10 advances the flow to step S337.

In step S337, the control unit 10 determines whether or not the degree of priority set to the image information that is transmission object information is equal to or higher than the degree of priority set to the current transmission destination in the results table viewing location notification mode. This determination is also made by referencing the above-described transmission destination table 750. In a case where the degree of priority set to the image information is equal to or higher than the degree of priority set to the current transmission destination in the results table viewing location notification mode here for example (YES in S337), the control unit 10 advances the flow to step S339.

In step S339, the control unit 10 determines whether or not an email address is set for the transmission destination as a hyperlink destination. Now, in a case where an email address is set for the transmission destination as a hyperlink destination for example (YES in S339), the control unit 10 advances the flow to step S341. In this step S341, the control unit 10 stores the transmission results table 1061 in the NAS folder 1101. The control unit 10 then advances the flow to step S343.

In step S343, the control unit 10 transmits an email with the storage information representing the link destination of the NAS folder 1101, which is the storage location of the transmission results table 1061, described therein (second storage information) to the email address of the hyperlink destination. Thereafter, the control unit 10 advances the flow to step S345.

In step S345, the control unit 10 determines whether or not there is a next transmission destination, i.e., whether or not at least image information has been transmitted to all transmission destinations. In a case where there is a next transmission destination for example (YES in S345), the control unit 10 returns the flow to step S327. On the other hand, in a case where there is no next transmission destination in step S345 (NO in S345), the control unit 10 advances the flow to step S347, and completes the notification of transmission report information that is the transmission results table 1061. Upon executing this step S347, the control unit 10 ends the broadcast transmission control processing by the transmission results notification mode.

Note that in a case where the settings regarding the current transmission destination are not that notification is performed by the results table viewing location notification mode in the above-described step S335 (NO in S335), the control unit 10 advances the flow to step S345. Also, in a case where the degree of priority set to the image information that is transmission object information is not equal to or higher than the degree of priority set to the current transmission destination in the results table viewing location notification mode in the above-described step S337 (NO in S337), the control unit 10 advances the flow to step S345. Further, in a case where an email address is not set for the transmission destination as a hyperlink destination in the above-described step S339 (NO in S339), the control unit 10 advances the flow to step S345.

In a case where the transmission destination is not a transmission destination by the scanner transmission functions for example in the above-described step S327 (NO in S327), the control unit 10 advances the flow to step S349. In this step S349, the control unit 10 determines whether the transmission destination is a transmission destination by the email transmission functions. In a case where the transmission destination is a transmission destination by the email transmission functions in step S349 (YES in S349) here for example, the control unit 10 advances the flow to step S351.

In step S351, the control unit 10 determines whether or not the settings for the current transmission destination are that notification of transmission report information is to be performed by the results table transmission mode, in the same way as the above-described step S329. In a case where settings for the current transmission destination are that notification of transmission report information is to be performed by the results table transmission mode here for example (YES in S351), the control unit 10 advances the flow to step S353.

In step S353, the control unit 10 determines whether or not the degree of priority set to the image information that is transmission object information is equal to or higher than the degree of priority set to the current transmission destination in the results table transmission mode in the same way as the above-described step S331. In a case where the degree of priority set to the image information is equal to or higher than the degree of priority set to the current transmission destination in the results table transmission mode here for example (YES in S353), the control unit 10 advances the flow to step S355.

In step S355, the control unit 10 attaches the transmission results table 1061 to an email, and transmits to the current transmission destination. The control unit 10 then advances the flow to step S357.

Note that in a case where the current transmission destination is not set for notification of transmission report information in the results table transmission mode in the above-described step S351 (NO in S351), the control unit 10 advances the flow to step S357. Also, in a case where the degree of priority set to the image information that is transmission object information is not equal to or higher than the degree of priority set to the current transmission destination in the results table transmission mode in the above-described step S353 (NO in S353), the control unit 10 advances the flow to step S357.

In step S357, the control unit 10 determines whether settings have been made regarding the current transmission destination where notification is performed by the results table viewing location notification mode, in the same way as in the above-described step S335. In a case where the settings regarding the current transmission destination are that notification of transmission report information is performed by the results table viewing location notification mode here for example (YES in S357), the control unit 10 advances the flow to step S359.

In step S359, the control unit 10 determines whether or not the degree of priority set to the image information that is transmission object information is equal to or higher than the degree of priority set to the current transmission destination in the results table viewing location notification mode, in the same way as in the above-described step S337. In a case where the degree of priority set to the image information is equal to or higher than the degree of priority set to the current transmission destination in the results table viewing location notification mode here for example (YES in S359), the control unit 10 advances the flow to step S361.

In step S361, the control unit 10 stores the transmission results table 1061 in the NAS folder 1101 in the same way as the above-described step S341. The control unit 10 then advances the flow to step S363, and transmits an email in which is described storage information (second storage information) representing the link destination for the NAS folder 1101, which is the storage location of the transmission results table 1061, to the current transmission destination. The control unit 10 then advances the flow to step S345.

Note that in a case where the current transmission destination is not set for notification of transmission report information in the results table viewing location notification mode in the above-described step S357 (NO in S357), the control unit 10 advances the flow to step S345. Also, in the above-described step S359, in a case where the degree of priority set to the image information that is transmission object information is not equal to or higher than the degree of priority set to the current transmission destination in the results table viewing location notification mode (NO in S359), the control unit 10 advances the flow to step S345.

Further, in a case where the transmission destination not is a transmission destination by the email transmission functions in the above-described step S349 (NO in S349), the control unit 10 advances the flow to step S365. In this step S365, the control unit 10 determines whether or not the transmission destination is a transmission destination by the facsimile transmission functions. In a case where the transmission destination is a transmission destination by the facsimile transmission functions here for example (YES in S365), the control unit 10 advances the flow to step S367. Note that in a case where the transmission destination is not a transmission destination by the facsimile transmission functions in step S365 (NO in S365), the control unit 10 returns the flow to step S327.

In step S367, the control unit 10 determines whether or not the settings for the current transmission destination are that notification of transmission report information is to be performed by the results table transmission mode, in the same way as the above-described steps S329 and S351. In a case where settings for the current transmission destination are that notification of transmission report information is to be performed by the results table transmission mode here for example (YES in S367), the control unit 10 advances the flow to step S369.

In step S369, the control unit 10 determines whether or not the degree of priority set to the image information that is transmission object information is equal to or higher than the degree of priority set to the current transmission destination in the results table transmission mode, in the same way as in the above-described steps S331 and S353. In a case where the degree of priority set to the image information is equal to or higher than the degree of priority set to the current transmission destination in the results table transmission mode here for example (YES in S369), the control unit 10 advances the flow to step S371.

In step S371, the control unit 10 transmits the transmission results table 1061 to the current transmission destination by the facsimile transmission functions. Thereafter, the control unit 10 advances the flow to step S373.

Note that in a case where the settings for the current transmission destination in the above-described step S367 are not that notification of transmission report information is to be performed by the results table transmission mode (NO in S367), the control unit 10 advances the flow to step S373. Also, in a case where the degree of priority set to the image information that is transmission object information is not equal to or higher than the degree of priority set to the current transmission destination in the results table transmission mode (NO in S369), the control unit 10 advances the flow to step S373.

In step S373, the control unit 10 determines whether settings have been made regarding the current transmission destination where notification is performed by the results table viewing location notification mode, in the same way as in the above-described steps S335 and S357. In a case where the settings regarding the current transmission destination are that notification of transmission report information is performed by the results table viewing location notification mode here for example (YES in S373), the control unit 10 advances the flow to step S375.

In step S375, the control unit 10 determines whether or not the degree of priority set to the image information that is transmission object information is equal to or higher than the degree of priority set to the current transmission destination in the results table viewing location notification mode, in the same way as in the above-described steps S337 and S359. In a case where the degree of priority set to the image information is equal to or higher than the degree of priority set to the current transmission destination in the results table viewing location notification mode here for example (YES in S375), the control unit 10 advances the flow to step S377.

In step S377, the control unit 10 stores the transmission results table 1061 in the transmission report storage unit 1002 serving as the bulletin board memory box described earlier. The control unit 10 stores the F-code in the transmission report storage unit 1002 in a state where the above-described F-code is correlated with the transmission results table 1061 at this time. The control unit 10 then advances the flow to step S345.

In a case where the settings regarding the current transmission destination are not that notification of transmission report information is performed by the results table viewing location notification mode in the above-described step S373 (NO in S373), the control unit 10 advances the flow to step S345. Also, in a case where the degree of priority set to the image information that is transmission object information is not equal to or higher than the degree of priority set to the current transmission destination in the results table transmission mode (NO in S375), the control unit 10 advances the flow to step S345.

Now, in the above described step S315, the F-code is annunciated to all transmission destinations (i.e., all fax recipients) by the facsimile transmission functions. In other words, the F-code is annunciated to transmission destinations where settings are not that notification is performed by the results table viewing location notification mode, and to transmission destinations where there is a relation that the degree of priority set to the image information that is transmission object information is lower than the degree of priority set in the results table viewing location notification mode. That is to say, this F-code is annunciated to transmission destinations which need no annunciation of the F-code. The following configuration, for example, may be employed to inhibit such meaningless F-code annunciation.

That is to say, with regard to transmission destinations by facsimile transmission functions in step S315, image information to which an F-code is attached is transmitted only in a case where settings have been made that notification is performed by the results table viewing location notification mode, and also the degree of priority set to the image information that is transmission object information is equal to or higher than the degree of priority set regarding the results table viewing location notification mode. Otherwise, image information with no F-code attached is transmitted.

According to this configuration, the F-code is annunciated only to transmission destinations that have to receive annunciation of the F-code. That is to say, meaningless F-code annunciation such as described above is inhibited.

As described above, according to the second embodiment, transmission report information may be notified only to particular transmission destinations, based on the degree of priority of the image information that is transmission object information. This is useful in a case where transmitting the transmission report information only to transmission destinations that have to receive notification of the transmission report information is desired.

Note that while the degree of priority in the second embodiment is one attribute of the image information that is transmission object information, the transmission destinations that are the object of notification of the transmission report information may be decided based on attributes other than this degree of priority. For example, the transmission destinations that are the object of notification of the transmission report information may be sorted based on the size or type (difference among photographs, drawings, text, and so forth) of the image information, format, and so forth.

In the second modification, a form where transmission report information is notified to particular transmission destinations by the reservation table transmission mode, i.e., a form where the transmission reservation table 1051 is transmitted to particular transmission destinations, is an example of a first form according to the present disclosure. Also, a form where transmission report information is notified to particular transmission destinations by the results table transmission mode, i.e., a form where the transmission results table 1061 is transmitted to particular transmission destinations, is an example of a second form according to the present disclosure.

Also, according to the reservation table viewing location notification mode, storage information representing the storage location of the transmission reservation table 1051 (first storage information) is annunciated to particular transmission destinations as described above, and the particular transmission destinations that have received this annunciation make a viewing request for this transmission reservation table 1051 whenever suitable. The transmission reservation table 1051 may then be transmitted to the particular transmission destination that is the source of the viewing request, in response to this viewing request. The viewing request from a particular transmission destination in the reservation table viewing location notification mode is an example of a first viewing request according to the present disclosure. A form of notifying the particular transmission destination of the transmission report information by the reservation table viewing location notification mode, i.e., a form where the transmission reservation table 1051 is transmitted to the particular transmission destination, is an example of a third form according to the present disclosure.

Also, according to the results table viewing location notification mode, storage information representing the storage location of the transmission results table 1061 (second storage information) is annunciated to particular transmission destinations as described above, and the particular transmission destinations that have received this annunciation make a viewing request for this transmission results table 1061 whenever suitable. The transmission results table 1061 may then be transmitted to the particular transmission destination that is the source of the viewing request, in response to this viewing request. The viewing request from a particular transmission destination in the results table viewing location notification mode is an example of a second viewing request according to the present disclosure. A form of notifying the particular transmission destination of the transmission report information by the results table viewing location notification mode, i.e., a form of transmitting the transmission results table 1061 to the particular transmission destination, is an example of a fourth form according to the present disclosure.

Third Embodiment

Next, a third embodiment of the present disclosure will be described. Although particular transmission destinations are decided in the second embodiment based on the attributes of the image information, which are the degree of priority of the image information that is transmission object information, particular transmission destinations are decided in the third embodiment based on the notification form of the transmission report information. That is to say, what sort of communication form of the transmission report information causes each of the transmission destinations to be an object of notification is set. Notification of the transmission report information is performed based on the contents of the settings.

In detail, an other functions setting screen 700 such as illustrated in FIG. 21 is displayed on the display screen of the display unit 132, in the third embodiment as well. However, the "notification of broadcast transmission information" button 702 in the other functions setting screen 700 according to the third embodiment is assigned different functions from those in the second embodiment. In the third embodiment, pressing the "notification of broadcast transmission information" button 702 displays a notification operation setting screen 800 such as illustrated in FIG. 34 on the display screen of the display unit 132.

Figure 34:
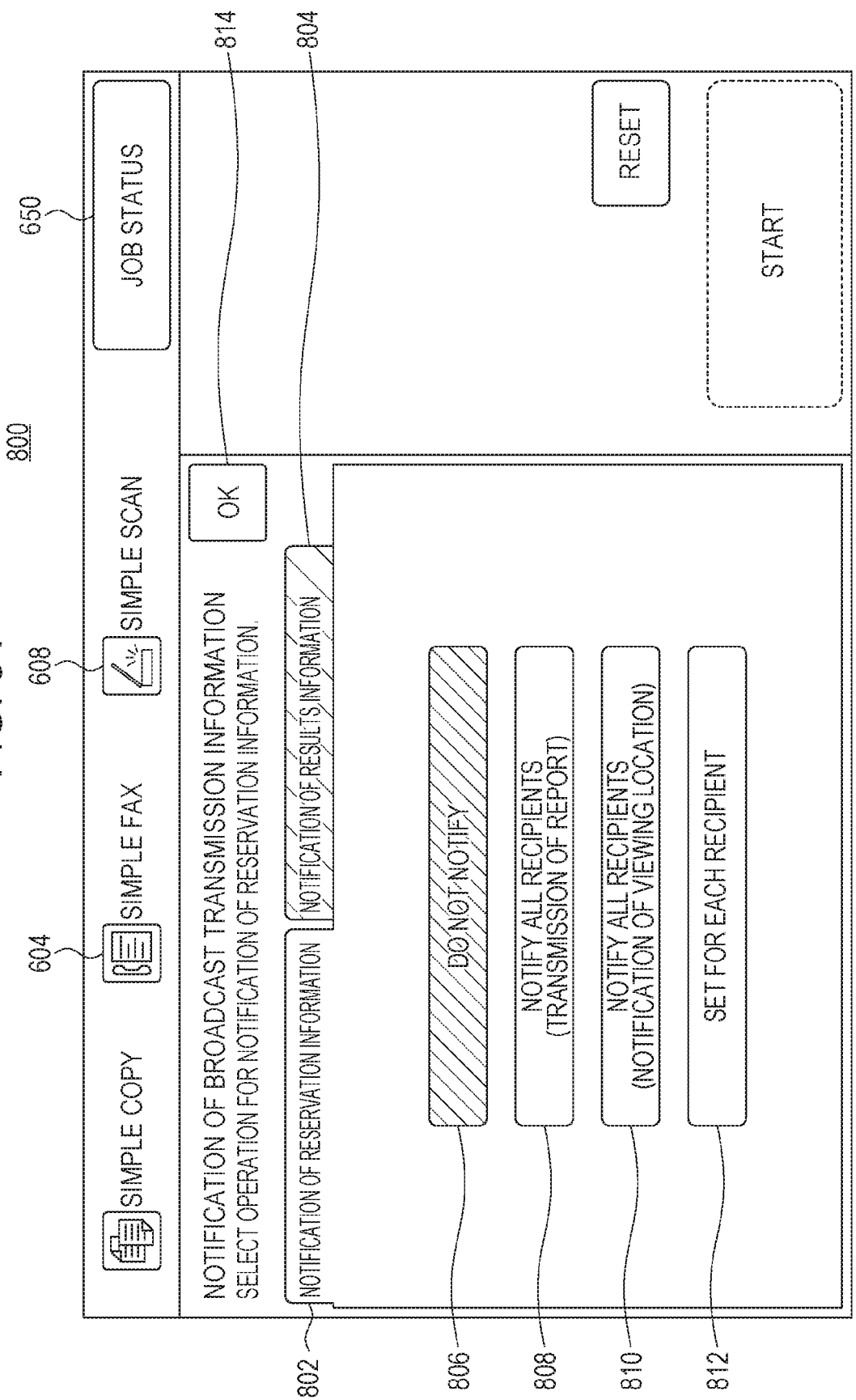
FIG. 34 is a diagram illustrating an example of a notification operation settings screen displayed on a display screen of a display unit of an image forming device according to a third embodiment of the present disclosure.

The notification operation setting screen 800 illustrated in FIG. 34 is a screen for setting which transmission destinations to notify the transmission report information to, for each form of transmission report information. Accordingly, the notification operation setting screen 800 has a "notification of reservation information" tab 802 corresponding to the above-described transmission reservation notification mode, and a "notification of results information" tab 804 corresponding to the transmission results notification mode. FIG. 34 illustrates a state in which the "notification of reservation information" tab 802 has been pressed. Accordingly, settings regarding the transmission reservation notification mode can be performed.

Four buttons 806 through 812 are provided in the notification operation setting screen 800 illustrated in FIG. 34. Of these, when a "do not notify" button 806 is pressed, settings for the notification function of the transmission report information by the transmission reservation notification mode to be off, i.e., for the transmission reservation table 1051 not to be transmitted as the transmission report information, are made, or rather more accurately, are tentatively set. When a "notify all recipients (transmission of report)" button 808 is pressed, settings for only the notification function of the transmission report information by the reservation table transmission mode to be on, out of the transmission reservation notification mode, i.e., for the transmission reservation table 1051 to be transmitted to all transmission destinations, are tentatively set. When a "notify all recipients (notification of viewing location)" button 810 is pressed, settings for only the notification function of the transmission report information by the reservation table viewing location notification mode to be on, out of the transmission reservation notification mode, i.e., for storage information representing the storage location of the transmission reservation table 1051 to be transmitted to all transmission destinations, are tentatively set. When a "set for each recipient" button 812 is pressed, a notification conditions setting screen 830 such as illustrated in FIG. 35 is displayed on the display screen of the display unit 132.

Figure 35:
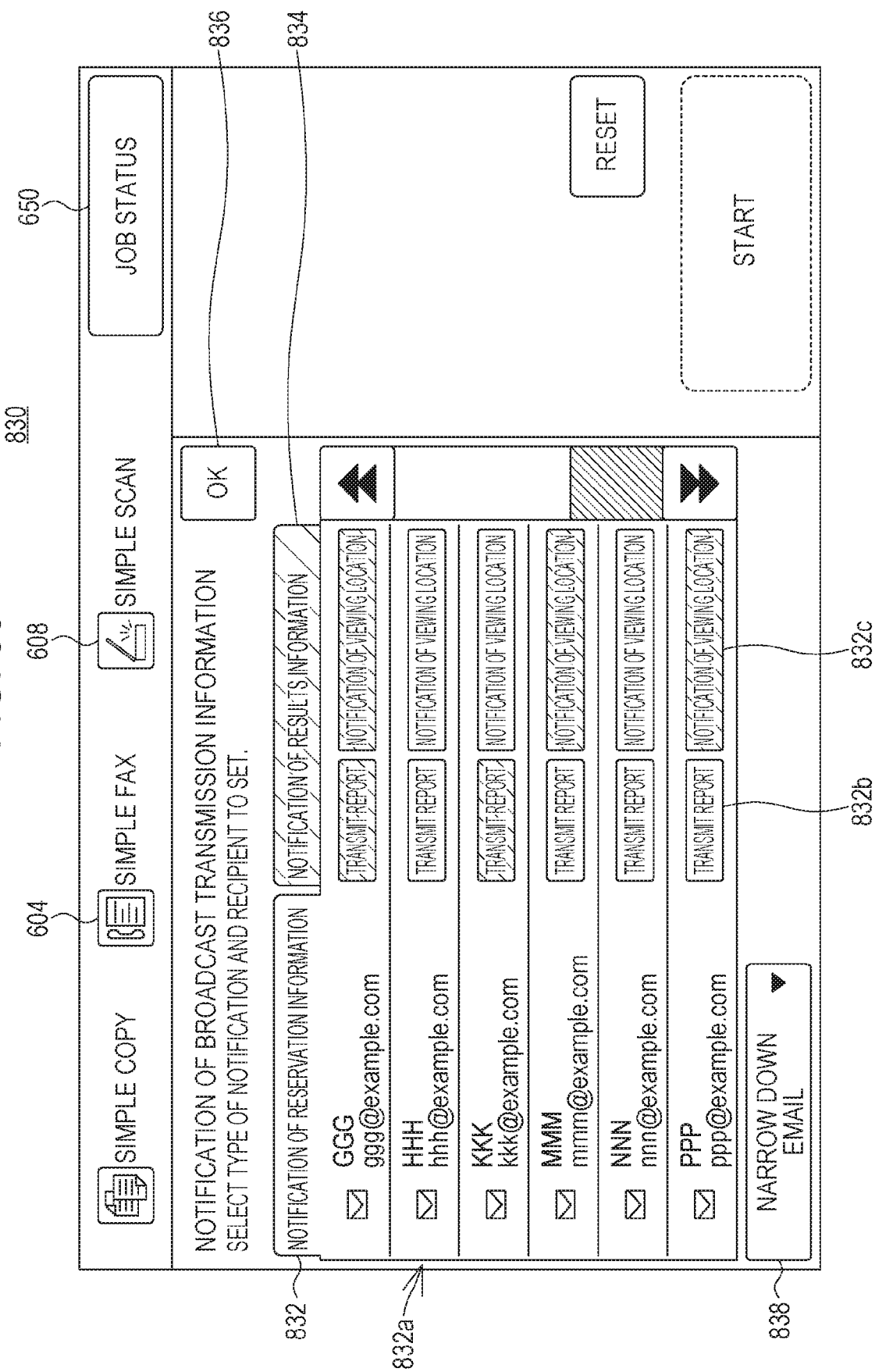
FIG. 35 is a diagram illustrating an example of a notification conditions settings screen displayed on the display screen of the display unit of the image forming device according to the third embodiment.

The notification conditions setting screen 830 illustrated in FIG. 35 is a screen for setting notification conditions for what sort of notification form of transmission report information each transmission destination registered in the above-described recipient list will be the object of notification. These notification condition settings are made for each of the above-described transmission reservation notification mode and transmission results notification mode. Accordingly, the notification conditions setting screen 830 also has a "notification of reservation information" tab 832 corresponding to the transmission reservation notification mode, and a "notification of results information" tab 834 corresponding to the transmission results notification mode. FIG. 35 illustrates a state in which the "notification of reservation information" tab 832 has been pressed.

According to the notification conditions setting screen 830 illustrated in FIG. 35, notification conditions relating to the transmission reservation notification mode can be set. That is to say, the notification conditions setting screen 830 illustrated in FIG. 35 includes list 832a of transmission destinations registered in the recipient list. Two buttons, 832b and 832c, are provided for each transmission destination. Of these, a "transmit report" button 832b is an operation member for setting, with regard to the corresponding transmission destination, to be the object of notification of transmission report information by the registration table transmission mode, i.e., to be the object of transmission of the transmission reservation table 1051. Accordingly, when this "transmit report" button 832b is pressed, the corresponding transmission destinations are set as being the object of notification of transmission report information by the registration table transmission mode, i.e., being the object of transmission of the transmission reservation table 1051, or rather more accurately, tentatively set. On the other hand, a "notification of viewing location" button 832c is an operation member for setting, with regard to the corresponding transmission destination, to be the object of notification of transmission report information by the reservation table viewing location notification mode, i.e., to be the object of transmission of storage information representing the storage location of the transmission reservation table 1051. Accordingly, when this "notification of viewing location" button 832c is pressed, the corresponding transmission destinations are tentatively set as being the object of notification of transmission report information by the reservation table viewing location notification mode, i.e., being the object of transmission of storage information representing the storage location of the transmission reservation table 1051.

Note that both the "transmit report" button 832b and the "notification of viewing location" button 832c alternately transition between an on state and an off state each time they are pressed. When in an on state, the "transmit report" button 832b and the "notification of viewing location" button 832c are displayed modified one way or another, such as some sort of color being applied thereto. In the notification conditions setting screen 830 illustrated in FIG. 35, looking at transmission destination "GGG" for example, the transmission destination "GGG" is in a state where both the "transmit report" button 832b and the "notification of viewing location" button 832c are on. The transmission destination "HHH" is in a state where both the "transmit report" button 832b and the "notification of viewing location" button 832c are off. Further, transmission destination "KKK" is in a state where only the "transmit report" button 832b is on. The transmission destination "MMM" is in a state where only the "notification of viewing location" button 832c is on.

When an "OK" button 836 is pressed in a state where tentative settings have been made by pressing the "transmit report" button 832b and the "notification of viewing location" button 832c, the notification operation setting screen 800 illustrated in FIG. 34 is displayed again on the display screen of the display unit 132. That is to say, the state of the display screen of the display unit 132 returns to the state where the notification operation setting screen 800 illustrated in FIG. 34 is displayed. Note that while only email addresses are displayed in the list 832*a* of transmission destinations in the notification conditions setting screen 830 illustrated in FIG. 35, this is due to narrowing down having been performed by a "narrow down" button 838 at the lower left portion of the notification conditions setting screen 830. That is to say, the transmission destinations displayed in the list 832*a* can be narrowed down as suitable by operating this "narrow down" button 838.

Figure 36:
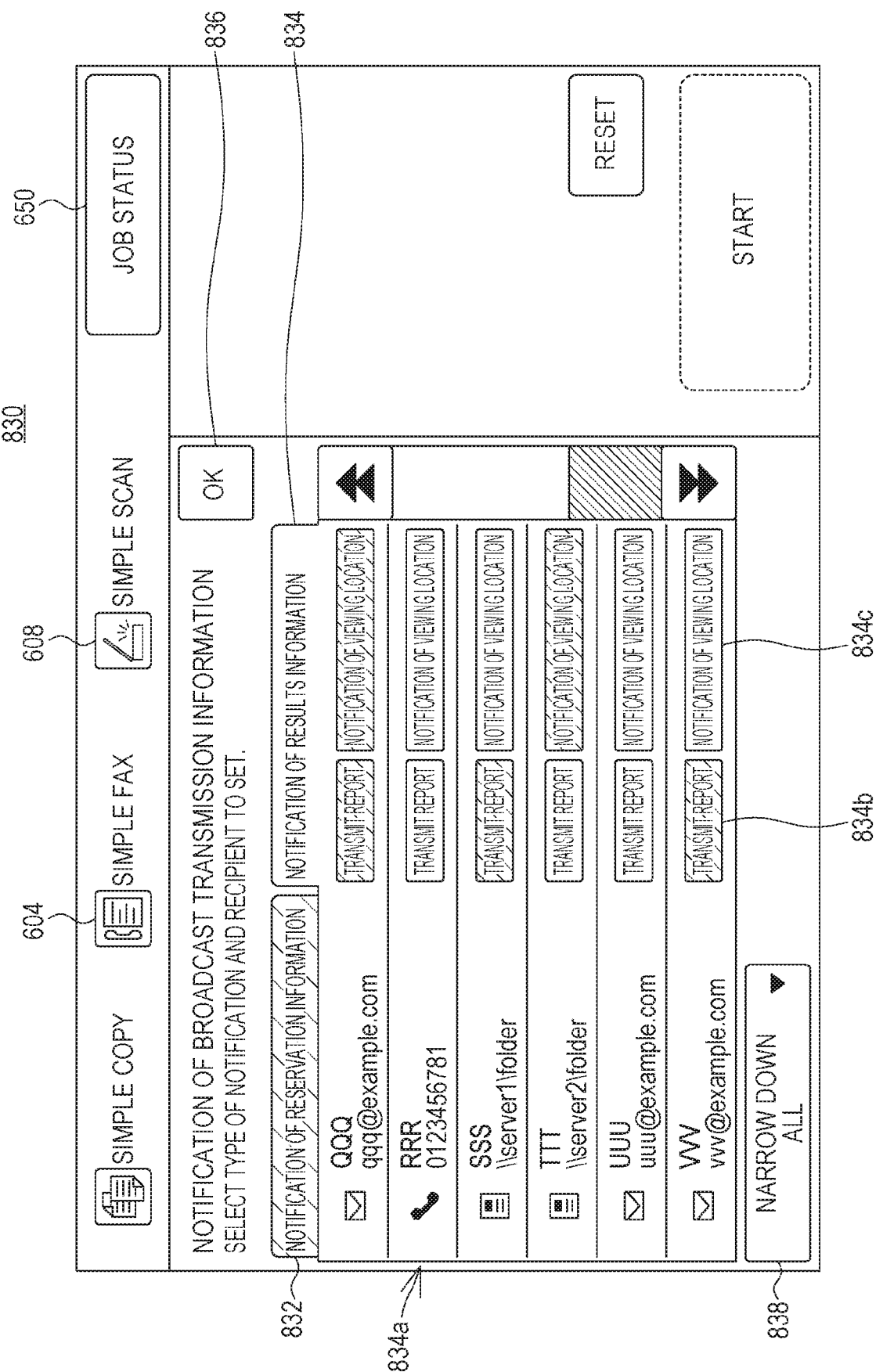
FIG. 36 is a diagram illustrating an example where the state of the notification conditions settings screen has changed, according to the third embodiment.

Further, pressing the "notification of results information" tab 804 in the notification operation setting screen 800 illustrated in FIG. 34 causes the notification operation setting screen 800 to transition to a state for performing settings regarding the transmission results notification mode. The notification operation setting screen 800 where the "notification of results information" tab 804 has been pressed also has the "do not notify" button, "notify all recipients (transmission of report)" button, "notify all recipients (notification of viewing location)" button, and "set for each recipient" button, in the same way as in FIG. 34. When the "set for each recipient" button is pressed, a notification conditions setting screen 830 such as illustrated in FIG. 36 is displayed on the display screen of the display unit 132. This notification conditions setting screen 830 illustrated in FIG. 36 can also be displayed by pressing the "notification of results information" tab 834 in the notification conditions setting screen 830 illustrated in FIG. 35.

According to the notification conditions setting screen 830 illustrated in FIG. 36, notification conditions relating to the transmission results notification mode can be performed. That is to say, a list 834*a* of transmission destinations is displayed in the notification conditions setting screen 830 illustrated in FIG. 36 as well. Two buttons 834*b* and 834*c* are provided for each transmission destination. All transmission destinations are displayed in the list 834*a* of transmission destinations in FIG. 36 by the "narrow down" button 838 having been operated.

A "transmit report" button 834*b* in FIG. 36 is an operation member for setting, with regard to the corresponding transmission destination, to be the object of notification of transmission report information by the results table transmission mode, i.e., to be the object of transmission of the transmission results table 1061. Accordingly, when this "transmit report" button 834*b* is on, the corresponding transmission destinations are set as being the object of notification of transmission report information by the results table transmission mode, i.e., being the object of transmission of the transmission results table 1061, or rather more accurately, tentatively set. On the other hand, a "notification of viewing location" button 834*c* is an operation member for setting, with regard to the corresponding transmission destination, to be the object of notification of transmission report information by the results table viewing location notification mode, i.e., to be the object of transmission of storage information representing the storage location of the transmission results table 1061. Accordingly, when this "notification of viewing location" button 834*c* is pressed, the corresponding transmission destinations are tentatively set as being the object of notification of transmission report information by the results table viewing location notification mode, i.e., being the object of transmission of storage information representing the storage location of the transmission results table 1061.

In the notification conditions setting screen 830 illustrated in FIG. 36, the transmission destination "QQQ", for example, is in a state where both the "transmit report" button 834*b* and the "notification of viewing location" button 834*c* are on. The transmission destination "RRR" is in a state where both the "transmit report" button 834*b* and the "notification of viewing location" button 834*c* are off. The transmission destination "SSS" is in a state where only the "transmit report" button 834*b* is on. The transmission destination "TTT" is in a state where only the "notification of viewing location" button 834*c* is on.

When the "OK" button 836 is pressed in a state where tentative settings have been made by pressing the "transmit report" button 834*b* and the "notification of viewing location" button 834*c*, the notification operation setting screen 800 illustrated in FIG. 34 is displayed on the display screen of the display unit 132 again. When the "OK" button 836 is pressed in this notification operation setting screen 800, the other functions setting screen 700 illustrated in FIG. 21 is displayed on the display screen of the display unit 132 again. This pressing of the "OK" button 836 also formally sets the contents that had been set tentatively in the notification conditions setting screen 830 illustrated in FIGS. 35 and 36. These settings are performed by the control unit 10. Note that operations of performing tentative settings using the notification conditions setting screen 830 are an example of third user operations according to the present disclosure. The control unit 10 that formally sets the tentatively set contents in response to pressing of the "OK" button 836 is an example of a third setting device according to the present disclosure.

Performing settings of notification conditions in this way creates a transmission destination table 850 such as illustrated in FIG. 37, which is stored in the storage unit 100, for example. Looking at the transmission destination "GGG", for example, in this transmission destination table 850, this transmission destination "GGG" has all of the reservation table transmission mode, reservation table viewing location notification mode, results table transmission mode, and results table viewing location notification mode, set to on. Accordingly, notification of transmission report information is performed by all notification modes to the transmission destination "GGG". A transmission destination "HHH" has all of the reservation table transmission mode, reservation table viewing location notification mode, results table transmission mode, and results table viewing location notification mode, set to off. Accordingly, notification of transmission report information is not performed at all regarding the transmission destination "HHH". Further, the transmission destination "KKK", for example, has the reservation table transmission mode and results table transmission mode set to on, and the reservation table viewing location notification mode and results table viewing location notification mode set to off. Accordingly, notification of transmission report information is performed by the reservation table transmission mode and results table transmission mode, while no notification is performed by the reservation table viewing location notification mode and results table viewing location notification mode, for the transmission destination "KKK".

Note that in the transmission destination table 850 illustrated in FIG. 37, the portion surrounded by a dashed line corresponds to the contents set at the notification conditions setting screen 830 illustrated in FIG. 35. Also, in this transmission destination table 850, the portion surrounded by a dotted line corresponds to the contents set at the notification conditions setting screen 830 illustrated in FIG. 36.

While detailed illustration will be omitted, the flow of operations of the control unit 10 in the image forming device 1 according to the third embodiment is the contents of the flowcharts illustrated in FIGS. 26 through 33 according to the above-described second embodiment from which steps of determining the degree of priority of image information (S225, S233, S253, S261, S271, S279, S331, S337, S353, S359, S369, and S375) have been excluded, for example.

As described above, according to the third embodiment, transmission report information is notified only to particular transmission destinations, based on the notification form of the transmission report information. This is useful in a case where transmitting the transmission report information only to transmission destinations that have to receive notification of the transmission report information is desired, in the same way as in the second embodiment.

Note that the above-described embodiments are specific examples of the present disclosure, and do not restrict the technical scope of the present disclosure. The present disclosure is applicable in other arrangements than these embodiments.

For example, the image forming device 1 according to each of the above embodiments is an example of an image processing apparatus according to the present disclosure, and also is an example of an information transmission control apparatus, but the present disclosure can be applied to other than the image forming device 1. In addition, a control program to be executed by the control unit 10 of the image forming device 1, particularly an information transmission control program can be provided alone.

Further, the present disclosure can provide an information transmission control method including broadcast transmitting, where broadcast transmission processing is performed according to the same procedures as the above broadcast transmitting functions, and transmission report notifying, where transmission report information is notified according to the same procedures as the above transmission report notification functions.

The transmission reservation table 1051 is not restricted to being compiled before the broadcast transmission processing, and may be compiled in parallel with this broadcast transmission processing. In the same way, the transmission results table 1061 is not restricted to being complied after the broadcast transmission processing, and may be compiled in parallel with this broadcast transmission processing.

The present disclosure is also applicable to a configuration having a facsimile device connected to the network 3, i.e., an Internet fax, for example, as a transmission destination.

The present application is a continuation application of PCT/JP2017/033627, filed Sep. 19, 2017, which claims priority to Japanese Patent Application No. 2016-186593, filed Sep. 26, 2016, and Japanese Patent Application No. 2017-174685, filed Sep. 12, 2017. The contents of these applications are incorporated herein by reference in their entirety.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
  a facsimile transmission device that transmits image information in increments of pages to a facsimile device at a transmission destination, via a public telephone line;
  a network transmission device that transmits image information as a file to an information processing device at a transmission destination, via a network;
  a broadcast transmission device that performs broadcast transmission processing where same image information is transmitted to a plurality of transmission destinations at one time, by at least one of the facsimile transmission device and the network transmission device; and
  a transmission report notification device that makes notification of transmission report information, including transmission destination information representing the plurality of transmission destinations of the broadcast transmission processing, to the plurality of transmission destinations, wherein
  the transmission report notification device includes:
    a transmission results table compiling device that compiles information of a transmission results table, which includes the transmission destination information representing the plurality of transmission destinations where transmission of the image information has been performed by the broadcast transmission processing, as the transmission report information,
    a storage device that stores the transmission report information, and
    an annunciation device that annunciates storage information representing a storage location of the transmission report information in the storage device, to the transmission destination,
  in response to a viewing request from the transmission destination regarding annunciation of the storage information, notification is performed by transmitting the transmission report information stored in the storage device to the transmission destination that has made the viewing request.

2. The image processing apparatus according to claim 1, wherein the transmission report notification device determines whether the transmission destination is a plurality, and makes notification of the transmission report information in a case of a plurality.

3. The image processing apparatus according to claim 1, further comprising:
  a reading device that reads an image of a document,
  wherein the broadcast transmission device transmits information of a document image read by the reading device as the image information.

4. The image processing apparatus according to claim 3, wherein the network transmission device includes
  an email transmission device that attaches information of a document image read by the reading device to an email and transmits the email, and
  a scanner transmission device that transmits information of a document image read by the reading device to a folder of the information processing device.

5. The image processing apparatus according to claim 1, wherein the transmission report notification device includes a transmission reservation table compiling device that compiles information of a transmission reservation table, which includes the transmission destination information representing the plurality of transmission destinations specified at the time of the broadcast transmission processing, as the transmission report information,
  and wherein the image processing apparatus performs notification by transmitting this transmission report information along with the image information to the transmission destinations, by the broadcast transmission device.

6. The image processing apparatus according to claim 1, wherein the information of the transmission results table includes results information of whether transmission of the image information to the transmission destinations was successful or not.

* * * * *